United States Patent
Deering et al.

(10) Patent No.: US 6,577,312 B2
(45) Date of Patent: Jun. 10, 2003

(54) GRAPHICS SYSTEM CONFIGURED TO FILTER SAMPLES USING A VARIABLE SUPPORT FILTER

(75) Inventors: Michael F. Deering, Los Altos, CA (US); N. David Naegle, Pleasanton, CA (US); Scott R. Nelson, Pleasanton, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 133 days.

(21) Appl. No.: 09/755,643

(22) Filed: Jan. 4, 2001

(65) Prior Publication Data

US 2001/0055025 A1 Dec. 27, 2001

Related U.S. Application Data

(63) Continuation-in-part of application No. 09/251,840, filed on Feb. 17, 1999.
(60) Provisional application No. 60/175,384, filed on Jan. 11, 2000, provisional application No. 60/214,925, filed on Jun. 29, 2000, and provisional application No. 60/074,836, filed on Feb. 17, 1998.

(51) Int. Cl.[7] .............................................. G06T 17/00
(52) U.S. Cl. ....................................... 345/428; 345/581
(58) Field of Search ................................. 345/418, 419, 345/420, 422, 423, 424, 426, 427, 428, 581

(56) References Cited

U.S. PATENT DOCUMENTS 5,774,110 A   6/1998  Edelson
5,787,024 A * 7/1998  Kim et al.
6,151,029 A * 11/2000 Shirman et al. ............. 345/428
6,268,864 B1 * 7/2001  Chen et al. .................. 345/428
6,400,372 B1 * 6/2002  Gossweiler et al. ......... 345/428
6,421,051 B1 * 7/2002  Kato .......................... 345/428

FOREIGN PATENT DOCUMENTS

GB    2 278 524 A      11/1994
WO    WO 99/41706       8/1999

OTHER PUBLICATIONS

Jernigan et al., "Adaptive Processing of Images" Communications, Computers and Signal Processing, 1991, IEEE Pacific Rim Conference on Victoria, BC, Canada May 9–10 1991, NY, NY, IEEE, US, May 9, 1991 pp. 254–257.
International Search Report, Application No. PCT/US 01/20382, mailed Nov. 7, 2002.

* cited by examiner

Primary Examiner—Cliff N. Vo

(57) ABSTRACT

A computer graphics system may comprise a graphics processor, a sample buffer, and a sample-to-pixel calculation unit. The graphics processor renders samples into the sample buffer in response to received graphics data. The sample-to-pixel calculation unit generates a plurality of output pixels by filtering the rendered samples based on a filter function. The pixels may be computed by generating a weighted sum of sample values (e.g. red sample values) for samples falling within the filter support. The coefficients used in the weighted sum may be added to form a normalization factor. One weighted sum of sample values may be computed per pixel attribute such as red, green, blue and alpha. The normalization factor may be computed in parallel with one or more of the weighted sums. Normalized pixel values may be obtained by dividing the weighted-sums by the normalization factor.

40 Claims, 38 Drawing Sheets

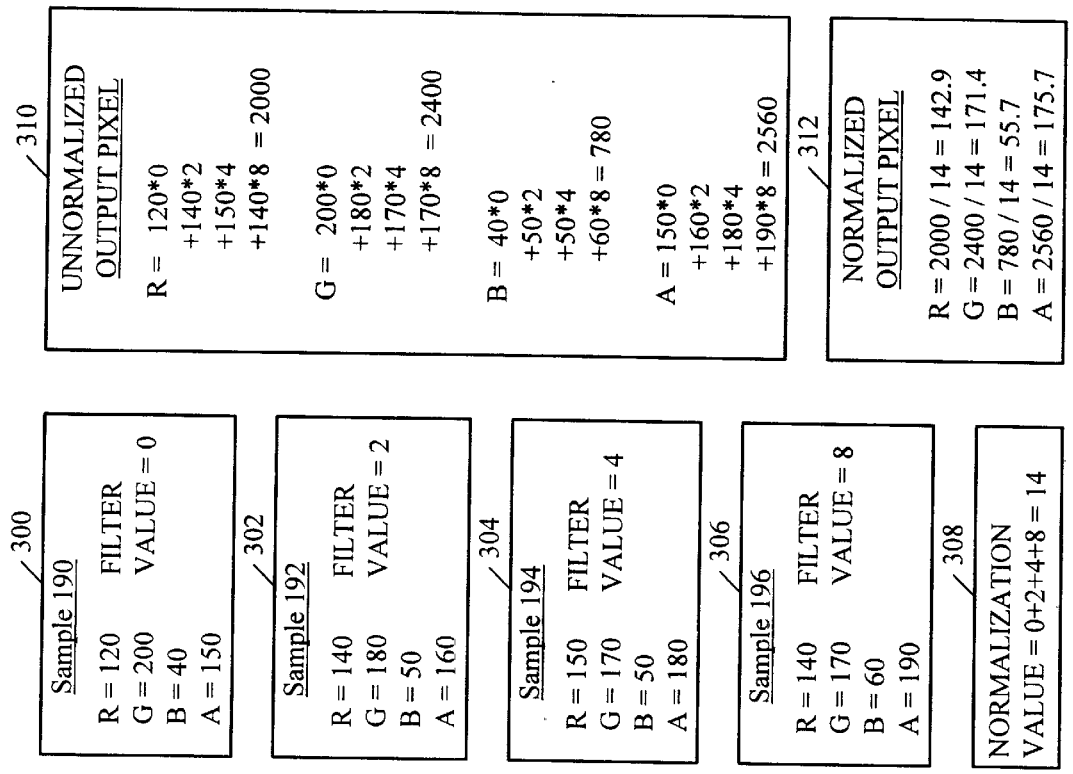
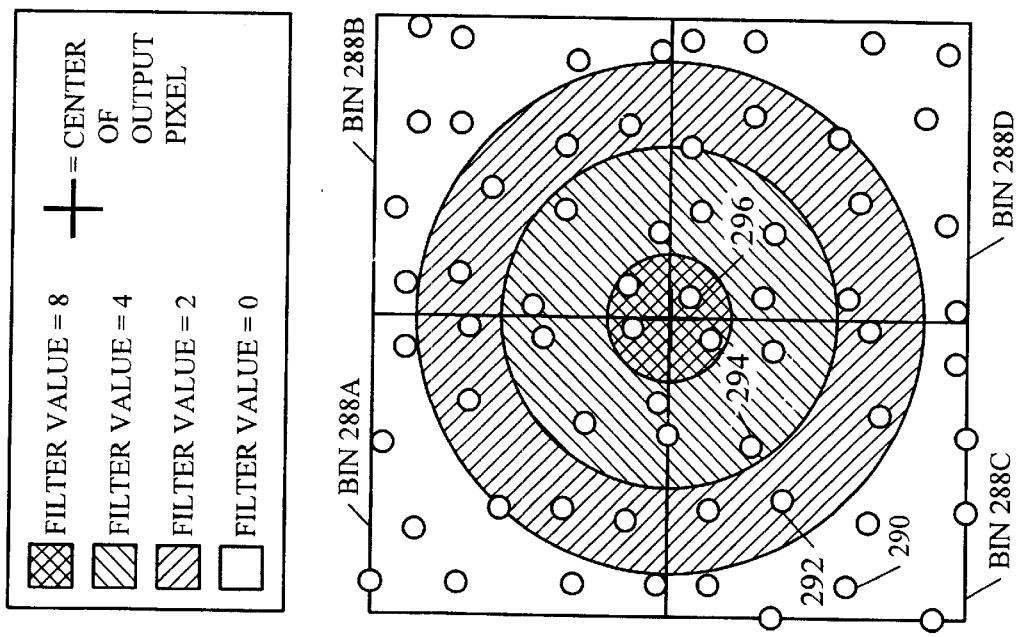
FIG. 14

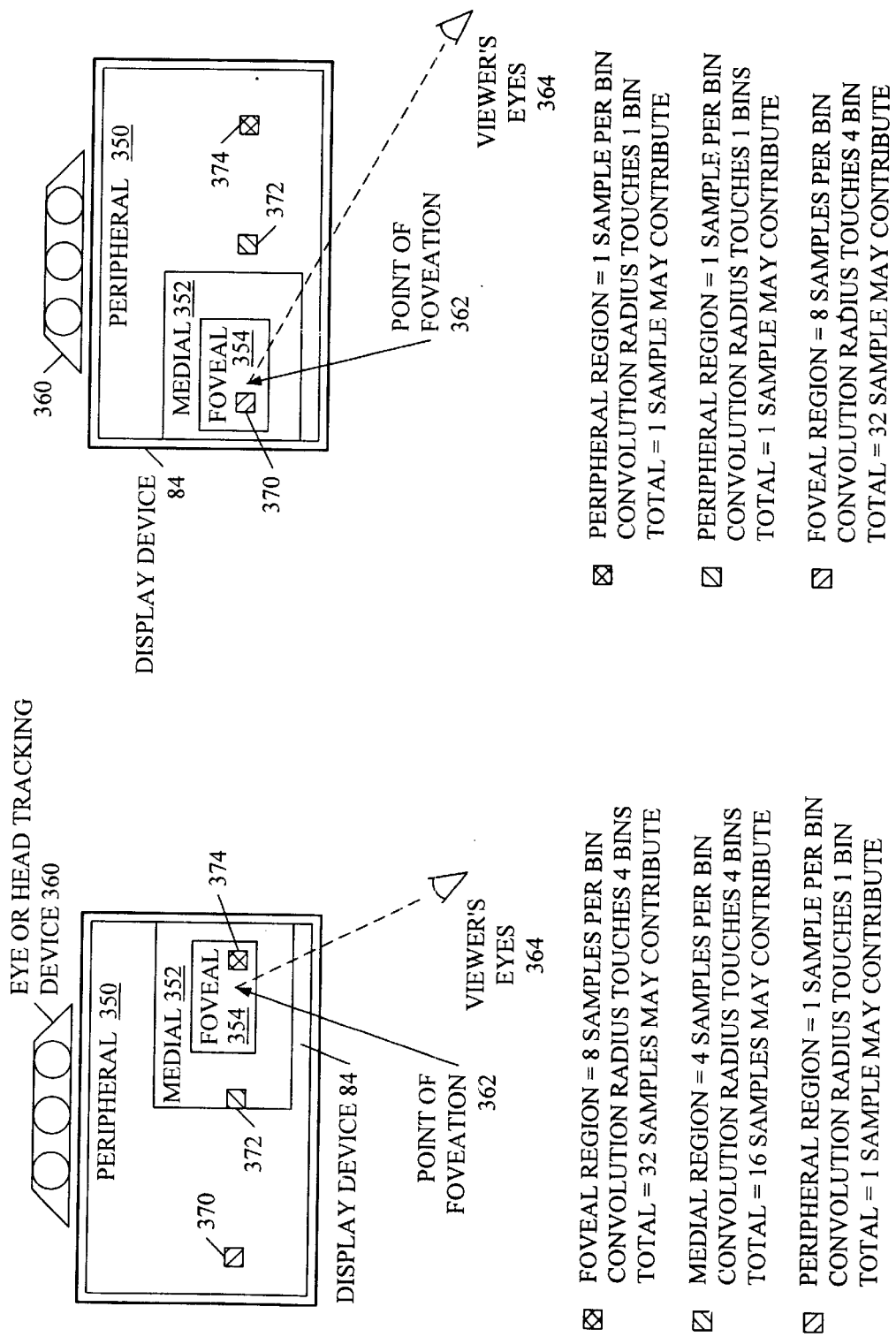

$$r_i^p = \sum_j c_j r_j^s \qquad \text{Eqn. 1}$$

$$g_i^p = \sum_j c_j g_j^s \qquad \text{Eqn. 2}$$

$$b_i^p = \sum_j c_j b_j^s \qquad \text{Eqn. 3}$$

$$\alpha_i^p = \sum_j c_j \alpha_j^s \qquad \text{Eqn. 4}$$

$$c_i^n = \frac{c_i}{\sum_j c_j} \qquad \text{Eqn. 5}$$

$$r_i^p = \frac{\sum_j c_j r_j^s}{\sum_j c_j} \qquad \text{Eqn. 6}$$

$$g_i^p = \frac{\sum_j c_j g_j^s}{\sum_j c_j} \qquad \text{Eqn. 7}$$

$$b_i^p = \frac{\sum_j c_j b_j^s}{\sum_j c_j} \qquad \text{Eqn. 8}$$

$$\alpha_i^p = \frac{\sum_j c_j \alpha_j^s}{\sum_j c_j} \qquad \text{Eqn. 9}$$

Figure 21

$$d = \sqrt{(x_1 - x_2)^2 + (y_1 - y_2)^2} \qquad \text{Eqn. 10}$$

$$d^2 = (x_1 - x_2)^2 + (y_1 - y_2)^2 \qquad \text{Eqn. 11}$$

Figure 36

GRAPHICS SYSTEM CONFIGURED TO FILTER SAMPLES USING A VARIABLE SUPPORT FILTER

CROSS-REFERENCES TO RELATED APPLICATIONS

This application claims the benefit of U.S. Provisional Application No. 60/175,384, filed on Jan. 11, 2000, and titled "Photorealistic Hardware Antialiasing".

This application claims the benefit of U.S. Provisional Application No. 60/214,925 filed on Jun. 29, 2000 titled "Graphics System Configured to Filter Samples Using a Variable Support Filter".

This application is a continuation-in-part of application Ser. No. 09/251,840 filed on Feb. 17, 1999 titled "Graphics System With A Variable-Resolution Sample Buffer", which claims the benefit of U.S. Provisional Application No. 60/074,836 filed on Feb. 17, 1998 titled "UltraJava Graphics".

BACKGROUND OF THE INVENTION

1. Field of the Invention

This invention relates generally to the field of computer graphics and, more particularly, to high performance graphics systems.

2. Description of the Related Art

A host computer may rely on a graphics system for producing visual output on a display device. The graphics system may receive graphics data (e.g. triangle data) from the host computer, and may generate a stream of output pixels in response to the graphics data. The stream of output pixels may be stored in a frame buffer, and then dumped from the frame buffer to a display device such as a monitor or projection screen.

To obtain images that are more realistic, some prior art graphics systems have gone further by generating more than one sample per pixel. As used herein, the term "sample" refers to calculated color information that indicates the color, depth (z), and potentially other information, of a particular point on an object or image. For example, a sample may comprise the following component values: a red value, a green value, a blue value, a z value, and an alpha value (e.g., representing the transparency of the sample). A sample may also comprise other information, e.g., a blur value, an intensity value, brighter-than-bright information, and an indicator that the sample consists partially or completely of control information rather than color information (i.e., "sample control information"). By calculating more samples than pixels (i.e., super-sampling), a more detailed image is calculated than can be displayed on the display device. For example, a graphics system may calculate four samples for each pixel to be output to the display device. After the samples are calculated, they are then combined or filtered to form the pixels that are stored in the frame buffer and then conveyed to the display device. Using pixels formed in this manner may create a more realistic final image.

These prior art super-sampling systems typically generate a number of samples that are far greater than the number of pixel locations on the display. These prior art systems typically have rendering processors that calculate the samples and store them into a render buffer. Filtering hardware then reads the samples from the render buffer, filters the samples to create pixels, and then stores the pixels in a traditional frame buffer. The traditional frame buffer is typically double-buffered, with one side being used for refreshing the display device while the other side is updated by the filtering hardware. Once the samples have been filtered, the resulting pixels are stored in a traditional frame buffer that is used to refresh to display device. These systems, however, have generally suffered from limitations imposed by the conventional frame buffer and by the added latency caused by the render buffer and filtering. Therefore, an improved graphics system is desired which includes the benefits of pixel super-sampling while avoiding the drawbacks of the conventional frame buffer.

However, one potential obstacle to an improved graphics system is that the filtering operation may be computationally intensive. A high-resolution graphics card and display may need to support millions of pixels per frame, and each pixel may be generated by filtration of a number of samples. This typically translates into a large number of calculations. In particular, each pixel component such as red, green and blue may be generated by constructing a weighted sum of the corresponding sample components. However, it is important to guarantee that the filter weights used to generate the weighted sums do not introduce color gain or attenuation. In other words, if the filter weights are not appropriately chosen, a group of samples all having identical red intensity $X_r$ may have a weighted sum equal to $kX_r$ where k is not equal to one. This implies that the resulting red pixel value will be more or less intense than desired. Thus, there is a substantial need for a system and method which could provide for unity gain in the filtering process (i.e. in the process of generating pixel values from sample values) in a manner which is flexible and efficient.

Furthermore, because each pixel comprises a number of components such as red, green, and blue, the filtering process may require multiple summations to be performed per pixel. Thus, there exists a need for a system and method which may efficiently and flexibly perform summations.

SUMMARY OF THE INVENTION

The present invention comprises a computer graphics system configured to receive 3D graphics data, generate samples in response to the 3D graphics data, filter the samples to generate output pixels, and provide the output pixels to a display device such as monitor or projector. In some embodiments, the graphics system comprises a sample buffer, a graphics processor configured to render (or draw) the samples into the sample buffer, and a sample-to-pixel calculation unit. The sample-to-pixel calculation unit may be responsible for filtering samples to generate pixel values.

The graphics processor may perform various rendering operations on the received 3D graphics data (e.g. triangle data) to generate samples based on a selected set of sample positions in a 2D screen space. Each sample may comprise a set of values such as red, green and blue. The samples are stored into the sample buffer for subsequent access by the sample-to-pixel calculation unit. The graphics processor preferably generates and stores more than one sample per unit pixel area in the 2D screen space for at least a subset of the output pixels. Thus, the sample buffer may be referred to as a super-sampled (or "over-sampled") sample buffer. In other embodiments, the graphics processor may generate one sample per unit pixel area, or, less than one sample per unit pixel area (e.g. one sample for every two pixels). In one embodiment, the samples may be more densely positioned in certain areas of the screen space and less densely positioned in other areas.

The sample-to-pixel calculation unit is configured to read the samples from the sample buffer and filter (or convolve)

the samples into respective output pixels. The output pixels are then provided to refresh the display. As used herein, the terms "filter" and "convolve" are used interchangeably, and refer to the process of generating a pixel value by computing a weighted average of a corresponding set of sample values. The sample-to-pixel calculation unit filters samples based on a filter function which may be centered over a current pixel location in the screen space. The filter function has an associated domain of definition referred to herein as the filter support or filter extent. The sample-to-pixel calculation unit:

(a) selects those samples which fall within the filter support in screen space, (b) generates filter weights for each of the "interior" samples based on the filter function, and (c) computes a weighted average of interior sample values for each pixel attribute (such as red, green, blue and alpha) using the filter weights.

The sample-to-pixel calculation unit may access samples from the sample buffer, perform a real-time filtering operation, and then provide the resulting output pixels to the display in real-time. The graphics system may operate without a conventional frame buffer. In other words, there may be no frame-oriented buffering of pixel data between the sample-to-pixel calculation units and the display. Note some displays may have internal frame buffers, but these are considered an integral part of the display device, not the graphics system. As used herein, the term "real-time" refers to an operation that is performed at or near the display device's refresh rate. For example, filtering samples "on-the-fly" means calculating output pixels at a rate high enough to support the refresh rate of a display device. The term "on-the-fly" refers to a process or operation that generates images at a rate near or above the minimum rate required for displayed motion to appear smooth (i.e. motion fusion) and/or for the light intensity to appear continuous (i.e. flicker fusion). These concepts are further described in the book "Spatial Vision" by Russel L. De Valois and Karen K. De Valois, Oxford University Press, 1988.

The filter weight assigned to each sample depends on the filter function being used and on the distance of the sample from the pixel center or the filter center. It is noted that the terms filter weight and filter coefficient are used interchangeably herein. For each pixel attribute (e.g. the red attribute), the pixel value (e.g. the red pixel value) is given by a weighted sum of the corresponding samples values (e.g. the red sample values) for samples falling within the filter support. If the filter weights are not pre-normalized to one, i.e. the sum of the coefficients used in each weighted sum does not equal one, then the weighted sums for the various pixel attributes may be divided by the sum of the filter weights. This sum of the filter weights is referred to herein as the normalization factor.

In cases where the filter function, the filter support, and the set of relative positions of samples with respect to the filter center remain constant from pixel to pixel (and thus, the filter coefficients remain constant), the normalization factor remains the same. In those cases, the normalization factor may be calculated once before the filtering process begins. The coefficients may be pre-normalized by dividing the original coefficients by the normalization factor to generate a set of normalized coefficients. Then, the normalized coefficients may be used in the filtering process for an array of pixels.

However, in many cases, the normalization factor may vary from pixel to pixel. For example, the filtering may take place over a region of non-uniform sample density or at the edges of the screen space. The size and/or shape of the filter support may change from one pixel to the next. The samples may be distributed in the screen space in a random fashion. Thus, the number of samples interior to the filter support and/or their relative positions with respect to the pixel center may vary from pixel to pixel. This implies that the normalization factor (i.e. the sum of the coefficients of the interior samples) varies from pixel to pixel.

In such cases, the normalization factor may be individually computed for each pixel, and instead of pre-normalizing the filter coefficients, the weighted sum (computed on the basis of the non-normalized coefficients) may be post-normalized. In other words, after generating a weighted sum for each attribute, each weighted sum may be divided by the normalization factor. In one embodiment, the computation of the normalization factor may be performed in parallel with the computation of one or more of the pixel attribute summations.

In one set of embodiments, one or more of the per-pixel summations (e.g. the coefficient summation and/or any combination of the attribute summations) may be performed by an adder tree. The adder tree may comprise a plurality of addition levels, and each addition level may include a set of adder cells. An adder cell may receive two input operands and generate one output operand. In one alternative embodiment, an adder cell may receive three input operands and generate two output operands.

The first addition layer may receive a set of numeric values which are to be summed. Each adder cell in the first layer may generate a sum of two (or three) of the numeric values and pass its output operand(s) to the second layer. Each adder cell in layers after the first and before the last layer may receive two (or three) output operands from the previous layer and pass its output operand(s) to the next layer. Thus, the final output from the last layer may represent a sum of all the numeric operands presented to the first layer. Registers may be placed after each adder cell in order to buffer the intermediate summation results.

In some embodiments, the adder tree is configured to add any desired subset of the input numeric values. Thus, in addition to the numeric values, the adder tree is configured to receive a set of data valid signals, i.e. one data valid signal for each numeric value. The data valid signal indicates whether the corresponding numeric value is to be included in the summation output from the adder tree. An adder cell may be configured to support such an adder tree as follows. The adder cell may receive two input operands $X_1$ and $X_2$, and two corresponding data valid inputs $DV_1$ and $DV_2$, and may generate a single output operand $X_{out}$. The adder cell output $X_{out}$ may equal zero, $X_1$, $X_2$ or the sum $X_1+X_2$ depending on the state of the data valid input signals. Namely, the output equals zero when both data valid inputs are low, equals $X_1$ when only data valid input $DV_1$ is high, equals $X_2$ when only data valid input $DV_2$ is high, and equals the sum when both data valid inputs are high. The adder cell may also generate a data valid output signal $DV_{out}$ to indicate to an adder cell of the next layer whether the operand output $X_{out}$ is "valid", i.e. to be incorporated in a further summation or ignored. Another embodiment of the adder cell contemplates use of a carry-save adder with three operand inputs and two operand outputs. Various embodiments of circuits (such as the adder cell) presented herein are described in terms of active high logic. However, it is understood that these circuit embodiments may be realized in terms of active low logic or a combination of active high logic and active low logic.

In one set of embodiments, the sample-to-pixel calculation unit may be configured to turn off sample filtering, and to generate pixel values based on a "winner take all" criterion. For example, the values of a current pixel may be determined by an identified sample or the first sample (in sequence order) in a memory bin corresponding to the current pixel. Alternatively, the values of the current pixel may be determined by the sample closest to the current filter center or pixel center as suggested by FIG. 31. The red, green, blue and alpha values of this closest sample are assigned as the values of the current pixel.

Previous generation video products have generated pixel values from 3D graphics primitive without intervening super-sampling and super-sample filtering. Thus, in order satisfy users/customers who want their displayed video output to have the same appearance as a previous generation video product, the sample-to-pixel calculation unit may be programmed to disable sample-filtering and enable winner-take-all sample selection.

As described above, an adder tree may be configured to perform an addition of any desired subset of its input numeric values based on the data valid signal inputs to the adder tree. In some embodiments, the adder tree also performs winner-take-all selection of a selected one of the input numeric values. Thus, in addition to data valid signals, the adder tree may receive a set of winner-take-all signals, one winner-take-all signal per input numeric value. In the preferred embodiment, at most one of the winner-take-all signals may be high. When a winner-take-all signal is high, the adder tree passes the corresponding input numeric value to the adder tree output. When all the winner-take-all signals are low, the adder tree generates a summation of those input numeric values having high data valid signals as described above.

Such an adder tree may be facilitated by an adder cell configured as follows. The adder cell may receive two input operands $X_1$ and $X_2$, two corresponding data valid input signals $DV_1$ and $DV_2$, and two corresponding winner-take-all input signals $WTA_1$ and $WTA_2$. The adder cell generates an output operand $X_{out}$. When both winner-take-all inputs signals are low, the output operand $X_{out}$ equals 0, $X_1$, $X_2$ or $X_1+X_2$ depending on the state of data valid bits as before. When winner-take-all signal $WTA_1$ is high and winner-take-all signal $WTA_2$ is low, the output operand equals $X_1$. When winner-take-all signal $WTA_2$ is high and winner-take-all signal $WTA_1$ is low, the output operand equals $X_2$. Furthermore, the adder cell may generate a data valid output signal $DV_{out}$ and a winner-take-all output signal $WTA_{out}$. The data valid output signal $DV_{out}$ indicates to an adder cell in the next layer whether or not the operand output $X_{out}$ is valid so far an inclusion in a further addition is concerned. The winner-take-all output signal $WTA_{out}$ indicates to the next-layer adder cell whether the output operand $X_{out}$ represents the winner of the winner-take-all process. Each adder cell in a given layer (after the first layer) may receive the operand output $X_{out}$, the data valid output $DV_{out}$ and the winner-take-all output $WTA_{out}$ from two adder cells from the previous layers. Thus, when one of numeric values presented to the first layer has a winner-take-all bit set, that numeric value propagates through each layer to the adder cell output. In one alternative embodiment, an adder cell may be modified to operate with a carry-save adder, and thus, to receive three operands inputs and generate two operand outputs.

Typically, a different summation may be loaded into the adder tree every n clock cycles. This period of time, i.e. the n clock cycles may be referred to as an adder cycle. In certain cases, however, for one or more adder cycles, no valid data may be introduced into the adder tree. For example, in cases where the rate of outputting pixels is much less than the native rate of the graphics system.

In cases where the filter support covers regions with two or more different sample densities, the samples from the lower density regions may contribute less to the final pixel value than the samples from the higher density region. This is because there are typically fewer samples in the lower density region. In one embodiment, the filter coefficients corresponding to samples from the lower sample density regions may be multiplied by a factor approximately equal to the ratio of the sample densities. This may provide more weight to the less-represented samples from the lower density region. In cases where the filter support may include more than two regions of different sample densities, filter coefficients for samples in other regions may also be multiplied by a factor equal to the ratio of the sample densities.

In another embodiment, as the sample density decreases, the extent (e.g., diameter) of the filter may be increased in order to keep the number of samples included in the filtering approximately constant. For example, in an embodiment where the filter is circularly symmetric, the square of the support diameter of the filter may be set to a value that is inversely proportional to the sample density in that region.

BRIEF DESCRIPTION OF THE DRAWINGS

The foregoing, as well as other objects, features, and advantages of this invention may be more completely understood by reference to the following detailed description when read together with the accompanying drawings in which:

FIG. 14 is a diagram illustrating details of one embodiment of a pixel convolution for an example set of samples;

FIGS. 18A–B are diagrams illustrating one embodiment of a graphics system configured to utilize input from an eye tracking or head tracking device;

FIG. 21 shows a set of equations that may be used by a sample-to-pixel calculation unit according to various embodiments of the filtering process;

FIG. 36 presents equations which may be used to compute a sample distance (or distance squared) with respect to a filter center.

Figure 1:
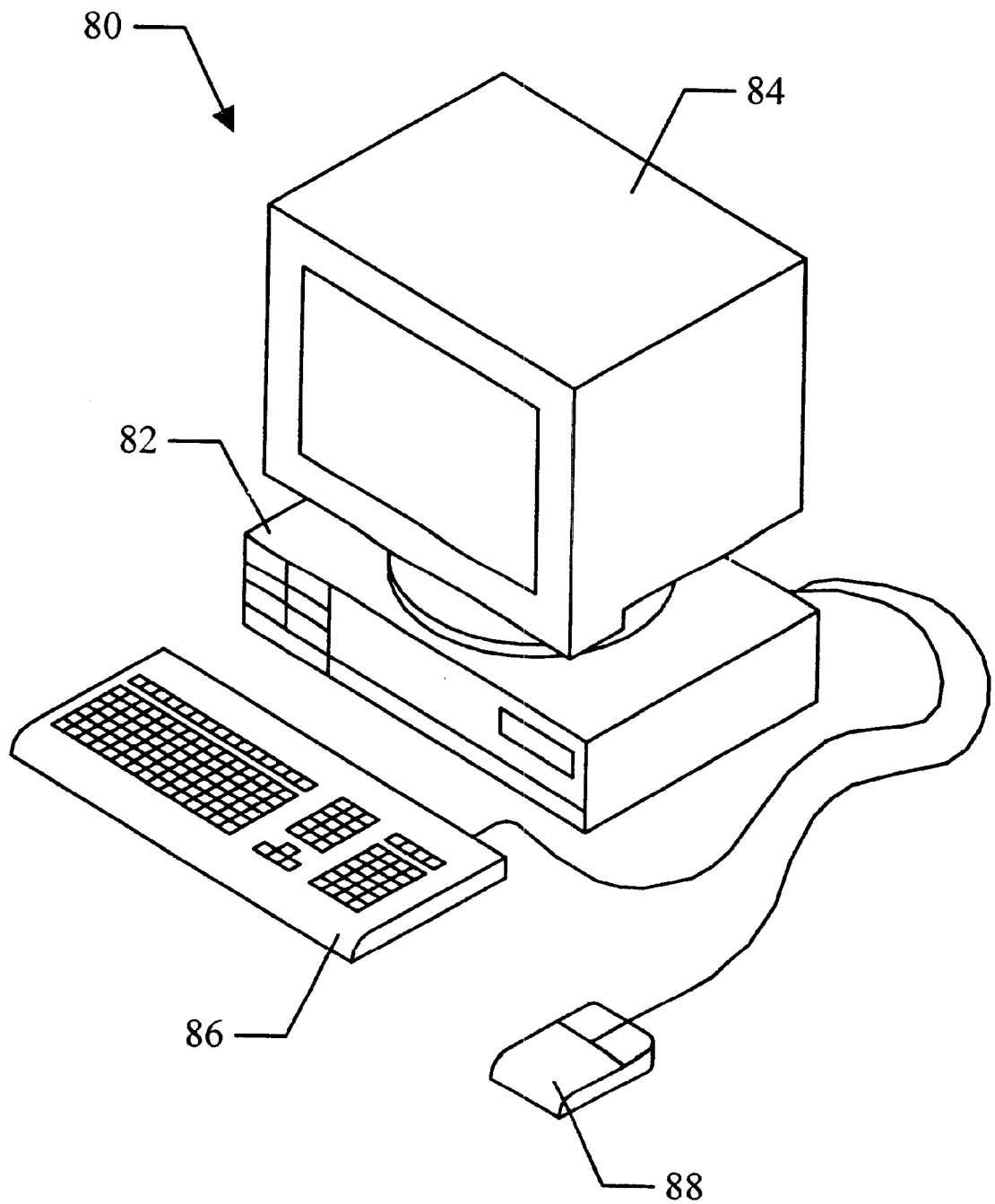
FIG. 1 illustrates one embodiment of a computer system that includes one embodiment of a graphics system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Please note that the headings are for organizational purposes only and are not meant to limit the description or claims. The word "may" is used in this application in a permissive sense (i.e., having the potential to, being able to), not a mandatory sense (i.e., must). Similarly, the word include, and derivations thereof, are used herein to mean "including, but not limited to."

DETAILED DESCRIPTION OF SEVERAL EMBODIMENTS

1. Computer System—FIG. 1

Referring now to FIG. 1, one embodiment of a computer system 80 that includes a three-dimensional (3-D) graphics system is shown. The 3-D graphics system may be comprised in any of various systems, including a computer system, network PC, Internet appliance, a television, including HDTV systems and interactive television systems, personal digital assistants (PDAs), wearable computers, and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, reflective liquid-crystal-on-silicon (LCOS), or gas-plasma display). Various input devices may be connected to the computer system, including a keyboard 86, a mouse 88 and/or other input devices (e.g., a trackball, digitizer, tablet, six-degree of freedom input device, head tracker, eye tracker, data glove and/or body sensors). Application software may be executed by the computer system 80 to display 3-D graphical objects on display device 84. As described further below, the 3-D graphics system in computer system 80 includes a super-sampled sample buffer with a programmable "on-the-fly" and "in-real-time" sample-to-pixel calculation unit to improve the quality and realism of images displayed on display device 84.

2. Computer System Block Diagram—FIG. 2

Figure 2:
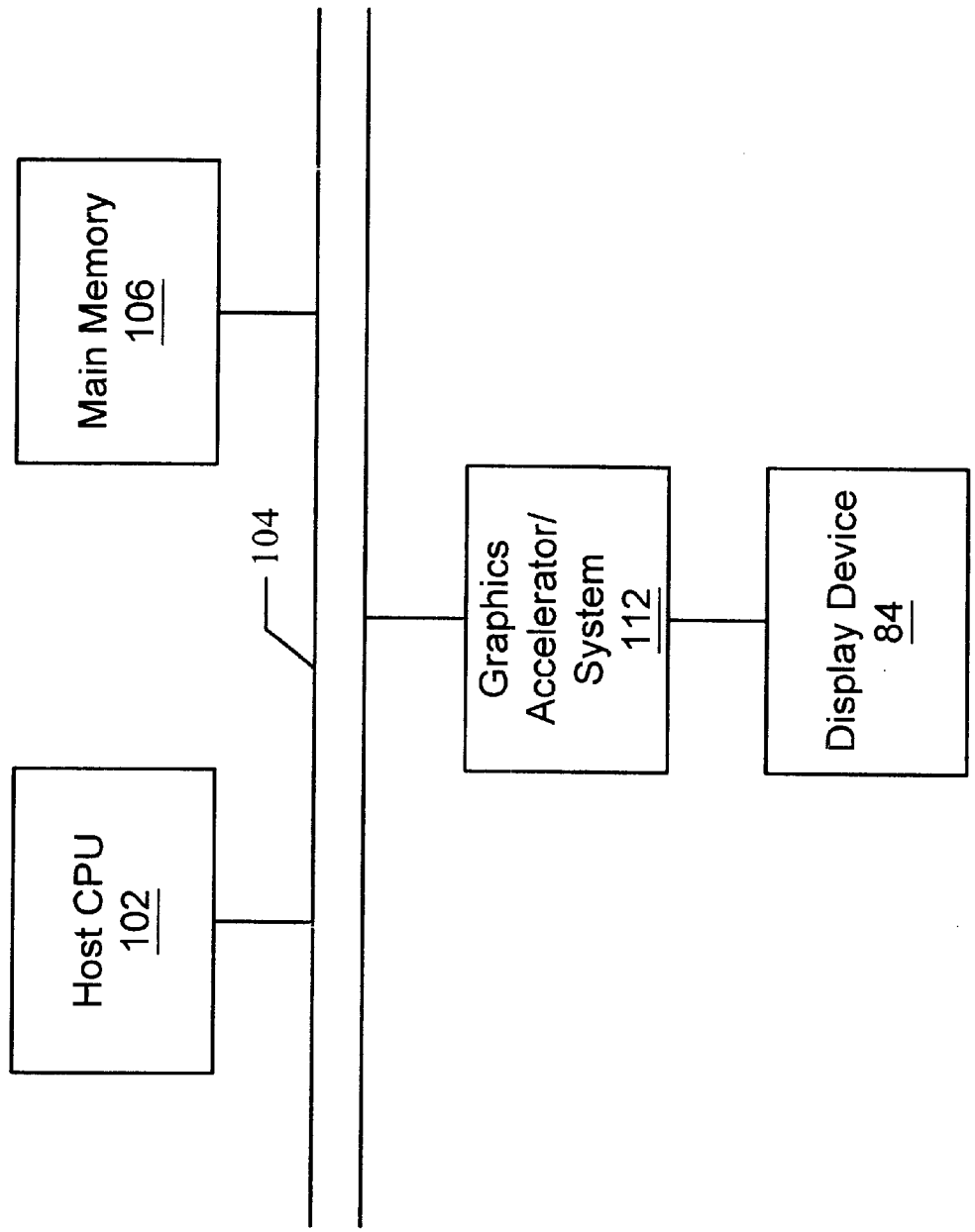
FIG. 2 is a simplified block diagram of the computer system of FIG. 1.

Referring now to FIG. 2, a simplified block diagram illustrating the computer system of FIG. 1 is shown. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs", synchronous dynamic random access memories or "SDRAMs", and Rambus dynamic access memories or "RDRAM", among others) and mass storage devices. The system bus or host bus 104 may comprise one or more communication or host computer buses (for communication between host processors, CPUs, and memory subsystems) as well as specialized subsystem buses.

A 3-D graphics system 112 according to the present invention is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the 3-D graphics system may be coupled to one or more of the buses in computer system 80 and/or may be coupled to various types of buses. In addition, the 3D graphics system may be coupled to a communication port and thereby directly receive graphics data from an external source, e.g., the Internet or a network. As shown in the figure, display device 84 is connected to the 3-D graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL® or Java 3D™ may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer these graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

As will be described below, graphics system 112 may be configured to allow more efficient microcode control, which results in increased performance for handling of incoming color values corresponding to the polygons generated by host processor 102. Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module.

3. Graphics System—FIG. 3

Figures 3, 3A:
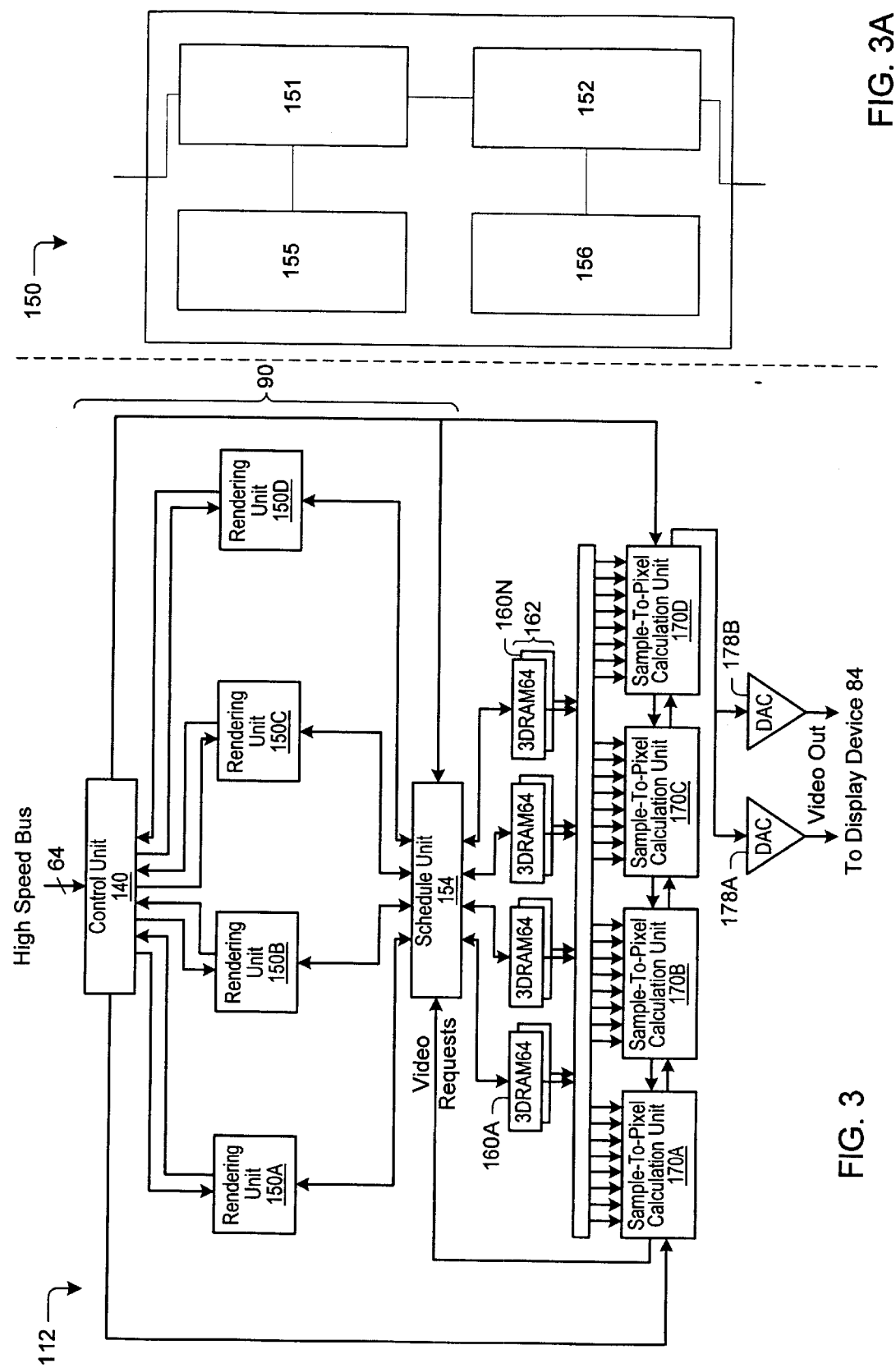
FIG. 3 is a block diagram illustrating more details of one embodiment of the graphics system of FIG. 1.

Referring now to FIG. 3, a block diagram illustrating details of one embodiment of graphics system 112 is shown. As shown in the figure, graphics system 112 may comprise one or more graphics processors 90, one or more super-sampled sample buffers 162, and one or more sample-to-pixel calculation units 170A–D. Graphics system 112 may also comprise one or more digital-to-analog converters (DACs) 178A–B. Graphics processor 90 may be any suitable type of high performance processor (e.g., specialized graphics processors or calculation units, multimedia processors, DSPs, or general purpose processors). In one embodiment, graphics processor 90 may comprise one or more rendering units 150A–D. In the embodiment shown, however, graphics processor 90 also comprises one or more control units 140, and one or more schedule units 154. Sample buffer 162 may comprises one or more sample memories 160A–160N as shown in the figure.

A. Control Unit

Control unit 140 operates as the interface between graphics system 112 and computer system 80 by controlling the transfer of data between graphics system 112 and computer system 80. In embodiments of graphics system 112 that comprise two or more rendering units 150A–D, control unit 140 may also divide the stream of data received from computer system 80 into a corresponding number of parallel streams that are routed to the individual rendering units 150A–D. The graphics data may be received from computer system 80 in a compressed form. In one embodiment, control unit 140 may be configured to split and route the data stream to rendering units 150A–D in compressed form.

The graphics data may comprise one or more graphics primitives. As used herein, the term graphics primitive includes polygons, parametric surfaces, splines, NURBS (non-uniform rational B-splines), sub-divisions surfaces, fractals, volume primitives, and particle systems. These graphics primitives are described in detail in the text book entitled "Computer Graphics: Principles and Practice" by James D. Foley, et al., published by Addison-Wesley Publishing Co., Inc., 1996. Note polygons are referred to throughout this detailed description for simplicity, but the embodiments and examples described may also be used with graphics data comprising other types of graphics primitives.

B. Rendering Units

Rendering units 150A–D (also referred to herein as draw units) are configured to receive graphics instructions and data from control unit 140 and then perform a number of functions, depending upon the exact implementation. For example, rendering units 150A–D may be configured to perform decompression (if the data is compressed), transformation, clipping, lighting, texturing, depth cueing, transparency processing, set-up, and screen space rendering of various graphics primitives occurring within the graphics data. Each of these features is described separately below. In one embodiment, rendering units 150 may comprise first rendering unit 151 and second rendering unit 152. First rendering unit 151 may be configured to perform decompression (for compressed graphics data), format conversion, transformation and lighting. Second rendering unit 152 may be configured to perform screen space setup, screen space rasterization, and sample rendering. In one embodiment, first rendering unit 151 may be coupled to first data memory 155, and second data memory 152 second data memory 156. First data memory 155 may comprise SDRAM, and second data memory 156 may comprise RDRAM. In one embodiment, first rendering unit 151 may be a processor such as a high-performance DSP (digital signal processing)

type core, or other high performance arithmetic processor (e.g., a processor with one or more a hardware multiplier and adder trees). Second rendering unit 152 may be a dedicated high speed ASIC (Application Specific Integrated Circuits) chip.

Depending upon the type of compressed graphics data received, rendering units 150A–D may be configured to perform arithmetic decoding, run-length decoding, Huffman decoding, and dictionary decoding (e.g., LZ77, LZSS, LZ78, and LZW). In another embodiment, rendering units 150A–D may be configured to decode graphics data that has been compressed using geometric compression. Geometric compression of 3D graphics data may achieve significant reductions in data size while retaining most of the image quality. Two methods for compressing and decompressing 3D geometry are described in U.S. Pat. No. 5,793,371, application Ser. No. 08/511,294, filed on Aug. 4, 1995, entitled "Method And Apparatus For Geometric Compression Of Three-Dimensional Graphics Data," Attorney Docket No. 5181-05900, and U.S. patent application Ser. No. 09/095,777, filed on Jun. 11, 1998, entitled "Compression of Three-Dimensional Geometry Data Representing a Regularly Tiled Surface Portion of a Graphical Object," Attorney Docket No. 5181-06602.

In embodiments of graphics system 112 that support decompression, the graphics data received by each rendering unit 150 is decompressed into one or more graphics "primitives" which may then be rendered. The term primitive refers to components of objects that define its shape (e.g., points, lines, triangles, polygons in two or three dimensions, polyhedra, or free-form surfaces in three dimensions). Rendering units 150 may be any suitable type of high performance processor (e.g., specialized graphics processors or calculation units, multimedia processors, DSPs, or general purpose processors).

Transformation refers to manipulating an object and includes translating the object (i.e., moving the object to a different location), scaling the object (i.e., stretching or shrinking), and rotating the object (e.g., in three-dimensional space, or "3-space").

Lighting refers to calculating the illumination of the objects within the displayed image to determine what color and or brightness each individual object will have. Depending upon the shading algorithm being used (e.g., constant, Gouraud, or Phong), lighting may be evaluated at a number of different locations. For example, if constant shading is used (i.e., each pixel of a polygon has the same lighting), then the lighting need only be calculated once per polygon. If Gouraud shading is used, then the lighting is calculated once per vertex. Phong shading calculates the lighting on a per-pixel basis.

Clipping refers to the elimination of graphics primitives or portions of graphics primitives that lie outside of a 3-D view volume in world space. The 3-D view volume may represent that portion of world space that is visible to a virtual observer situated in world space. For example, the view volume may be a solid truncated pyramid generated by a 2-D view window and a viewpoint located in world space. The solid truncated pyramid may be imagined as the union of all rays emanating from the viewpoint and passing through the view window. The viewpoint may represent the world space location of the virtual observer. Primitives or portions of primitives that lie outside the 3-D view volume are not currently visible and may be eliminated from further processing. Primitives or portions of primitives that lie inside the 3-D view volume are candidates for projection onto the 2-D view window.

In order to simplify the clipping and projection computations, primitives may be transformed into a second, more convenient, coordinate system referred to herein as the viewport coordinate system. In viewport coordinates, the view volume maps to a canonical 3-D viewport that may be more convenient for clipping against.

Generally, set-up refers to computations necessary to prepare for sample value computations (e.g., calculating triangle edge slopes and/or coefficients for triangle plane equations and initial pixel positions).

Graphics primitives or portions of primitives that survive the clipping computation may be projected onto a 2-D viewport depending on the results of a visibility determination. Instead of clipping in 3-D, graphics primitives may be projected onto a 2-D view plane (which includes the 2-D viewport) and then clipped with respect to the 2-D viewport.

Screen-space rendering refers to the calculations performed to actually calculate the data used to generate each pixel that will be displayed. In prior art systems, each pixel is calculated and then stored in a frame buffer. The contents of the frame buffer are then output to the display device to create the final image. In the embodiment of graphics system 112 shown in the figure, however, rendering units 150A–D calculate "samples" instead of actual pixel data. This allows rendering units 150A–D to "super-sample" or calculate more than one sample per pixel. Super-sampling is described in greater detail below. The rendering units 150A–D may also generate a greater area of samples than the viewable area of the display 84 for various effects such as panning and zooming. Note that rendering units 150A–B may comprise a number of smaller functional units, e.g., a separate set-up/decompress unit and a lighting unit.

More details on super-sampling are discussed in the following books:

"Principles of Digital Image Synthesis" by Andrew Glassner, 1995, Morgan Kaufman Publishing (Volume 1);

"The Renderman Companion" by Steve Upstill, 1990, Addison Wesley Publishing;

"Advanced Renderman: Beyond the Companion" by Anthony A. Apodaca et al.; and

"Advanced Renderman: Creating Cgi for Motion Pictures (Computer Graphics and Geometric Modeling)" by Anthony A. Apodaca and Larry Gritz, Morgan Kaufmann Publishers; ISBN: 1558606181.

C. Data Memories Each rendering unit 150A–D may comprise two sets of instruction and data memories 155 and 156. In one embodiment, data memories 155 and 156 may be configured to store both data and instructions for rendering units 150A–D. While implementations may vary, in one embodiment data memories 155 and 156 may comprise two 8 MByte SDRAMs providing 16 MBytes of storage for each rendering unit 150A–D. Data memories 155 and 156 may also comprise RDRAMs (Rambus DRAMs). In one embodiment, RDRAMs may be used to support the decompression and setup operations of each rendering unit, while SDRAMs may be used to support the draw functions of rendering units 150A–D.

D. Schedule Unit

Schedule unit 154 may be coupled between the rendering units 150A–D and the sample memories 160A–N. Schedule unit 154 is configured to sequence the completed samples and store them in sample memories 160A–N. Note in larger configurations, multiple schedule units 154 may be used in parallel. In one embodiment, schedule unit 154 may be implemented as a crossbar switch.

E. Sample Memories

Super-sampled sample buffer 162 comprises sample memories 160A–160N, which are configured to store the plurality of samples generated by the rendering units. As used herein, the term "sample buffer" refers to one or more memories which store samples. As previously noted, one or more samples are filtered to form output pixels (i.e., pixels to be displayed on a display device). The number of samples stored may be greater than, equal to, or less than the total number of pixels output to the display device to refresh a single frame. Each sample may correspond to one or more output pixels. As used herein, a sample "corresponds" to an output pixel when the sample's information contributes to final output value of the pixel. Note, however, that some samples may contribute zero to their corresponding output pixel after filtering takes place.

Stated another way, the sample buffer stores a plurality of samples that have positions that correspond to locations in screen space on the display, i.e., the samples contribute to one or more output pixels on the display. The number of stored samples may be greater than the number of pixel locations, and more than one sample may be combined in the convolution (filtering) process to generate a particular output pixel displayed on the display device. Any given sample may contribute to one or more output pixels.

Sample memories 160A–160N may comprise any of a number of different types of memories (e.g., SDRAMs, SRAMs, RDRAMs, 3DRAMs, or next-generation 3DRAMs) in varying sizes. In one embodiment, each schedule unit 154 is coupled to four banks of sample memories, wherein each bank comprises four 3DRAM-64 memories. Together, the 3DRAM-64 memories may form a 116-bit deep super-sampled sample buffer that stores multiple samples per pixel. For example, in one embodiment, each sample memory 160A–160N may store up to sixteen samples per pixel.

3DRAM-64 memories are specialized memories configured to support full internal double buffering with single buffered Z in one chip. The double buffered portion comprises two RGBX buffers, wherein X is a fourth channel that can be used to store other information (e.g., alpha). 3DRAM-64 memories also have a lookup table that takes in window ID information and controls an internal 2-1 or 3-1 multiplexer that selects which buffer's contents will be output. 3DRAM-64 memories are next-generation 3DRAM memories that may soon be available from Mitsubishi Electric Corporation's Semiconductor Group. In one embodiment, four chips used in combination are sufficient to create a double-buffered 1280×1024 super-sampled sample buffer. Since the memories are internally double-buffered, the input pins for each of the two frame buffers in the double-buffered system are time multiplexed (using multiplexers within the memories). The output pins may similarly be time multiplexed. This allows reduced pin count while still providing the benefits of double buffering. 3DRAM-64 memories further reduce pin count by not having z output pins. Since z comparison and memory buffer selection is dealt with internally, this may simplify sample buffer 162 (e.g., using less or no selection logic on the output side). Use of 3DRAM-64 also reduces memory bandwidth since information may be written into the memory without the traditional process of reading data out, performing a z comparison or blending operation, and then writing data back in. Instead, the data may be simply written into the 3DRAM-64, with the memory performing the steps described above internally.

However, in other embodiments of graphics system 112, other memories (e.g., SDRAMs, SRAMs, RDRAMs, or current generation 3DRAMs) may be used to form sample buffer 162.

Graphics processor 90 may be configured to generate a plurality of sample positions according to a particular sample positioning scheme (e.g., a regular grid or a perturbed regular grid). Alternatively, the sample positions (or offsets that are added to regular grid positions to form the sample positions) may be read from a sample position memory (e.g., a RAM/ROM table). Upon receiving a polygon (e.g. a triangle) that is to be rendered, graphics processor 90 determines which samples fall within the polygon based upon the sample positions. Graphics processor 90 renders the samples that fall within the polygon and stores rendered samples in sample memories 160A–N. Note as used herein the terms render and draw are used interchangeably and refer to calculating color values for samples. Depth values, alpha values, and other per-sample values may also be calculated in the rendering or drawing process.

F. Sample-to-pixel Calculation Units

Sample-to-pixel calculation units 170A–D may be coupled between sample memories 160A–N and DACs 178A–B. Sample-to-pixel calculation units 170A–D are configured to read selected samples from sample memories 160A–N and then perform a convolution (e.g., a filtering and weighting function or a low pass filter) on the samples to generate the output pixel values which are output to DACs 178A–B. The sample-to-pixel calculation units 170A–D may be programmable to allow them to perform different filter functions at different times, depending upon the type of output desired. In one embodiment, sample-to-pixel calculation units 170A–D may implement a filter to convert the super-sampled sample buffer data (stored in sample memories 160A–N) to single pixel values. The filter may cover a 5×5 support in the sample buffer (i.e. five pixel units horizontally and vertically). In other embodiments, calculation units 170A–D may filter a selected number of samples to calculate an output pixel. The filtered samples may be multiplied by a variable weighting factor that gives a variable weight to samples based on the sample's position relative to the center of the pixel being calculated. Any of a variety of filters may be used either alone or in combination, e.g., the box filter, the tent filter, the cone filter, the cylinder filter, the Gaussian filter, the Catmull-Rom filter, the Mitchell-Netravali filter, the windowed sinc filter, or in general, any form of bandpass filter or any of various approximations to the sinc filter.

Sample-to-pixel calculation units 170A–D may be implemented with ASICs (Application Specific Integrated Circuits), or with a high-performance DSP (digital signal processing) type core, or other high performance arithmetic processor (e.g., a processor with one or more hardware multipliers and adder trees). Sample-to-pixel calculation units 170A–D may also be configured with one or more of the following features: color look-up using pseudo color tables, direct color, inverse gamma correction, programmable gamma corrections, color space conversion and conversion of pixels to non-linear light space. Other features of sample-to-pixel calculation units 170A–D may include programmable video timing generators, programmable pixel clock synthesizers, cursor generators, and crossbar functions. Once the sample-to-pixel calculation units have manipulated the timing and color of each pixel, the pixels are output to DACs 178A–B.

G. DACs

DACs 178A–B operate as the final output stage of graphics system 112. The DACs 178A–B serve to translate the digital pixel data received from the sample-to-pixel calculation units 170 into analog video signals that are then sent to the display device. Note in one embodiment DACs 178A–B may be bypassed or omitted completely in order to output digital pixel data in lieu of analog video signals. This may be useful when display device 84 is based on a digital technology (e.g., an LCD-type display or a digital micromirror display).

4. Super-Sampling—FIGS. 4–5

Figure 4:
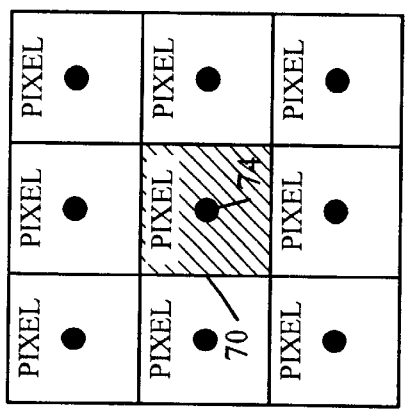
FIG. 4 is diagram illustrating a non-supersampled pixel calculation.

Turning now to FIG. 4, an example of traditional, non-super-sampled pixel value calculation is illustrated. Each pixel has exactly one data point calculated for it, and the single data point is located at the center of the pixel. For example, only one data point (i.e., sample 74) contributes to value of pixel 70.

Figure 5B:
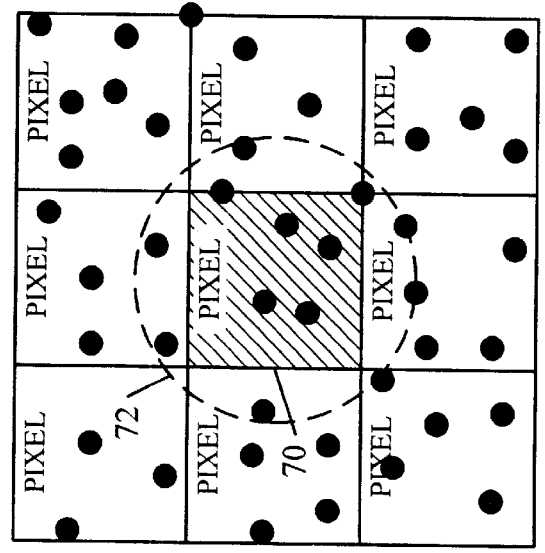
FIG. 5B is diagram illustrating a random distribution of samples.
Figure 5A:
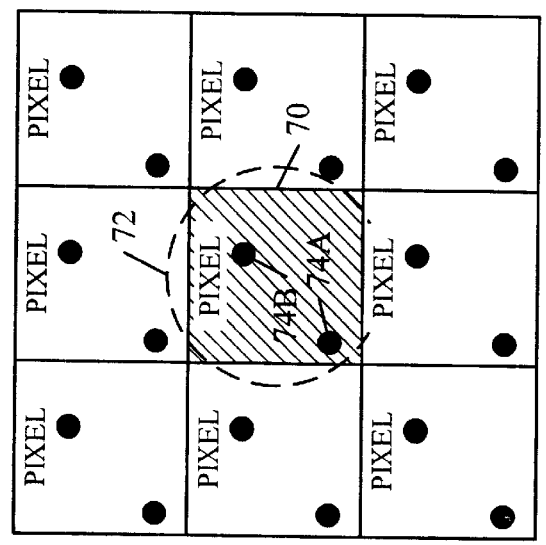
FIG. 5A is diagram illustrating one embodiment of super-sampling.

Turning now to FIG. 5A, an example of one embodiment of super-sampling is illustrated. In this embodiment, a number of samples are calculated. The number of samples may be related to the number of pixels or completely independent of the number of pixels. In this example, there are 18 samples distributed in a regular grid across nine pixels. Even with all the samples present in the figure, a simple one to one correlation could be made (e.g., by throwing out all but the sample nearest to the center of each pixel). However, the more interesting case is performing a filtering function on multiple samples to determine the final pixel values. Also, as noted above, a single sample can be used to generate a plurality of output pixels, i.e., sub-sampling.

A circular filter 72 is illustrated in the figure. In this example, samples 74A–B both contribute to the final value of pixel 70. This filtering process may advantageously improve the realism of the image displayed by smoothing abrupt edges in the displayed image (i.e., performing anti-aliasing). Filter 72 may simply average samples 74A–B to form the final value of output pixel 70, or it may increase the contribution of sample 74B (at the center of pixel 70) and diminish the contribution of sample 74A (i.e., the sample farther away from the center of pixel 70). Circular filter 72 is repositioned for each output pixel being calculated so the center of filter 72 coincides with the center position of the pixel being calculated. Other filters and filter positioning schemes are also possible and contemplated.

Turning now to FIG. 5B, another embodiment of super-sampling is illustrated. In this embodiment, however, the samples are positioned randomly. More specifically, different sample positions are selected and provided to graphics processor 90 (and render units 150A–D), which calculate color information to form samples at these different locations. Thus the number of samples falling within filter 72 may vary from pixel to pixel.

5. Super-Sampled Sample Buffer with Real-Time Convolution—FIGS. 6–13

Figure 6:
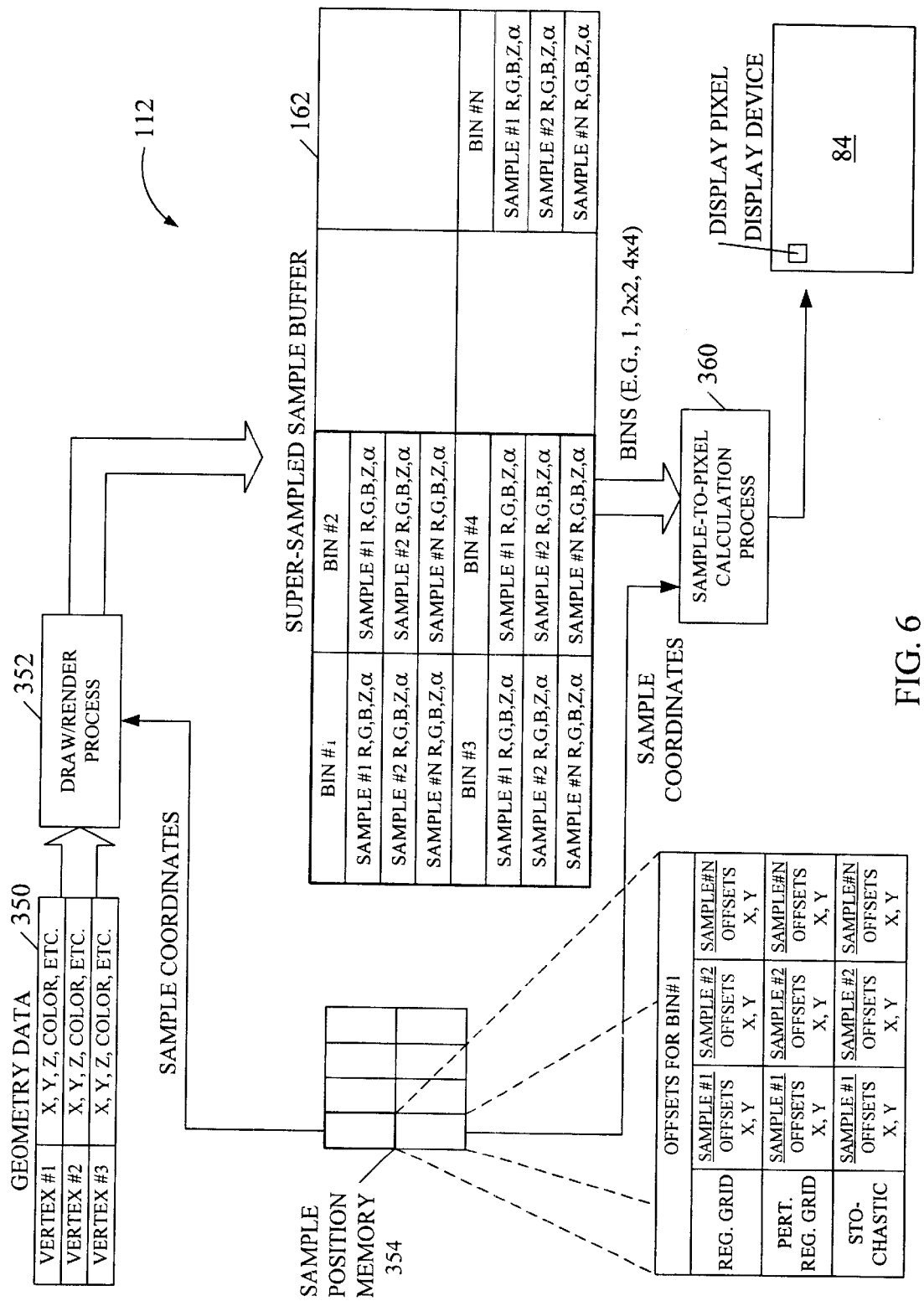
FIG. 6 is a diagram illustrating details of one embodiment of a graphics system having one embodiment of a variable resolution super-sampled sample buffer.

Turning now to FIG. 6, a diagram illustrating one possible configuration for the flow of data through one embodiment of graphics system 112 is shown. As the figure shows, geometry data 350 is received by graphics system 112 and used to perform draw process 352. The draw process 352 is implemented by one or more of control unit 140, rendering units 150, memories 152, and schedule unit 154. Geometry data 350 comprises data for one or more polygons. Each polygon comprises a plurality of vertices (e.g., three vertices in the case of a triangle), some of which may be shared. Data such as x, y, and z coordinates, color data, lighting data and texture map information may be included for each vertex.

In addition to the vertex data, draw process 352 (which may be performed by rendering units 150A–D) also receives sample coordinates from a sample position memory 354. In one embodiment, position memory 354 is embodied within rendering units 150A–D. In another embodiment, position memory 354 may be realized as part of the texture and render data memories, or as a separate memory. Sample position memory 354 is configured to store position information for samples that are calculated in draw process 352 and then stored into super-sampled sample buffer 162. In one embodiment, position memory 354 may be configured to store entire sample addresses. However, this may involve increasing the size of position memory 354. Alternatively, position memory 354 may be configured to store only x- and y-offsets for the samples. Storing only the offsets may use less storage space than storing each sample's entire position. The offsets may be relative to bin coordinates or relative to positions on a regular grid. The sample position information stored in sample position memory 354 may be read by a dedicated sample position calculation unit (not shown) and processed to calculate example sample positions for graphics processor 90. More detailed information on sample position offsets is included below (see description of FIGS. 9 and 10).

In another embodiment, sample position memory 354 may be configured to store a table of random numbers. Sample position memory 354 may also comprise dedicated hardware to generate one or more different types of regular grids. This hardware may be programmable. The stored random numbers may be added as offsets to the regular grid positions generated by the hardware. In one embodiment, the sample position memory may be programmable to access or "unfold" the random number table in a number of different ways. This may allow a smaller table to be used without visual artifacts caused by repeating sample position offsets. In one embodiment, the random numbers may be repeatable, thereby allowing draw process 352 and sample-to-pixel calculation process 360 to utilize the same offset for the same sample without necessarily storing each offset.

As shown in the figure, sample position memory 354 may be configured to store sample offsets generated according to a number of different schemes such as a regular square grid, a regular hexagonal grid, a perturbed regular grid, or a random (stochastic) distribution. Graphics system 112 may receive an indication from the operating system, device driver, or the geometry data 350 that indicates which type of sample positioning scheme is to be used. Thus the sample position memory 354 is configurable or programmable to generate position information according to one or more different schemes. More detailed information on several sample position schemes are described further below (see description of FIG. 8).

In one embodiment, sample position memory 354 may comprise a RAM/ROM that contains stochastic sample points (or locations) for different total sample counts per bin. As used herein, the term "bin" refers to a region or area in screen-space and contains however many samples are in that area (e.g., the bin may be 1×1 pixels in area, 2×2 pixels in area, or more generally, $M_p \times N_p$ pixels in area where $M_p$ and $N_p$ are positive integer values). The use of bins may simplify the storage and access of samples in sample buffer 162. A number of different bin sizes may be used (e.g., one sample per bin, four samples per bin, or more generally, $N_s$ samples per bin where $N_s$ is a positive integer). In the preferred embodiment, each bin has an xy-position that corresponds to a particular location on the display. The bins are preferably regularly spaced. In this embodiment the bins' xy-positions may be determined from the bin's storage location within sample buffer 162. The bins' positions correspond to particular positions on the display. In some embodiments, the bin positions may correspond to pixel centers, while in other embodiments the bin positions correspond to points that are located between pixel centers. The specific position of each sample within a bin may be determined by looking up the sample's offset in the RAM/ROM table (the offsets may be stored relative to the corresponding bin position). However, depending upon the implementation, not all bin sizes may have a unique RAM/ROM entry. Some bin sizes may simply read a subset of the larger bin sizes' entries. In one embodiment, each supported size has at least four different sample position scheme variants, which may reduce final image artifacts due to repeating sample positions.

In one embodiment, position memory 354 may store pairs of 8-bit numbers, each pair comprising an x-offset and a y-offset (other possible offsets are also possible, e.g., a time offset and/or a z-offset). When added to a bin position, each pair defines a particular position in screen space. The term "screen space" refers generally to the coordinate system of the display device. To improve read times, memory 354 may be constructed in a wide/parallel manner so as to allow the memory to output more than one sample location per clock cycle.

Once the sample positions have been read from sample position memory 354, draw process 352 selects the sample positions that fall within the polygon currently being rendered. Draw process 352 then calculates the z and color information (which may include alpha, other depth of field information values, or other values) for each of these samples and stores the data into sample buffer 162. In one embodiment, the sample buffer may only single-buffer z values (and perhaps alpha values) while double buffering other sample components such as color. Unlike prior art systems, graphics system 112 may double buffer all samples (although not all sample components may be double-buffered, i.e., the samples may have components that are not double-buffered, or not all samples may be double-buffered). In one embodiment, the samples are stored into sample buffer 162 in bins. In some embodiments, the size of bins, i.e., the quantity of samples within a bin, may vary from frame to frame and may also vary across different regions of display device 84 within a single frame. For example, bins along the edges of display device may comprise only one sample, while bins corresponding to pixels near the center of display device 84 may comprise sixteen samples. Note the area of bins may vary from region to region. The use of bins will be described in greater detail below in connection with FIGS. 11A–C.

In parallel and independently of draw process 352, filter process 360 is configured to read samples from sample buffer 162, filter (i.e., filter) them, and then output the resulting output pixel to display device 84. Sample-to-pixel calculation units 170 implement filter process 380. Thus, for at least a subset of the output pixels, the filter process is operable to filter a plurality of samples to produce a respective output pixel. In one embodiment, filter process 360 is configured to:

(i) determine the distance of each sample from the center of the output pixel being filtered;
(ii) multiply the sample's components (e.g., red, green, blue and alpha) with a filter value that is a specific (programmable) function of the distance;
(iii) generate a summation of the weighted sample components for each attribute (e.g. one summation for each of red, green, blue, alpha); and
(iv) normalize each attribute summation, if necessary, by dividing each summation by the sum of the filter coefficients used to generate the weighted sample components.

The filter process 360 is described in greater detail below (see description accompanying FIGS. 11, 12, and 14). Note the extent of the filter need not be circular (i.e., it may be a function of x and y instead of the distance), but even if the extent is circular, the filter need not be circularly symmetrical. The filter's "extent" is the area within which samples can influence the particular pixel being calculated with the filter.

Figure 7:
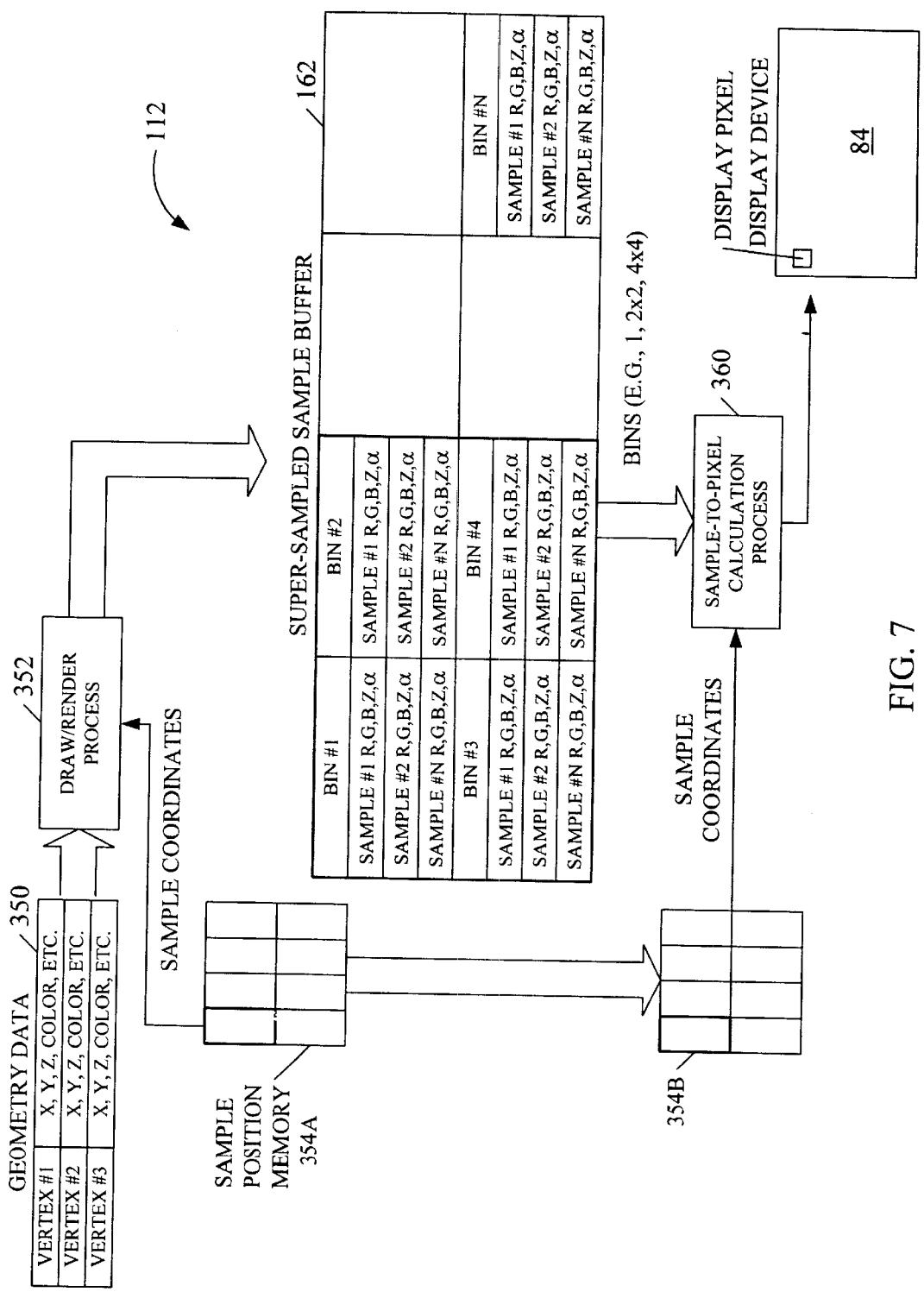
FIG. 7 is a diagram illustrating details of another embodiment of a graphics system having one embodiment of a variable resolution super-sampled sample buffer.

Turning now to FIG. 7, a diagram illustrating an alternate embodiment of graphics system 112 is shown. In this embodiment, two or more sample position memories 354A and 354B are utilized. Thus, the sample position memories 354A–B are essentially double-buffered. If the sample positions are kept the same from frame to frame, then the sample positions may be single buffered. However, if the sample positions may vary from frame to frame, then graphics system 112 may be advantageously configured to double-buffer the sample positions. The sample positions may be double buffered on the rendering side (i.e., memory 354A may be double buffered) and or the filter/convolve side (i.e., memory 354B may be double buffered). Other combinations are also possible. For example, memory 354A may be single-buffered, while memory 354B is doubled buffered. This configuration may allow one side of memory 354B to be used for refreshing (i.e., by filter/convolve process 360) while the other side of memory 354B is being updated. In this configuration, graphics system 112 may change sample position schemes on a per-frame basis by shifting the sample positions (or offsets) from memory 354A to double-buffered memory 354B as each frame is rendered. Thus, the positions used to calculate the samples (read from memory 354A) are copied to memory 354B for use during the filtering process (i.e., the sample-to-pixel conversion process). Once the position information has been copied to memory 354B, position memory 354A may then be loaded with new sample position offsets to be used for the second frame to be rendered. In this way the sample position information follows the samples from the draw/render process to the filter process.

Yet another alternative embodiment may store tags to offsets with the samples themselves in super-sampled sample buffer 162. These tags may be used to look-up the offset/perturbation associated with each particular sample.

6. Sample Positioning Schemes

Figure 8:
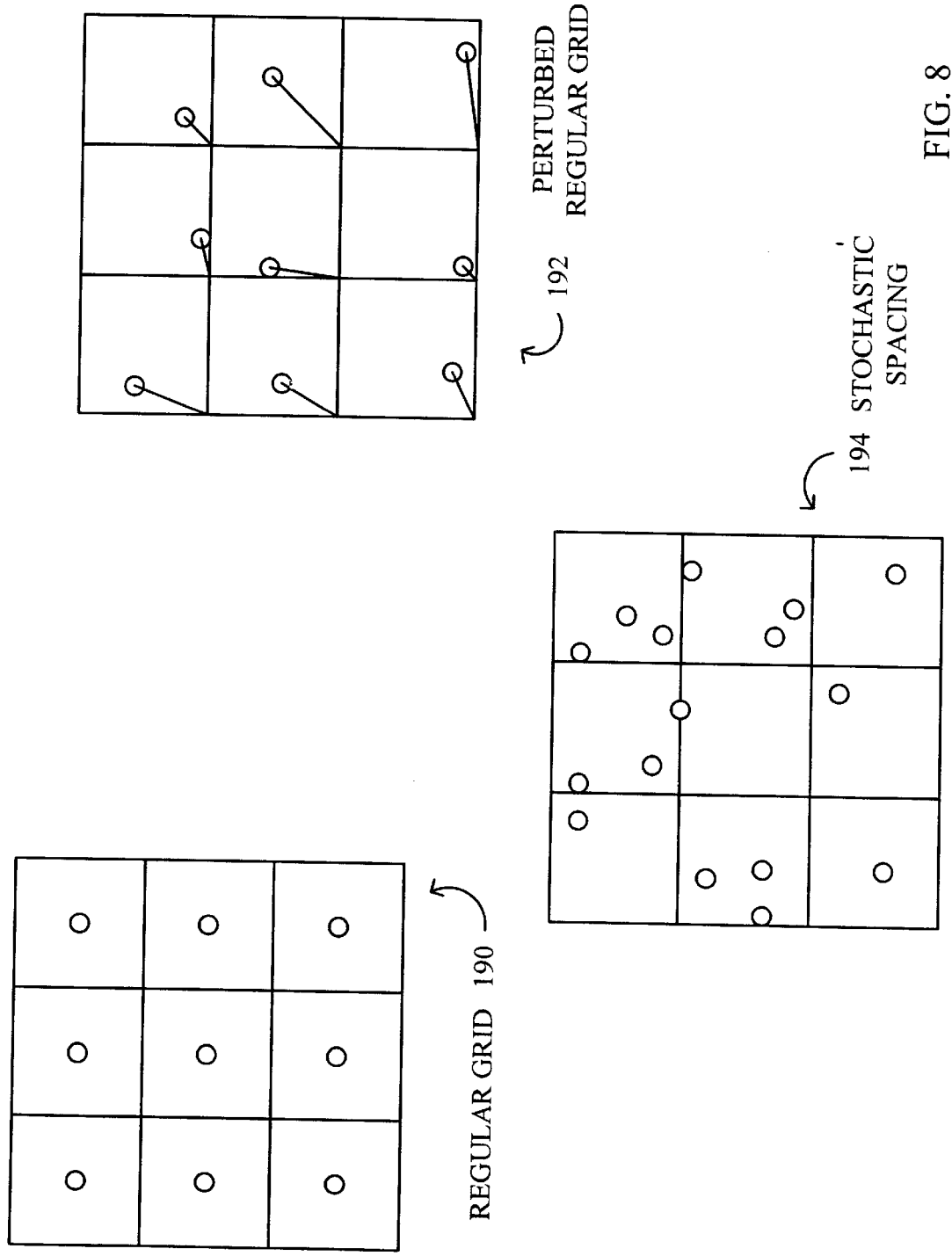
FIG. 8 is a diagram illustrating details of three different embodiments of sample positioning schemes.

FIG. 8 illustrates a number of different sample positioning schemes. In regular grid positioning scheme 190, each sample is positioned at an intersection of a regularly-spaced grid. Note however, that as used herein the term "regular grid" is not limited to square grids. Other types of grids are also considered "regular" as the term is used herein, including, but not limited to, rectangular grids, hexagonal grids, triangular grids, logarithmic grids, and semi-regular lattices such as Penrose tiling.

Perturbed regular grid positioning scheme 192 is based upon the previous definition of a regular grid. However, the samples in perturbed regular grid scheme 192 may be offset from their corresponding grid intersection. In one embodiment, the samples may be offset by a random angle (e.g., from 0° to 360°) and a random distance, or by random x and y offsets, which may or may not be limited to a predetermined range. The offsets may be generated in a number of ways, e.g., by hardware based upon a small number of seeds, looked up from a table, or by using a pseudo-random function. Once again, perturbed regular gird scheme 192 may be based on any type of regular grid (e.g., square, or hexagonal). A rectangular or hexagonal perturbed grid may be particularly desirable due to the geometric properties of these grid types.

Stochastic sample positioning scheme 194 represents a third potential type of scheme for positioning samples.

Stochastic sample positioning involves randomly distributing the samples across a region (e.g., the displayed region on a display device or a particular window). Random positioning of samples may be accomplished through a number of different methods, e.g., using a random number generator such as an internal clock to generate pseudo-random numbers. Random numbers or positions may also be pre-calculated and stored in memory.

Figure 9:
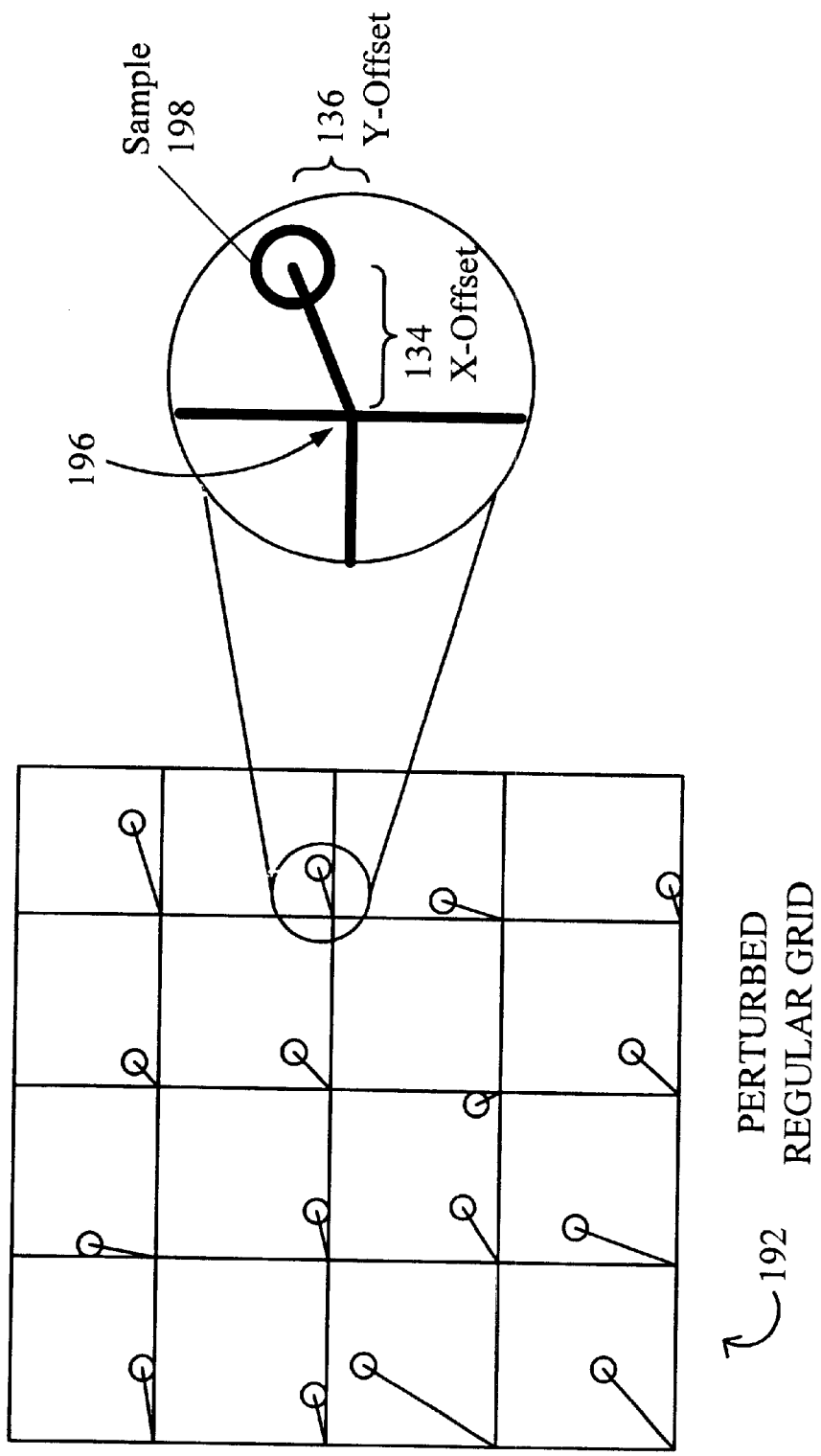
FIG. 9 is a diagram illustrating details of one embodiment of a sample positioning scheme.

Turning now to FIG. 9, details of one embodiment of perturbed regular grid scheme 192 are shown. In this embodiment, samples are randomly offset from a regular square grid by x- and y-offsets. As the enlarged area shows, sample 198 has an x-offset 134 that specifies its horizontal displacement from its corresponding grid intersection point 196. Similarly, sample 198 also has a y-offset 136 that specifies its vertical displacement from grid intersection point 196. The random offset may also be specified by an angle and distance. As with the previously disclosed embodiment that utilized angles and distances, x-offset 134 and y-offset 136 may be limited to a particular minimum and or maximum value or range of values.

Figure 10:
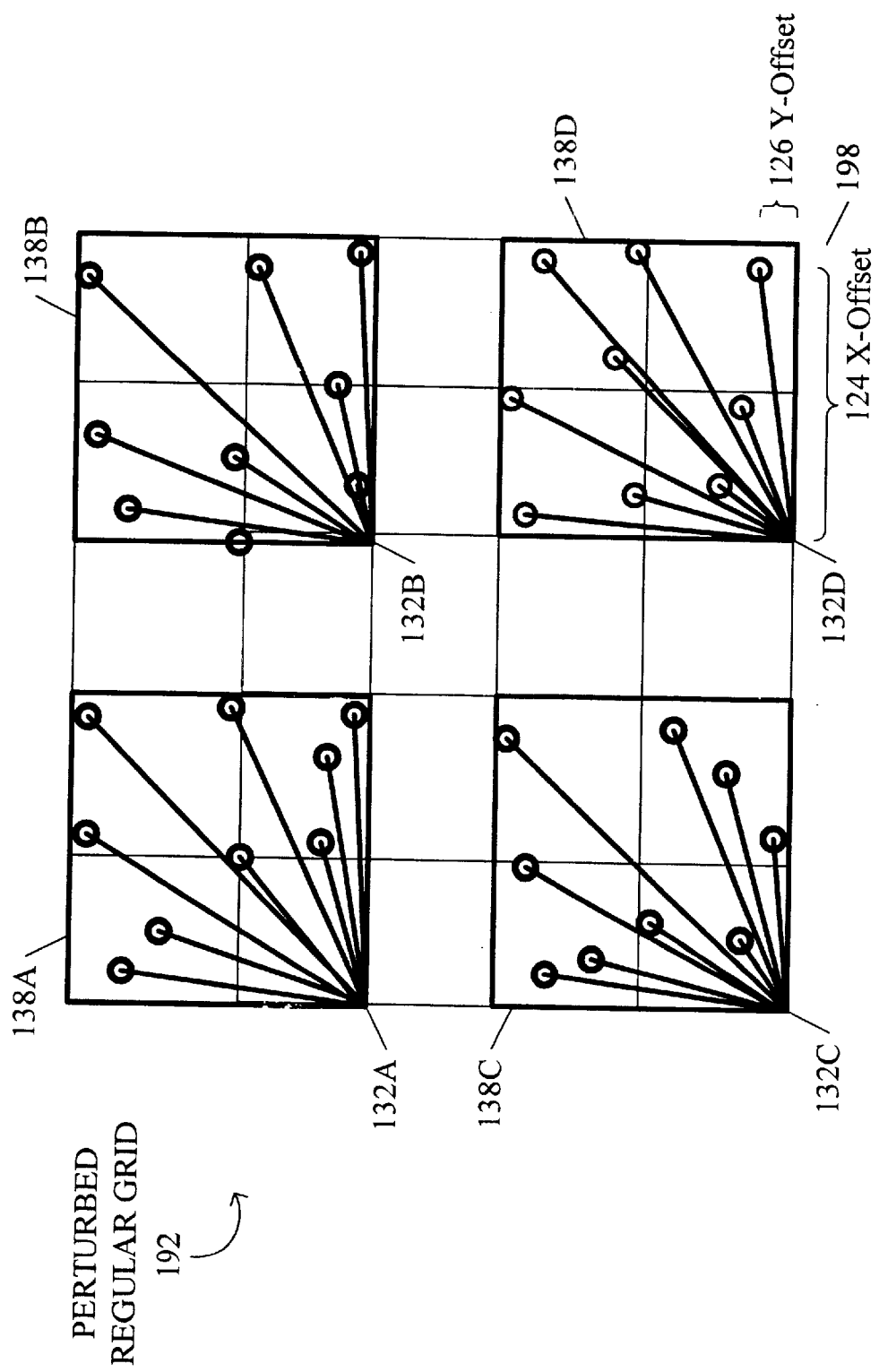
FIG. 10 is a diagram illustrating details of another embodiment of a sample positioning scheme.

Turning now to FIG. 10, details of another embodiment of perturbed regular grid scheme 192 are shown. In this embodiment, the samples are grouped into "bins" 138A–D. In this embodiment, each bin comprises nine (i.e., 3×3) samples. Different bin sizes may be used in other embodiments (e.g., bins storing 2×2 samples or 4×4 samples). In the embodiment shown, each sample's position is determined as an offset relative to the position of the bin. The position of the bins may be defined as any convenient position related to the grid, e.g., the lower left-hand corners 132A–D as shown in the figure. For example, the position of sample 198 is determined by summing x-offset 124 and y-offset 126 to the x and y coordinates of the corner 132D of bin 138D. As previously noted, this may reduce the size of the sample position memory used in some embodiments.

Figure 11A:
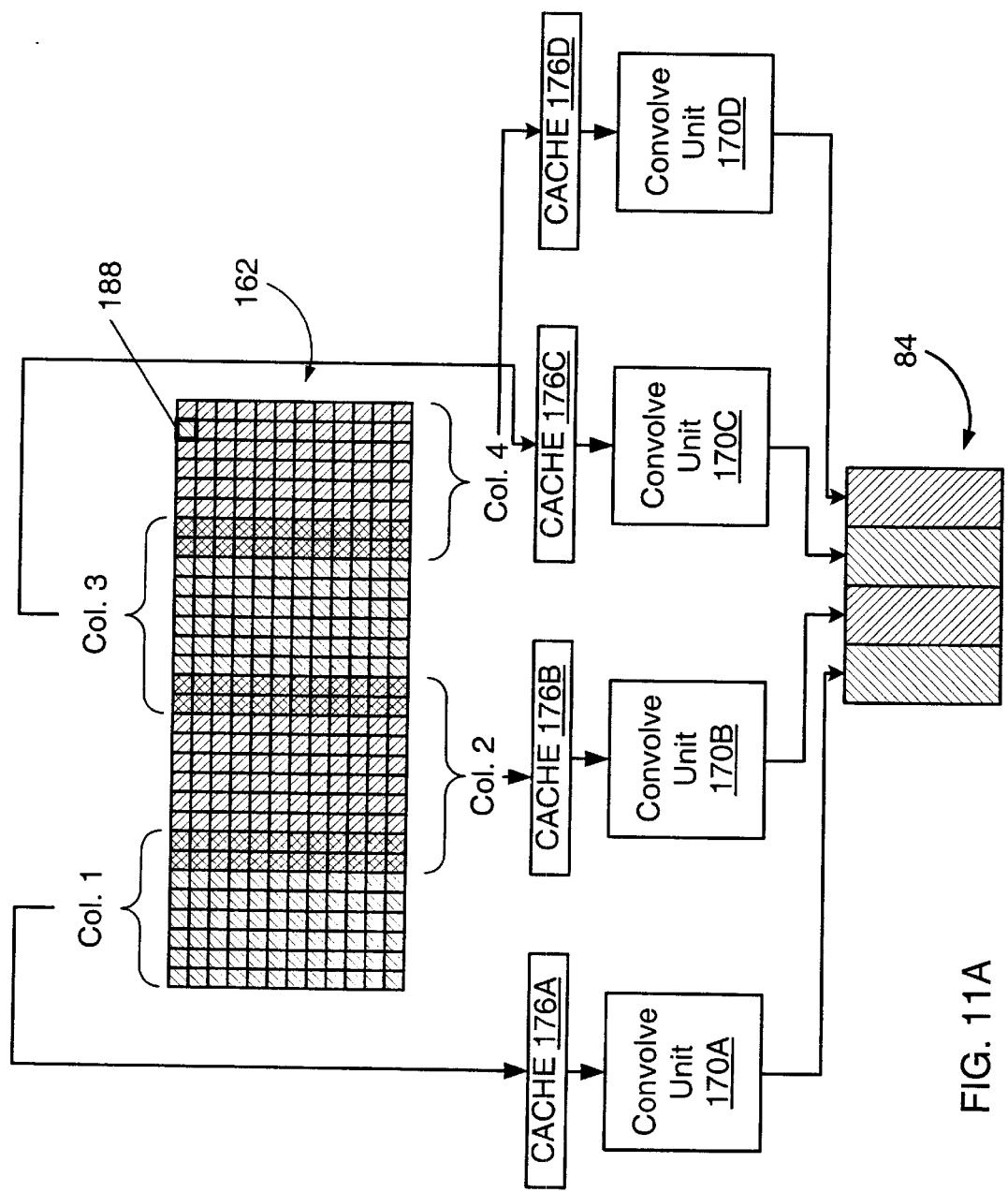
FIG. 11A is a diagram illustrating details of method of converting samples to pixels in parallel.

Turning now to FIG. 11A, one possible method for rapidly converting samples stored in sample buffer 162 into pixels is shown. In this embodiment, the contents of sample buffer 162 are organized into columns (e.g., Cols. 1–4). Each column in sample buffer 162 may comprise a two-dimensional array of bins. The columns may be configured to horizontally overlap (e.g., by one or more bins), and each column may be assigned to a particular sample-to-pixel calculation unit 170A–D for the convolution process. The amount of the overlap may depend upon the extent of the filter being used. The example shown in the figure illustrates an overlap of two bins (each square such as square 188 represents a single bin comprising one or more samples). Advantageously, this configuration may allow sample-to-pixel calculation units 170A–D to work independently and in parallel, with each sample-to-pixel calculation unit 170A–D receiving and converting its own column. Overlapping the columns will eliminate visual bands or other artifacts appearing at the column boundaries for any operators larger than a pixel in extent.

Figure 11B:
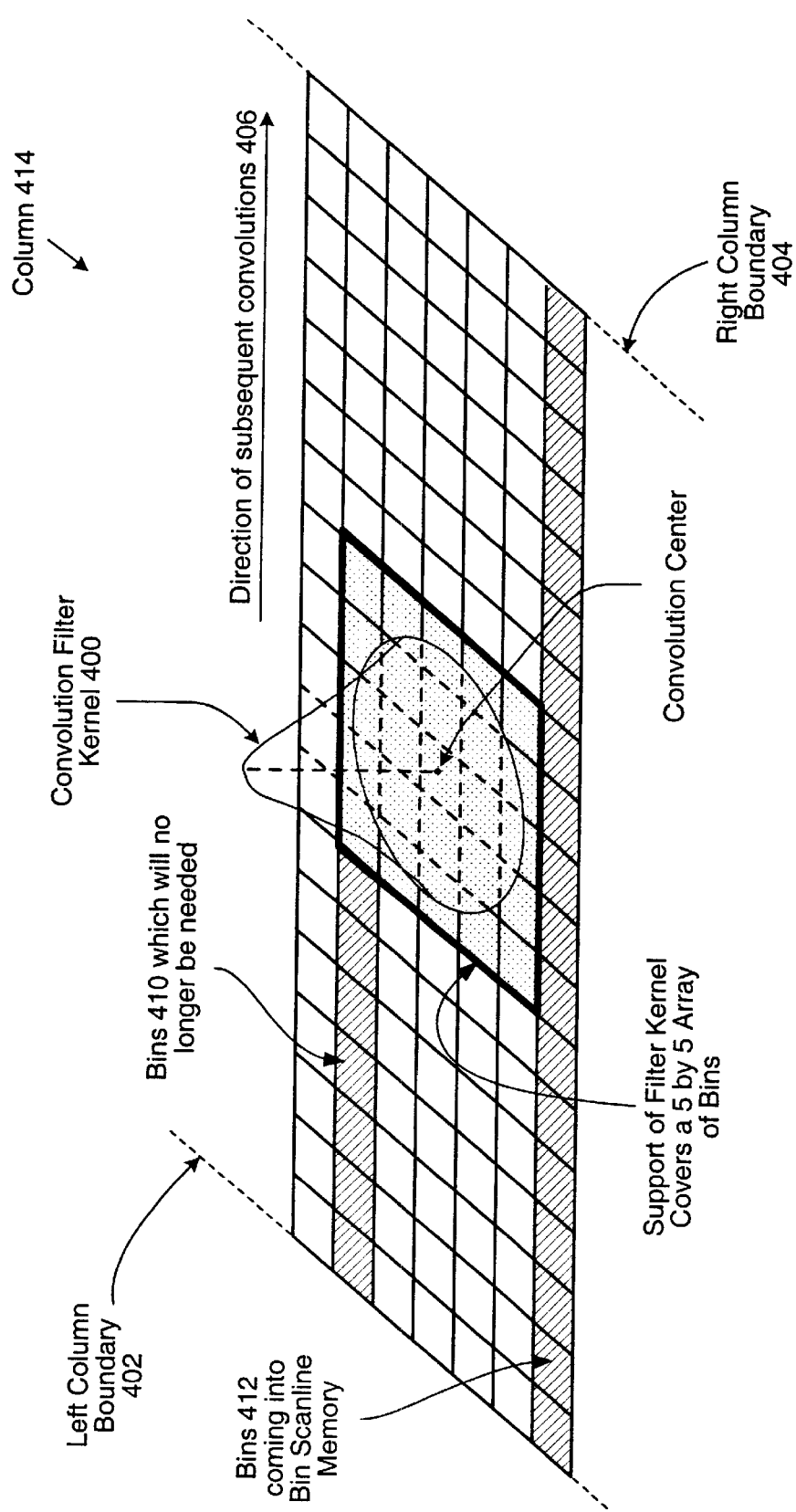
FIG. 11B is a diagram illustrating more details of the embodiment from FIG. 11A.

Turning now to FIG. 11B, more details of one embodiment of a method for reading the samples from a super-sampled sample buffer are shown. As the figure illustrates, the convolution filter kernel 400 travels across column 414 (see arrow 406) to generate output pixels. The sample-to-pixel calculation unit assigned to column 414 may implement the convolution filter kernel 400. A bin cache may used to provide quick access to the bins that may potentially contribute samples to the output pixel. As the convolution process proceeds, bins are read from the super-sampled sample buffer and stored in the bin cache. In one embodiment, bins that are no longer needed 410 are overwritten in the cache by new bins 412. As each pixel is generated, convolution filter kernel 400 shifts. Kernel 400 may be visualized as proceeding in a sequential fashion within the column in the direction indicated by arrow 406. When kernel 400 reaches the end of the column, it may shift down one or more rows of bins and then proceed again. Thus, the convolution process proceeds in a scan line manner, generating one column of output pixels for display.

Figure 11C:
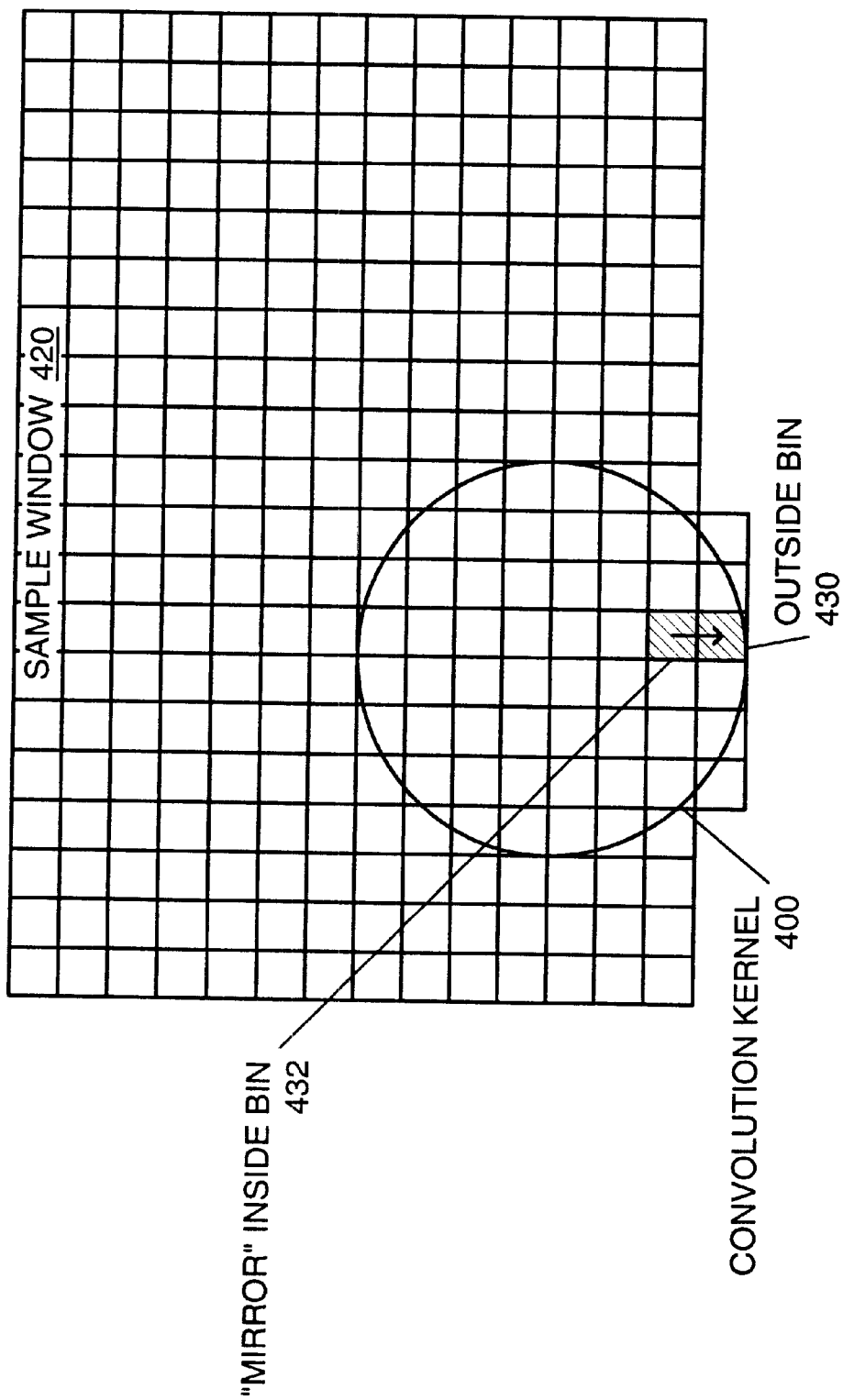
FIG. 11C is a diagram illustrating details of one embodiment of a method for dealing with boundary conditions.

Turning now to FIG. 11C, a diagram illustrating potential border conditions is shown. In one embodiment, the bins that fall outside of sample window 420 may be replaced with samples having predetermined background colors specified by the user. In another embodiment, bins that fall outside the window are not used by setting their weighting factors to zero (and then dynamically calculating normalization coefficients). In yet another embodiment, the bins at the inside edge of the window may be duplicated to replace those outside the window. This is indicated by outside bin 430 being replaced by mirror inside bin 432.

Figure 12A:
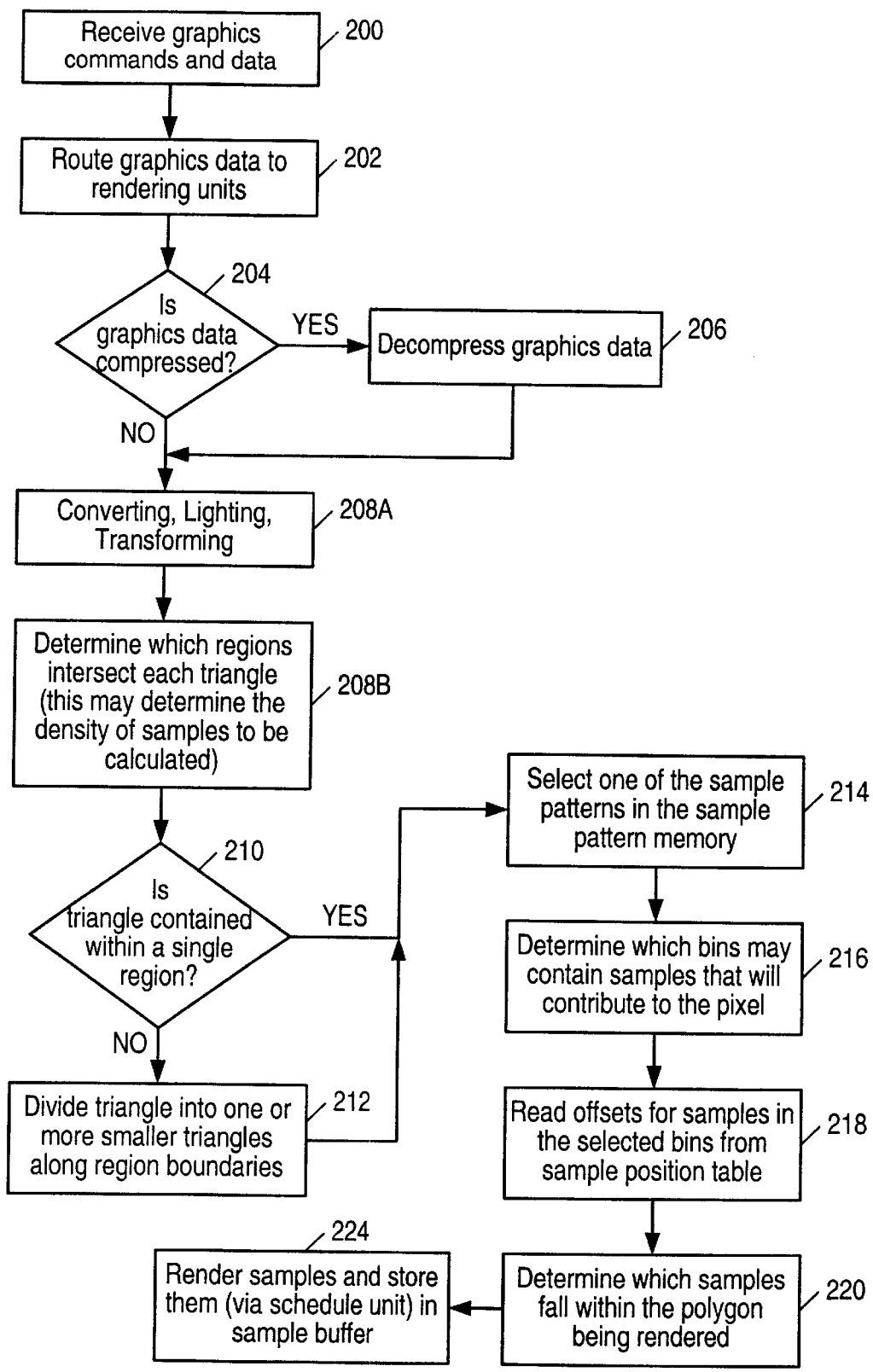
FIG. 12A is a flowchart illustrating one embodiment of a method for drawing samples into a super-sampled sample buffer.

FIG. 12A is a flowchart of one embodiment of a method for drawing or rendering samples into a super-sampled sample buffer. Certain of the steps depicted in FIG. 12A may occur concurrently or in different orders. In this embodiment, the graphics system receives graphics commands and graphics data from the host CPU 102 or directly from main memory 106 (step 200). Next, the instructions and data are routed to one or more rendering units 150A–D (step 202). If the graphics data is compressed (step 204), then the rendering units 150A–D decompress the data into a useable format, e.g., triangles (step 206). Next, the triangles are processed, e.g., converted to screen space, lit, and transformed (step 208A). If the graphics system implements variable resolution super sampling, then the triangles are compared with the sample density region boundaries (step 208B). In variable-resolution super-sampled sample buffer implementations, different regions of the display device may be allocated different sample densities based upon a number of factors (e.g., the center of the attention on the screen as determined by eye tracking, or eye tracking and head tracking). Sample density regions are described in greater detail below (see section entitled Variable Resolution Sample buffer below). If the triangle crosses a region boundary (step 210), then the triangle may be divided into two smaller polygons along the region boundary (step 212). This may allow each newly formed triangle to have a single sample density. In one embodiment, the graphics system may be configured to simply use the entire triangle twice (i.e., once in each region) and then use a bounding box to effectively clip the triangle.

Next, one of the sample position schemes (e.g., regular grid, perturbed regular grid, or stochastic) is selected from the sample position memory 184 (step 214). The sample position scheme will generally have been pre-programmed into the sample position memory 184, but may also be selected "on-the-fly". Based upon this sample position scheme and the sample density of the region containing the triangle, rendering units 150A–D determine which bins may contain samples located within the triangle's boundaries (step 216). The offsets for the samples within these bins are then read from sample position memory 184 (step 218). Each sample's position is then calculated using the offsets and is compared with the triangle's vertices to determine if the sample is within the triangle (step 220). Step 220 is discussed in greater detail below.

For each sample that is determined to be within the triangle, the rendering unit draws the sample by calculating the sample's color, alpha and other attributes. This may involve lighting calculation and interpolation based upon the color and texture map information associated with the vertices of the triangle. Once the sample is rendered, it may be forwarded to schedule unit 154, which then stores the sample in sample buffer 162 (step 224).

Note the embodiment of the method described above is used for explanatory purposes only and is not meant to be limiting. For example, in some embodiments the steps shown in the figure as occurring serially may be implemented in parallel. Furthermore, some steps may be reduced or eliminated in certain embodiments of the graphics system (e.g., steps 204–206 in embodiments that do not implement geometry compression or steps 210–212 in embodiments that do not implement a variable resolution super-sampled sample buffer).

7. Determination of Which Samples Reside Within the Polygon Being Rendered

The comparison may be performed in a number of different ways. In one embodiment, the deltas between the three vertices defining the triangle are first determined. For example, these deltas may be taken in the order of first to second vertex (v2−v1)=d12, second to third vertex (v3−v2)=d23, and third vertex back to the first vertex (v1−v3)=d31. These deltas form vectors, and each vector may be categorized as belonging to one of the four quadrants of the coordinate plane (e.g., by using the two sign bits of its delta X and Y coefficients). A third condition may be added determining whether the vector is an X-major vector or Y-major vector. This may be determined by calculating whether abs(delta_x) is greater than abs(delta_y).

Figure 12B:
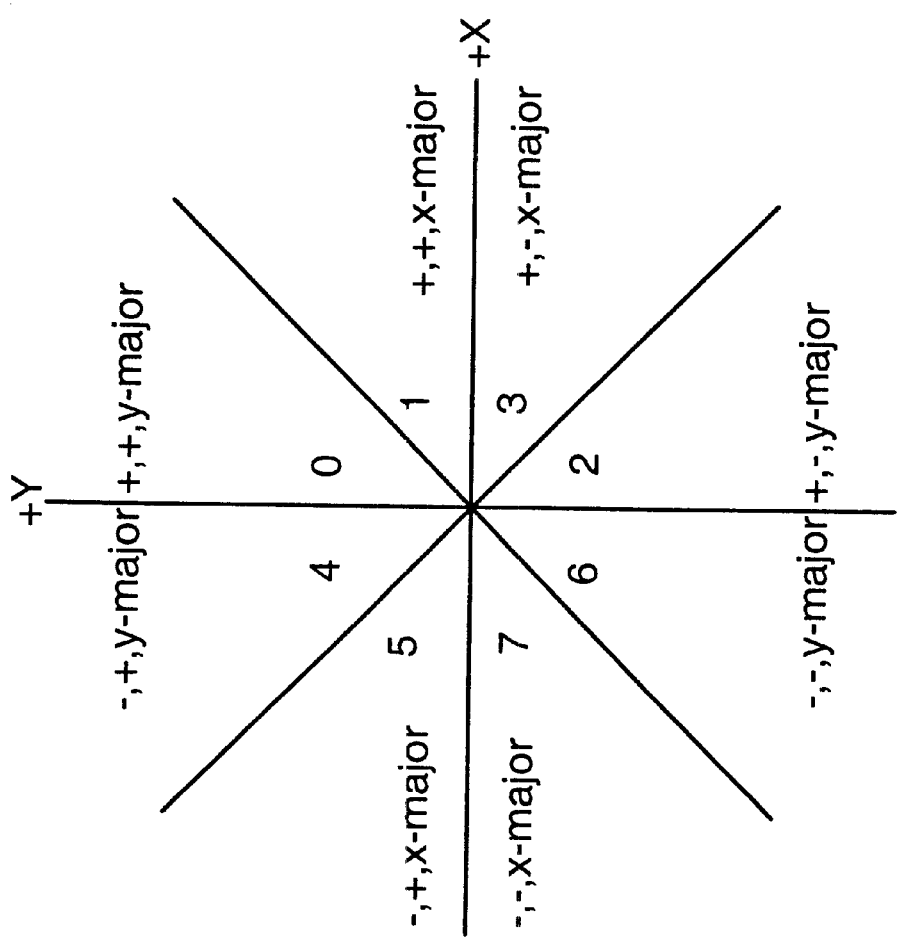
FIG. 12B is a diagram illustrating one embodiment for coding triangle vertices.

Using these three bits of information, the vectors may each be categorized as belonging to one of eight different regions of the coordinate plane. If three bits are used to define these regions, then the X-sign bit (shifted left by two), the Y-sign bit (shifted left by one), and the X-major bit, may be used to create the eight regions as shown in FIG. 12B.

Next, three edge equations may be used to define the inside portion of the triangle. These edge equations (or half-plane equations) may be defined using slope-intercept form. To reduce the numerical range needed, both X-major and Y-major equation forms may be used (such that the absolute value of the slope value may be in the range of 0 to 1). Thus, the two edge equations are:

X-major: y−m·x−b<0, when the point is below the line

Y-major: x−m·y−b<0, when the point is to the left of the line

The X-major equations produces a negative versus positive value when the point in question is below the line, while the Y-major equation produces a negative versus positive value when the point in question is to the left of the line. Since which side of the line is the "accept" side is known, the sign bit (or the inverse of the sign bit) of the edge equation result may be used to determine whether the sample is on the "accept" side or not. This is referred to herein as the "accept bit". Thus, a sample is on the accept side of a line if:

X-major: (y−m·x−b<0)<xor>accept

Y-major: (x−m·y−b<0)<xor>accept

The accept bit may be calculated according to the following table, wherein cw designates whether the triangle is clockwise (cw=1) or counter-clockwise (cw=0):

1: accept=!cw
0: accept=cw
4: accept=cw
5: accept=cw
7: accept=cw
6: accept=!cw
2: accept=!cw
3: accept=!cw Tie breaking rules for this representation may also be implemented (e.g., coordinate axes may be defined as belonging to the positive octant). Similarly, X-major may be defined as owning all points that tie on the slopes.

In an alternate embodiment, the accept side of an edge may be determined by applying the edge equation to the third vertex of the triangle (the vertex that is not one of the two vertices forming the edge). This method may incur the additional cost of a multiply-add, which may not be used by the technique described above.

To determine the "faced-ness" of a triangle (i.e., whether the triangle is clockwise or counter-clockwise), the delta-directions of two edges of the triangle may be checked and the slopes of the two edges may be compared. For example, assuming that edge12 has a delta-direction of 1 and the second edge (edge23) has a delta-direction of 0, 4, or 5, then the triangle is counter-clockwise. If, however, edge23 has a delta-direction of 3, 2, or 6, then the triangle is clockwise. If edge23 has a delta-direction of 1 (i.e., the same as edge12), then comparing the slopes of the two edges breaks the tie (both are x-major). If edge12 has a greater slope, then the triangle is counter-clockwise. If edge23 has a delta-direction of 7 (the exact opposite of edge12), then again the slopes are compared, but with opposite results in terms of whether the triangle is clockwise or counter-clockwise.

The same analysis can be exhaustively applied to all combinations of edge12 and edge23 delta-directions, in every case determining the proper faced-ness. If the slopes are the same in the tie case, then the triangle is degenerate (i.e., with no interior area). It can be explicitly tested for and culled, or, with proper numerical care, it could be let through as it will cause no pixels to render. One special case is when a triangle splits the view plane, but that may be detected earlier in the pipeline (e.g., when front plane and back plane clipping are performed).

Note in most cases only one side of a triangle is rendered. Thus, after the faced-ness of a triangle is determined, if the face is the one to be rejected, then the triangle can be culled (i.e., subject to no further processing with no pixels generated). Further note that this determination of faced-ness only uses one additional comparison (i.e., of the slope of edge12 to that of edge23) beyond factors already computed. Many traditional approaches may utilize more complex computation (though at earlier stages of the set-up computation).

Figure 13:
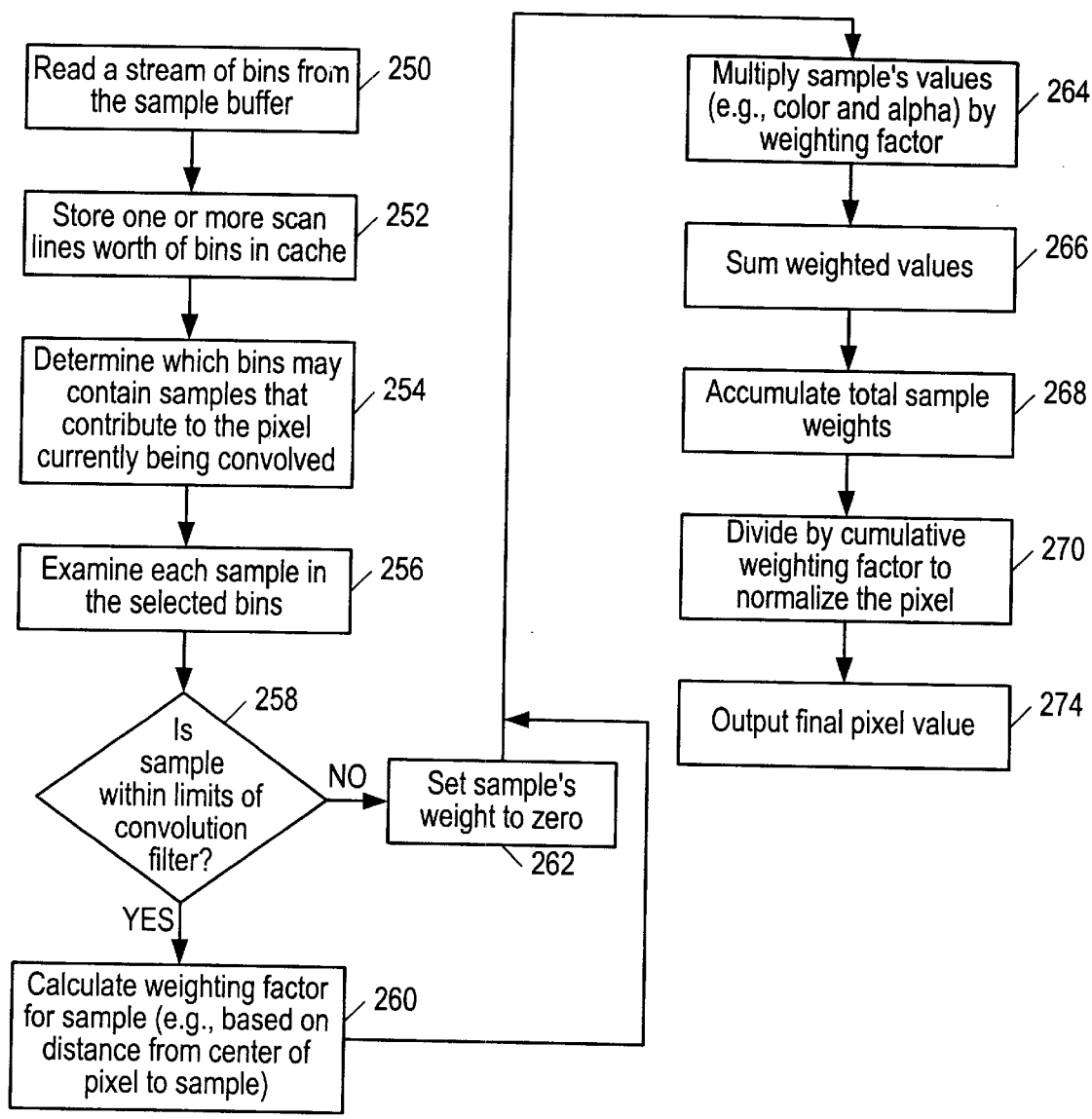
FIG. 13 is a diagram illustrating one embodiment of a method for calculating pixels from samples.

FIG. 13 is a flowchart of one embodiment of a method for filtering samples stored in the super-sampled sample buffer to generate output pixels. First, a stream of bins are read from the super-sampled sample buffer (step 250). These may be stored in one or more caches to allow the sample-to-pixel calculation units 170 easy access during the convolution process (step 252). Next, the bins are examined to determine which may contain samples that contribute to the output pixel currently being generated by the filter process (step 254). Each sample that is in a bin that may contribute to the output pixel is then individually examined to determine if the sample does indeed contribute (steps 256-258). This determination may be based upon the distance from the sample to the center of the output pixel being generated.

In one embodiment, the sample-to-pixel calculation units 170 may be configured to calculate this distance (i.e., the extent of the filter at sample's position) and then use it to index into a table storing filter weight values according to filter extent (step 260). In another embodiment, however, the potentially expensive calculation for determining the distance from the center of the pixel to the sample (which typically involves a square root function) is avoided by using distance squared to index into the table of filter weights. Alternatively, a function of x and y may be used in lieu of one dependent upon a distance calculation. In one embodiment, this may be accomplished by utilizing a floating point format for the distance (e.g., four or five bits of mantissa and three bits of exponent), thereby allowing much of the accuracy to be maintained while compensating for the increased range in values. In one embodiment, the table may be implemented in ROM. However, RAM tables may also be used. Advantageously, RAM tables may, in some embodiments, allow the graphics system to vary the filter coefficients on a per-frame basis. For example, the filter coefficients may be varied to compensate for known shortcomings of the display or for the user's personal preferences. The graphics system can also vary the filter coefficients on a screen area basis within a frame, or on a per-output pixel basis. Another alternative embodiment may actually calculate the desired filter weights for each sample using specialized hardware (e.g., multipliers and adders). The filter weight for samples outside the limits of the convolution filter may simply be multiplied by a filter weight of zero (step 262), or they may be removed from the calculation entirely.

Once the filter weight for a sample has been determined, the sample may then be multiplied by its filter weight (step 264). The weighted sample may then be summed with a running total to determine the final output pixel's un-normalized (and pre-gamma correction) color value (step 266). The filter weight may also be added to a running total pixel filter weight (step 268), which is used to normalize the filtered pixels. Normalization (i.e. step 270) advantageously prevents the filtered pixels (e.g., pixels with more samples than other pixels) from appearing too bright or too dark by compensating for gain introduced by the convolution process. After all the contributing samples have been weighted and summed, the total pixel filter weight may be used to divide out the gain caused by the filtering. Finally, the normalized output pixel may be output for gamma correction, digital-to-analog conversion (if necessary), and eventual display (step 274).

FIG. 14 illustrates a simplified example of an output pixel convolution. As the figure shows, four bins 288A-D contain samples that may possibly contribute to the output pixel. In this example, the center of the output pixel is located at the boundary of bins 288A-288D. Each bin comprises sixteen samples, and an array of 2 four bins (2×2) is filtered to generate the output pixel. Assuming circular filters are used, the distance of each sample from the pixel center determines which filter value will be applied to the sample. For example, sample 296 is relatively close to the pixel center, and thus falls within the region of the filter having a filter value of 8. Similarly, samples 294 and 292 fall within the regions of the filter having filter values of 4 and 2, respectively. Sample 290, however, falls outside the maximum filter extent, and thus receives a filter value of 0. Thus, sample 290 will not contribute to the output pixel's value. This type of filtering automatically performs anti-aliasing by smoothing any abrupt changes in the image (e.g., from a dark line to a light background). Because the filter function of FIG. 14 is a decreasing function of distance from the pixel center, samples close to the pixel center contribute more to the final output pixel than samples farther from the pixel center. Other filters functions such as the windowed sinc filter are increasing and decreasing over different intervals in radius.

The windowed sinc filter is particularly useful for anti-aliasing. Advantageously, the windowed sinc filter contains negative lobes that resharpen some of the blended or "fuzzed" image. Negative lobes are areas where the filter causes the samples to subtract from the pixel being calculated. In contrast, samples on either side of the negative lobe add to the pixel being calculated.

Example values for samples 290–296 are illustrated in boxes 300–308. In this example, each sample comprises red, green, blue, and alpha values, in addition to the sample's positional data. Block 310 illustrates the calculation of each pixel component value for the non-normalized output pixel. As block 310 indicates, potentially undesirable gain is introduced into the final pixel values (i.e., an output pixel having a red component value of 2000 is much higher than any of the sample's red component values). As previously noted, the filter values may be summed to obtain normalization value 308. Normalization value 308 is used to divide out the unwanted gain from the output pixel. Block 312 illustrates this process and the final normalized example pixel values.

Note the values used herein were chosen for descriptive purposes only and are not meant to be limiting. For example, the filter may have a large number of regions each with a different filter value. In one embodiment, some regions may have negative filter values. The filter utilized may be a continuous function that is evaluated for each sample based on the sample's distance from the pixel center. Also, note that floating point values may be used for increased precision. A variety of filters may be utilized, e.g., cylinder, cone, Gaussian, Mitchell-Netravalli, Catmull-Rom, windowed sinc, box, or tent.

A. Full-Screen Anti-aliasing

The vast majority of current 3D graphics systems only provide "real-time" and "on-the-fly" anti-aliasing for lines and dots. While some systems also allow the edge of a polygon to be "fuzzed", this technique typically works best when all polygons have been pre-sorted in depth. This may defeat the purpose of having general-purpose 3D rendering hardware for most applications (which do not depth pre-sort their polygons). In one embodiment, graphics system 112 may be configured to implement full-screen anti-aliasing by stochastically sampling up to sixteen samples per output pixel, filtered by a 4×4-convolution filter. Other filters may be used (e.g., a 5×5 convolution filter, a 9×9 convolution filter, an 11×11 convolution filter, or more generally, an $M_f \times N_f$ convolution where $M_f$ and $N_f$ are positive integer values).

B. Variable Resolution Super-Sampling

Currently, the straight-forward brute force method of utilizing a fixed number of samples per pixel location, e.g., an 8×super-sampled sample buffer, would entail the use of eight times more memory, eight times the fill rate (i.e., memory bandwidth), and a convolution pipe capable of processing eight samples per pixel. Given the high resolution and refresh rates of current displays, a graphics system of this magnitude may be relatively expense to implement given today's level of integration.

In one embodiment, graphics system 112 may be configured to overcome these potential obstacles by implementing variable resolution super-sampling. In this embodiment, graphics system 112 mimics the human eye's characteristics by allocating a higher number of samples per pixel at one or more first locations on the screen (e.g., the point of foveation on the screen), with a drop-off in the number of samples per pixel for one or more second locations on the screen (e.g., areas farther away from the point of foveation). Depending upon the implementation, the point of foveation may be determined in a variety of ways. In one embodiment, the point of foveation may be a predetermined area around a certain object displayed upon the screen. For example, the area around a moving cursor or the main character in a computer game may be designated the point of foveation. In another embodiment, the point of foveation on the screen may be determined by eye-tracking, or eye-tracking and head-tracking. Even if eye/head/hand-tracking, cursor-based, or main character-based points of foveation are not implemented, the point of foveation may be fixed at the center of the screen, where the majority of viewer's attention is focused the majority of the time. Variable resolution super-sampling is described in greater detail below.

8. Variable-Resolution Super-Sampled Sample Buffer—FIGS. 15–19

A traditional frame buffer is one rectangular array of uniformly sampled pixels. For every pixel on the final display device (CRT or LCD), there is a single pixel or location of memory storage in the frame buffer (perhaps double buffered). There is a trivial one-to-one correspondence between the 2D memory address of a given pixel and its 2D sample address for the mathematics of rendering. Stated another way, in a traditional frame buffer there is no separate notion of samples apart from the pixels themselves. The output pixels are stored in a traditional frame buffer in a row/column manner corresponding to how the pixels are provided to the display during display refresh.

In a variable-resolution super-sampled sample buffer, the number of computed samples per output pixel varies on a regional basis. Thus, output pixels in regions of greater interest are computed using a greater number of samples, thus producing greater resolution in this region, and output pixels in regions of lesser interest are computed using a lesser number of samples, thus producing lesser resolution in this region.

As previously noted, in some embodiments, graphics system 112 may be configured with a variable resolution super-sampled sample buffer. To implement variable resolution super-sampling, sample buffer 162 may be divided into smaller pieces, called regions. The size, location, and other attributes of these regions may be configured to vary dynamically, as parameterized by run-time registers on a per-frame basis.

Figure 15:
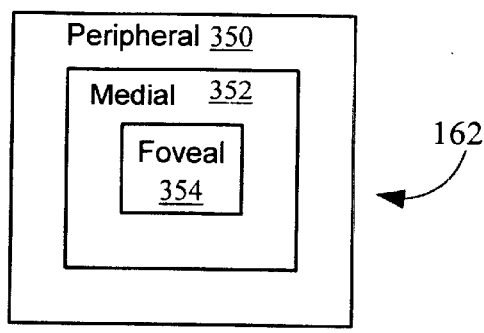
FIG. 15 is a diagram illustrating one embodiment of a method for dividing a super-sampled sample buffer into regions.

Turning now to FIG. 15, a diagram of one possible scheme for dividing sample buffer 162 is shown. In this embodiment, sample buffer 162 is divided into the following three nested regions: foveal region 354, medial region 352, and peripheral region 350. Each of these regions has a rectangular shaped outer border, but the medial and the peripheral regions have a rectangular shaped hole in their center. Each region may be configured with certain constant (per frame) properties, e.g., a constant density sample density and a constant size of pixel bin. In one embodiment, the total density range may be 256, e.g., a region could support between one sample for every 16 screen pixels (4×4) and 16 samples for every 1 screen pixel. In other embodiments, the total density range may be limited to other values, e.g., 64. In one embodiment, the sample density varies, either linearly or non-linearly, across a respective region. Note in other embodiments the display may be divided into a plurality of constant sized regions (e.g., squares that are 4×4 pixels in size, or more generally, $M_R \times M_R$ pixels in size where parameter $M_R$ is a positive integer).

Figure 16:
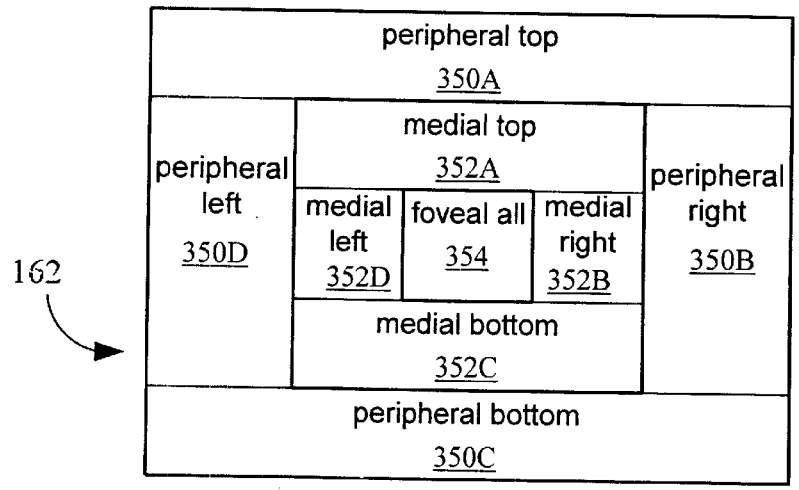
FIG. 16 is a diagram illustrating another embodiment of a method for dividing a super-sampled sample buffer into regions.

To simply perform calculations for polygons that encompass one or more region corners (e.g., a foveal region corner), the sample buffer may be further divided into a plurality of subregions. Turning now to FIG. 16, one embodiment of sample buffer 162 divided into sub-regions is shown. Each of these sub-regions are rectangular, allowing graphics system 112 to translate from a 2D address with a sub-region to a linear address in sample buffer 162. Thus, in some embodiments each sub-region has a memory base address, indicating where storage for the pixels within the sub-region starts. Each sub-region may also have a "stride" parameter associated with its width.

Figure 17:
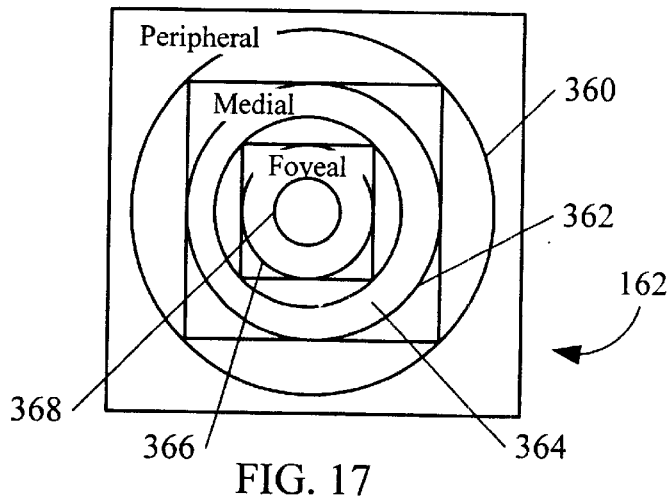
FIG. 17 is a diagram illustrating yet another embodiment of a method for dividing a super-sampled sample buffer into regions.

Another potential division of the super-sampled sample buffer is circular. Turning now to FIG. 17, one such embodiment is illustrated. For example, each region may have two radii associated with it (i.e., 360–368), dividing the region into three concentric circular-regions. The circular-regions may all be centered at the same screen point, the fovea center point. Note however, that the fovea center-point need not always be located at the center of the foveal region. In some instances it may even be located off-screen (i.e., to the side of the visual display surface of the display device). While the embodiment illustrated supports up to seven distinct circular-regions, it is possible for some of the circles to be shared across two different regions, thereby reducing the distinct circular-regions to five or less.

The circular regions may delineate areas of constant sample density actually used. For example, in the example illustrated in the figure, foveal region 354 may allocate a sample buffer density of 8 samples per screen pixel, but outside the innermost circle 368, it may only use 4 samples per pixel, and outside the next circle 366 it may only use two samples per pixel. Thus, in this embodiment the rings need not necessarily save actual memory (the regions do that), but they may potentially save memory bandwidth into and out of the sample buffer (as well as pixel convolution bandwidth). In addition to indicating a different effective sample density, the rings may also be used to indicate a different sample position scheme to be employed. As previously noted, these sample position schemes may stored in an on-chip RAM/ROM, or in programmable memory.

As previously discussed, in some embodiments super-sampled sample buffer 162 may be further divided into bins. For example, a bin may store a single sample or an array of samples (e.g., 2×2 or 4×4 samples). In one embodiment, each bin may store between one and sixteen sample points, although other configurations are possible and contemplated. Each region may be configured with a particular bin size, and a constant memory sample density as well. Note that the lower density regions need not necessarily have larger bin sizes. In one embodiment, the regions (or at least the inner regions) are exact integer multiples of the bin size enclosing the region. This may allow for more efficient utilization of the sample buffer in some embodiments.

Variable-resolution super-sampling involves calculating a variable number of samples for each pixel displayed on the display device. Certain areas of an image may benefit from a greater number of samples (e.g., near object edges), while other areas may not need extra samples (e.g., smooth areas having a constant color and brightness). To save memory and bandwidth, extra samples may be used only in areas that may benefit from the increased resolution. For example, if part of the display is colored a constant color of blue (e.g., as in a background), then extra samples may not be particularly useful because they will all simply have the constant value (equal to the background color being displayed). In contrast, if a second area on the screen is displaying a 3D rendered object with complex textures and edges, the use of additional samples may be useful in avoiding certain artifacts such as aliasing. A number of different methods may be used to determine or predict which areas of an image would benefit from higher sample densities. For example, an edge analysis could be performed on the final image, and with that information being used to predict how the sample densities should be distributed. The software application may also be able to indicate which areas of a frame should be allocated higher sample densities.

A number of different methods may be used to implement variable-resolution super sampling. These methods tend to fall into the following two general categories: (1) those methods that concern the draw or rendering process, and (2) those methods that concern the convolution process. For example, samples may be rendered into the super-sampling sample buffer 162 using any of the following methods:

a uniform sample density;

varying sample density on a per-region basis (e.g., medial, foveal, and peripheral); and varying sample density by changing density on a scan-line basis (or on a small number of scan lines basis).

Varying sample density on a scan-line basis may be accomplished by using a look-up table of densities. For example, the table may specify that the first five pixels of a particular scan line have three samples each, while the next four pixels have two samples each, and so on.

On the convolution side, the following methods are possible:

a uniform convolution filter;

continuously variable convolution filter; and a convolution filter operating at multiple spatial frequencies.

A uniform convolve filter may, for example, have a constant extent (or number of samples selected) for each pixel calculated. In contrast, a continuously variable convolution filter may gradually change the number of samples used to calculate a pixel. The function may be vary continuously from a maximum at the center of attention to a minimum in peripheral areas.

Different combinations of these methods (both on the rendering side and convolution side) are also possible. For example, a constant sample density may be used on the rendering side, while a continuously variable convolution filter may be used on the samples.

Different methods for determining which areas of the image will be allocated more samples per pixel are also contemplated. In one embodiment, if the image on the screen has a main focal point (e.g., a character like Mario in a computer game), then more samples may be calculated for the area around Mario and fewer samples may be calculated for pixels in other areas (e.g., around the background or near the edges of the screen).

In another embodiment, the viewer's point of foveation may be determined by eye/head/hand-tracking. In head-tracking embodiments, the direction of the viewer's gaze is determined or estimated from the orientation of the viewer's head, which may be measured using a variety of mechanisms. For example, a helmet or visor worn by the viewer (with eye/head tracking) may be used alone or in combination with a hand-tracking mechanism, wand, or eye-tracking sensor to provide orientation information to graphics system 112. Other alternatives include head-tracking using an infrared reflective dot placed on the user's forehead, or using a pair of glasses with head- and or eye-tracking sensors built in. One method for using head- and hand-tracking is disclosed in U.S. Pat. No. 5,446,834 (entitled "Method and Apparatus for High Resolution Virtual Reality Systems Using Head Tracked Display," by Michael Deering, issued Aug. 29, 1995), which is incorporated herein by reference in its entirety.

Other methods for head tracking are also possible and contemplated (e.g., infrared sensors, electromagnetic sensors, capacitive sensors, video cameras, sonic and ultrasonic detectors, clothing based sensors, video tracking devices, conductive ink, strain gauges, force-feedback detectors, fiber optic sensors, pneumatic sensors, magnetic tracking devices, and mechanical switches).

As previously noted, eye-tracking may be particularly advantageous when used in conjunction with head-tracking. In eye-tracked embodiments, the direction of the viewer's gaze is measured directly by detecting the orientation of the viewer's eyes in relation to the viewer's head. This information, when combined with other information regarding the position and orientation of the viewer's head in relation to the display device, may allow an accurate measurement of viewer's point of foveation (or points of foveation if two eye-tracking sensors are used). One possible method for eye tracking is disclosed in U.S. Pat. No. 5,638,176 (entitled "Inexpensive Interferometric Eye Tracking System"). Other methods for eye tracking are also possible and contemplated (e.g., the methods for head tracking listed above).

Regardless of which method is used, as the viewer's point of foveation changes position, so does the distribution of samples. For example, if the viewer's gaze is focused on the upper left-hand corner of the screen, the pixels corresponding to the upper left-hand corner of the screen may each be allocated eight or sixteen samples, while the pixels in the opposite corner (i.e., the lower right-hand corner of the screen) may be allocated only one or two samples per pixel. Once the viewer's gaze changes, so does the allotment of samples per pixel. When the viewer's gaze moves to the lower right-hand corner of the screen, the pixels in the upper left-hand corner of the screen may be allocated only one or two samples per pixel. Thus the number of samples per pixel may be actively changed for different regions of the screen in relation the viewer's point of foveation. Note in some embodiments, multiple users may be each have head/eye/hand tracking mechanisms that provide input to graphics system 112. In these embodiments, there may conceivably be two or more points of foveation on the screen, with corresponding areas of high and low sample densities. As previously noted, these sample densities may affect the render process only, the filter process only, or both processes.

Turning now to FIGS. 18A–B, one embodiment of a method for apportioning the number of samples per pixel is shown. The method apportions the number of samples based on the location of the pixel relative to one or more points of foveation. In FIG. 18A, an eye- or head-tracking device 360 is used to determine the point of foveation 362 (i.e., the focal point of a viewer's gaze). This may be determined by using tracking device 360 to determine the direction that the viewer's eyes (represented as 364 in the figure) are facing. As the figure illustrates, in this embodiment, the pixels are divided into foveal region 354 (which may be centered around the point of foveation 362), medial region 352, and peripheral region 350.

Three sample pixels are indicated in the figure. Sample pixel 374 is located within foveal region 314. Assuming foveal region 314 is configured with bins having eight samples, and assuming the convolution radius for each pixel touches four bins, then a maximum of 32 samples may contribute to each pixel. Sample pixel 372 is located within medial region 352. Assuming medial region 352 is configured with bins having four samples, and assuming the convolution radius for each pixel touches four bins, then a maximum of 16 samples may contribute to each pixel. Sample pixel 370 is located within peripheral region 350. Assuming peripheral region 370 is configured with bins having one sample each, and assuming the convolution radius for each pixel touches one bin, then there is a one sample to pixel correlation for pixels in peripheral region 350. Note these values are merely examples and a different number of regions, samples per bin, and convolution radius may be used.

Turning now to FIG. 18B, the same example is shown, but with a different point of foveation 362. As the figure illustrates, when tracking device 360 detects a change in the position of point of foveation 362, it provides input to the graphics system, which then adjusts the position of foveal region 354 and medial region 352. In some embodiments, parts of some of the regions (e.g., medial region 352) may extend beyond the edge of display device 84. In this example, pixel 370 is now within foveal region 354, while pixels 372 and 374 are now within the peripheral region. Assuming the sample configuration as the example in FIG. 18A, a maximum of 32 samples may contribute to pixel 370, while only one sample will contribute to pixels 372 and 374. Advantageously, this configuration may allocate more samples for regions that are near the point of foveation (i.e., the focal point of the viewer's gaze). This may provide a more realistic image to the viewer without the need to calculate a large number of samples for every pixel on display device 84.

Figure 19A:
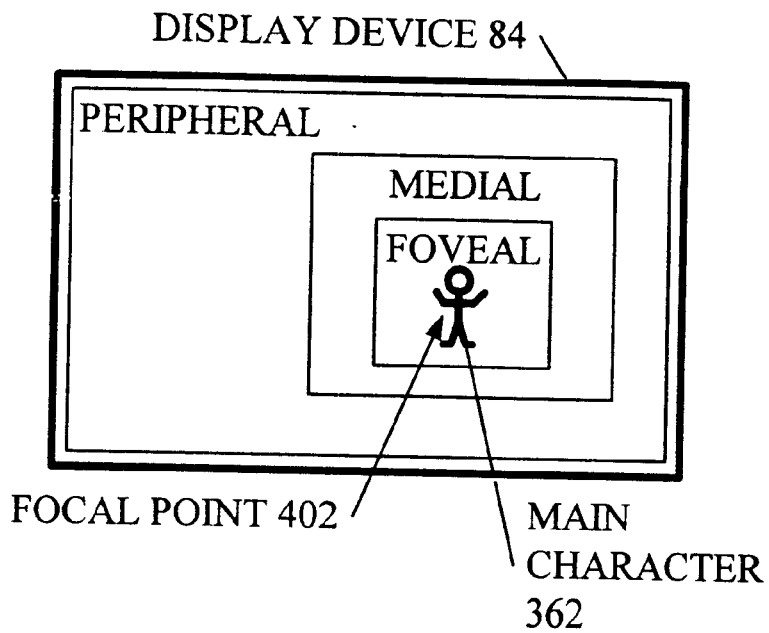
FIGS. 19A–B are diagrams illustrating one embodiment of a graphics system configured to vary region position according to the position of a cursor or visual object.
Figure 19B:
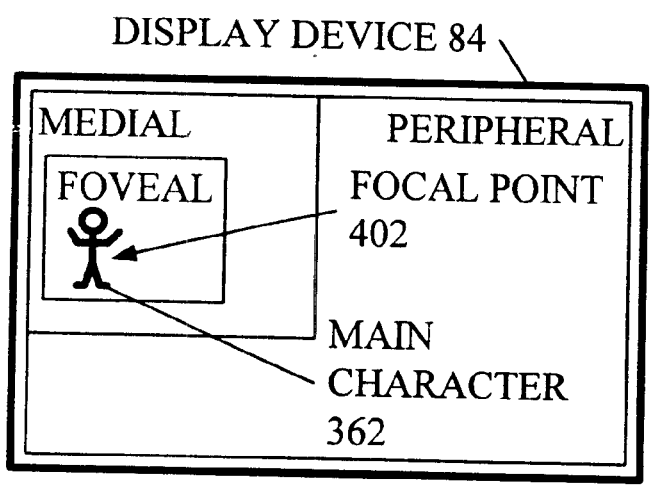

Turning now to FIGS. 19A–B, another embodiment of a computer system configured with a variable resolution super-sampled sample buffer is shown. In this embodiment, the center of the viewer's attention, i.e., the viewer's focal point (and very likely the viewer's point of foveation), is determined by position of main character 362. Medial and foveal regions are centered on or around main character 362 as the main character moves around the screen. In some embodiments, the main character may be a simple cursor (e.g., as moved by keyboard input or by a mouse).

In still another embodiment, regions with higher sample density may be centered around the middle of display device 84's screen. Advantageously, this may require less control software and hardware while still providing a shaper image in the center of the screen (where the viewer's attention may be focused the majority of the time).

9. Computer Network—FIG. 20

Figure 20:
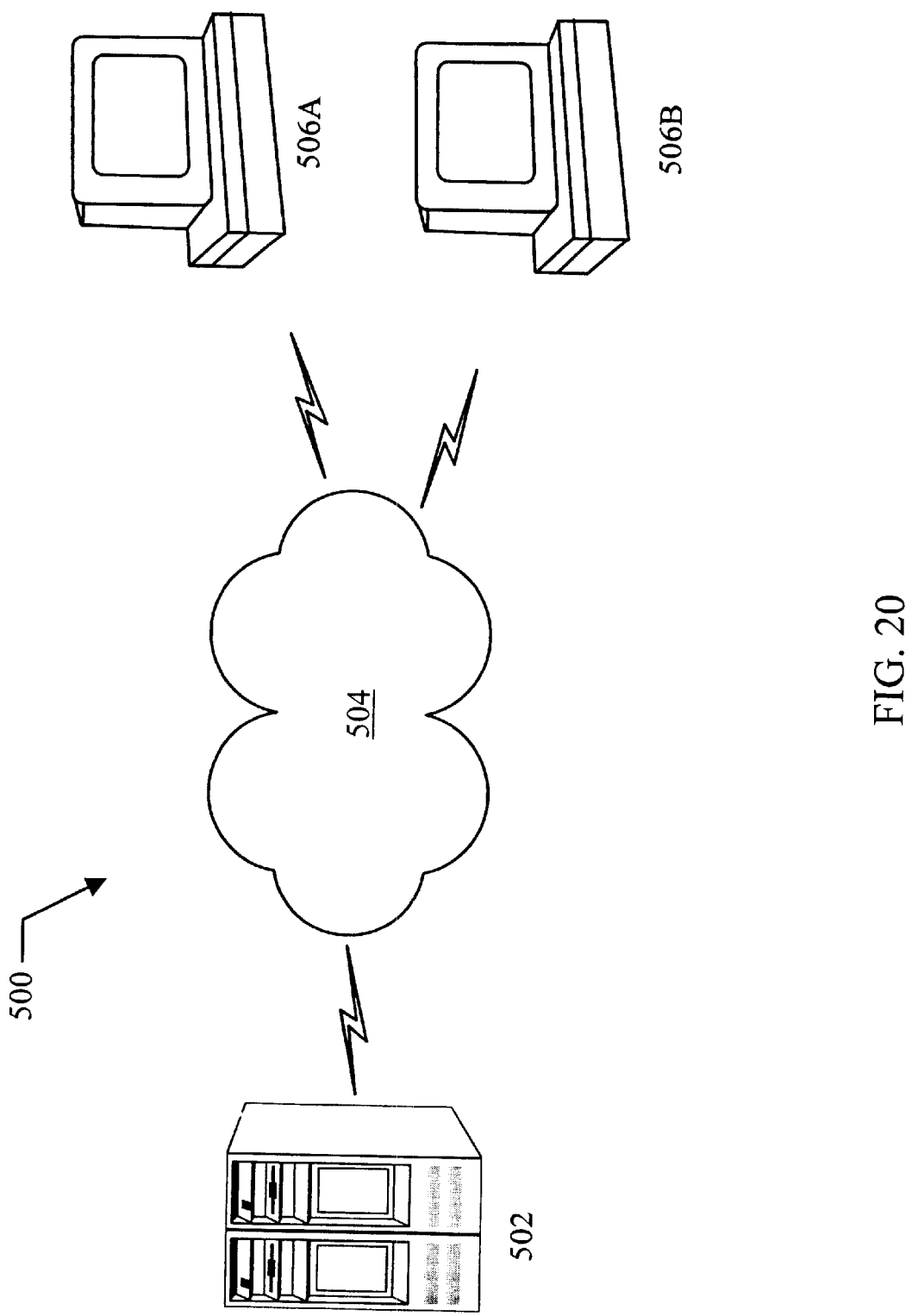
FIG. 20 is a diagram of one embodiment of a computer network connecting multiple computers.

Referring now to FIG. 20, a computer network 500 is shown comprising at least one server computer 502 and one or more client computers 506A–N. (In the embodiment shown in FIG. 4, client computers 506A–B are depicted). One or more of the client systems may be configured similarly to computer system 80, with each having one or more graphics systems 112 as described above. Server 502 and client(s) 506 may be joined through a variety of connections 504, such as a local-area network (LAN), a wide-area network (WAN), or an Internet connection. In one embodiment, server 502 may store and transmit 3-D geometry data (which may be compressed) to one or more of clients 506. The clients 506 receive the compressed 3-D geometry data, decompress it (if necessary) and then render the geometry data. The rendered image is then displayed on the client's display device. The clients render the geometry data and display the image using super-sampled sample buffer and "on-the-fly" filter techniques described above. In another embodiment, the compressed 3-D geometry data may be transferred between client computers 506.

10. Filtering

As mentioned above, a sample-to-pixel calculation unit generates output pixels by filtering rendered samples. FIG. 11B shows a graphical representation of the filtering process. The sample space is subdivided into an array of bins. In one embodiment, each bin may correspond to a unit pixel in screen space area. In other embodiments, a bin may correspond to a screen space area greater than or less than a unit pixel. The bin sample capacity, i.e. the number of samples stored per bin, may take any of a variety of values. For example, the bin sample capacity may equal 1, 2, 4, 8, 16, 32 or any power of two subject to the fundamental limitations of cost and geographical board area for additional memory chips. While powers of two are preferred, the bin sample capacity may take other positive integer values. In some embodiments, different regions of screen space may have different bin sample capacities. In one embodiment, the bin sample capacity (or capacities) may be determined at system initialization time and/or may be dynamically reprogrammed.

In one embodiment, the convolution kernel 400 has a circular support with a diameter $d_s$ equal to 5 bins. Every sample within the circular (or other shape) support of the filter may contribute to the pixel currently being computed. The filter center defines the pixel location. Pixel values (e.g. red, green, blue, and alpha) may be computed by forming a weighted sum of the corresponding values of the samples falling within the support of the filter.

The filter weight given to each sample depends on the filter function being used and on the distance of the sample from the filter center. Note that both the term "filter weight" and the term "filter coefficient", as used herein, refer to the value of the filter function at a certain distance from the filter center. Also, note that each sample and each pixel may comprise a plurality of attributes, and therefore, each sample and each pixel may comprise a plurality of values. For example, when generating pixels for a color display, three values may be used for the representation of color for each pixel. In addition, for certain applications, an alpha value may also be included. In one embodiment, the samples and pixels may comprise values for red, green, blue, and alpha. That is, an independent filtering process may be performed for each of the different attributes (e.g., red, green, blue, and alpha). In general, the pixel values for red (r), green (g), blue (b), and alpha ($\alpha$) are computed using the corresponding sample values (for samples within the filter support) as set forth in Equations 1–4 of FIG. 21. For example, the red pixel value $r_i^p$ is determined by computing a weighted sum of the red sample values $r_j^s$ for samples falling in the filter support.

In the equations, the superscript p denotes a pixel value, and the superscript s denotes a sample value. The filter weights are represented by c, and the summation over j is a summation over the samples that are within the support (i.e. extent) of the filter. Equations 1–4 of FIG. 21 assume that the filter coefficients are pre-normalized, i.e., $$\sum_j c_j = 1.$$

Figure 22A:
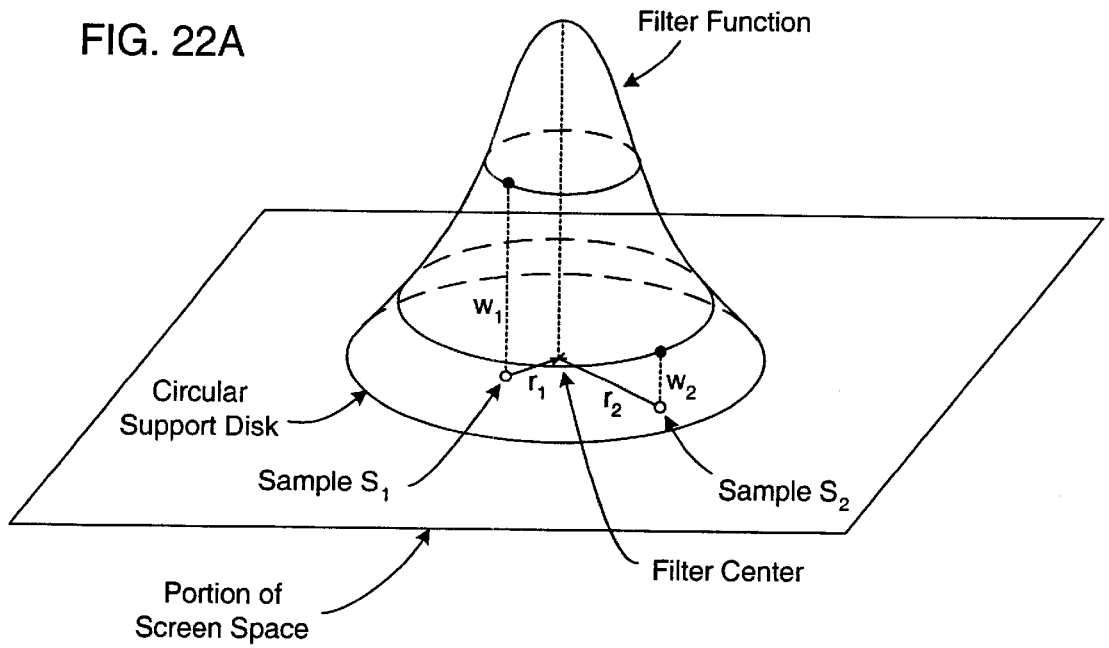
FIGS. 22A–B illustrate the assignment of filter weights to samples based on a filter function according to one embodiment.
Figure 22B:
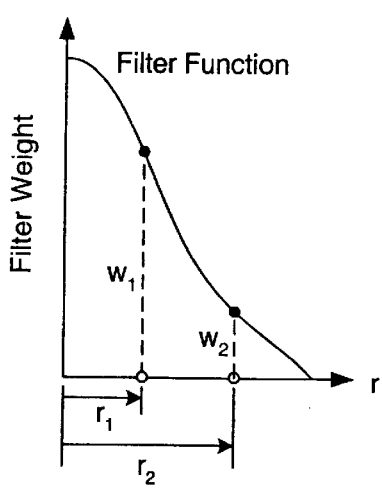

FIGS. 22A&B show a typical filter that may be used in the filtering process. The filter is radially symmetric and has a circular support. Two samples $S_1$ and $S_2$ are shown inside the circular support disk. Their radii $r_1$ and $r_2$ with respect to the filter center determine their respective filter weights $w_1$ and $w_2$. Typically, the number of samples falling within the filter support is much larger than two. However, only two samples are shown for the sake of clarity in illustration. FIG. 22B emphasizes that the filter of FIG. 22A is a function of radial distance r from the filter center. Note that the shape and width of the filter as shown are only examples. The filter weight for each sample may be computed from its horizontal and vertical displacements in screen space with respect to the filter center. In some embodiments, a function of the distance from the sample to the center of the pixel may be used, for example, the square of the distance.

If the filter coefficients are not normalized to one, i.e.

$$\sum_j c_j \neq 1,$$

then the filtering process will either attenuate or amplify color values in conversion from samples to pixels. Because unity gain is generally desirable, the filter coefficients $c_j$ may be pre-normalized, i.e. normalized before they are used in the weighted sum computations. The pre-normalization may be accomplished by dividing each filter weight $c_j$ by the cumulative sum $$\sum_j c_j,$$

i.e. the sum of the filter weights corresponding to samples inside the filter support, as shown in Equation 5 of FIG. 21. The resulting filter weights $c_j^n$ will then obey the unity normalization condition, i.e.

$$\sum_j c_j^n = 1.$$

Observe that this pre-normalization may require as many divisions as there are samples in the filter support.

If the cumulative sum $$\sum_j c_j$$

remains constant from one pixel to the next in a pixel array, the pre-normalizing divisions described above may be performed once, and the resulting normalized filter weights $c_j^m$ may be used repeatedly for each pixel in the pixel array. However, in many cases the cumulative sum $$\sum_j c_j$$

of filter weights may vary from pixel to pixel. For example, the filter function, the filter support, the number of samples falling within the filter support, and/or the relative positions of samples with respect to the filter center may vary from pixel to pixel. Furthermore, the filtering may take place over a region of non-uniform sample density, at the edges of the sample space (or screen space), and/or over samples that are not at fixed positions from the filter center (i.e., the samples may not be located on a regular grid). In such cases, it may be computationally expensive to perform the pre-normalizing coefficient divisions for each pixel. Thus, in one set of embodiments, the original filter weights cj are used to generate intermediate weighted sums $$\sum_j c_j x_j,$$

where $x_j$ represents a generic sample value (e.g. red, green, blue, or alpha), and the intermediate weighted sums are normalized by the cumulative sum $$\sum_j c_j$$

of filter weights. This computation may be referred to herein as post-normalization. See Equations 6–9 of FIG. 21 for an example of the post-normalization computation for the red, green, blue and alpha attributes. Post-normalization may require as many divisions as there are pixel attributes, and thus, may be significantly less expensive computationally than per-pixel pre-normalization. The cumulative sum $$\sum_j c_j$$

will be also referred to herein as the normalization factor.

Figure 23A:
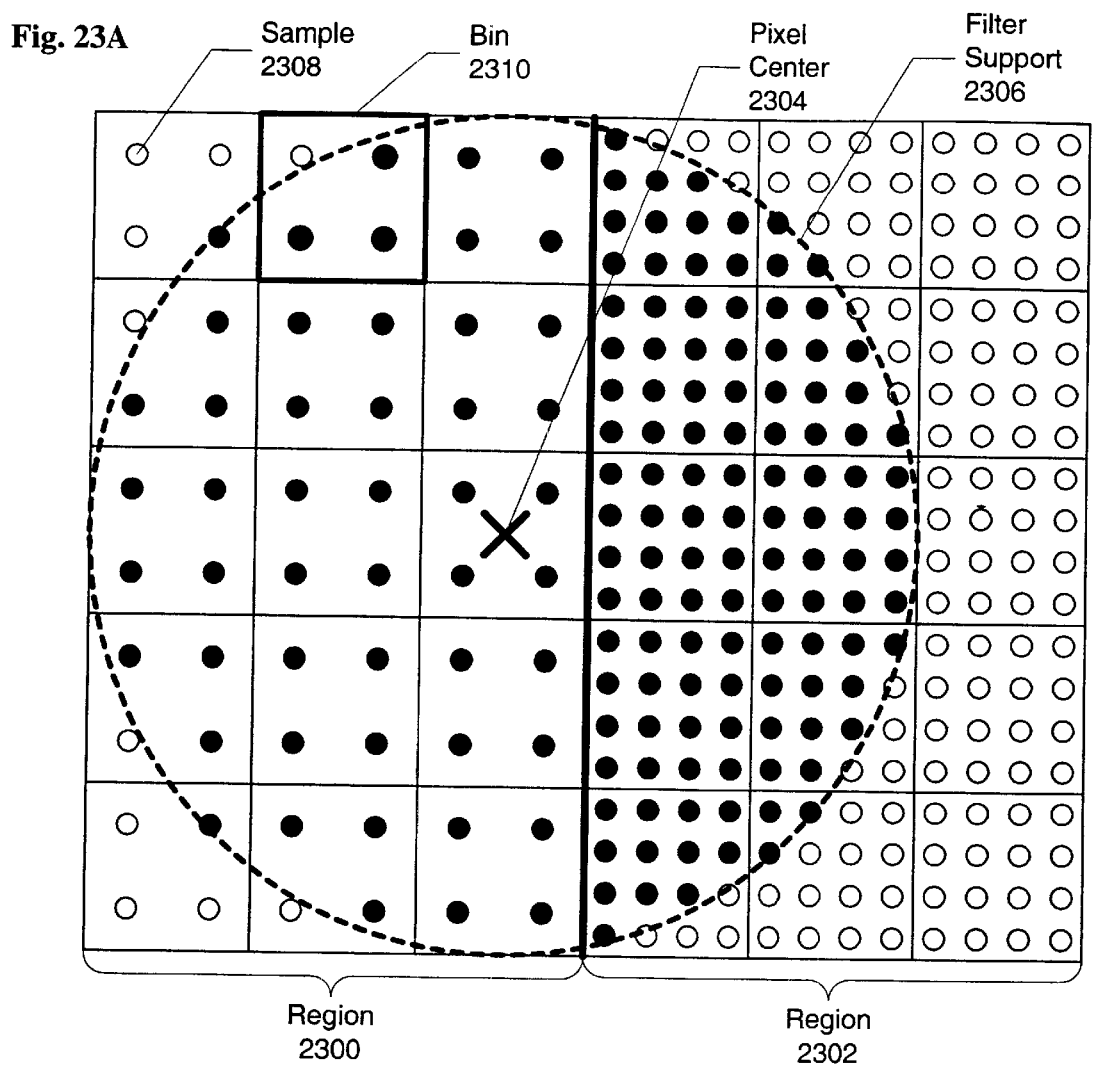
FIGS. 23A–B presents an example of a pixel computation where the filter support overlaps regions of different sample density.

FIG. 23A shows an example of filtering where the filter support extends over regions of different sample densities. Bins are represented by squares, for example, bin 2310. The rendered samples are represented by small circles (i.e. both filled and unfilled small circles), for example, sample 2308. Region 2300 is a region of low sample density (4 samples/bin in this example), and region 2302 is a region of high sample density (16 samples/bin in this example). Region 2302 may correspond, for example, to foveal region 354 of FIG. 15, and region 2300 may correspond to medial region 352. That is, a higher sample density may be used in regions where the eye is more sensitive or in regions where a higher quality image is desired.

Figure 23B:
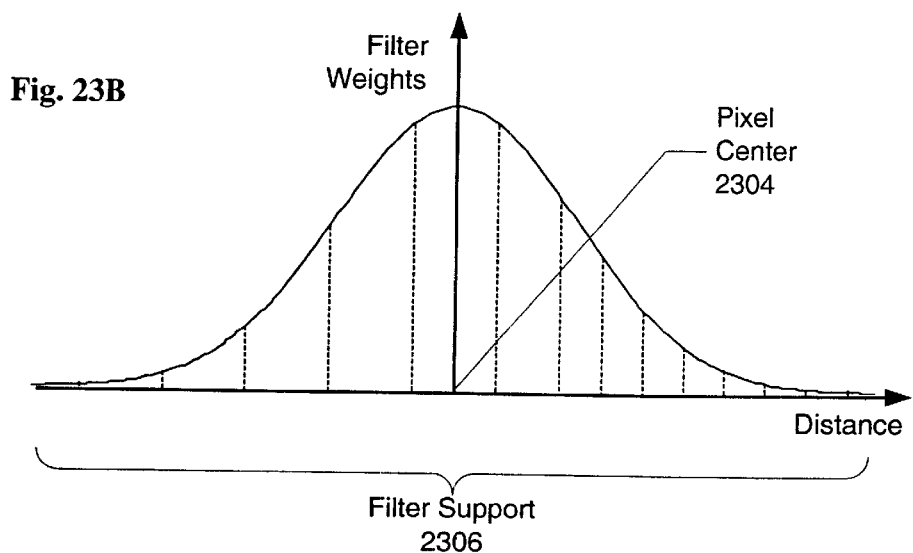

The filter is positioned at pixel center 2304. The filter has a circular support 2306. Samples falling inside (outside) the filter support 2306 are denoted by small black dots (small unfilled circles). The interior samples are used in computing the value of the current pixel. As shown, the filter has a support diameter of 5 bins. FIG. 23B shows a graph of the filter along a representative diameter of filter support 2306 with the dotted lines representing the filter weights at various sample positions. If the filter center were shifted one bin distance to the right, the filter support 2306 would contain a significantly larger number of high density samples and a smaller number of the low density samples, and the total collection of interior samples would have a distinct set of relative distances with respect to the new filter center. Thus, the normalization factor may vary significantly from pixel to pixel, especially for pixels near a boundary between two sample density regions, and especially in a direction normal to the region boundary.

Figure 24A:
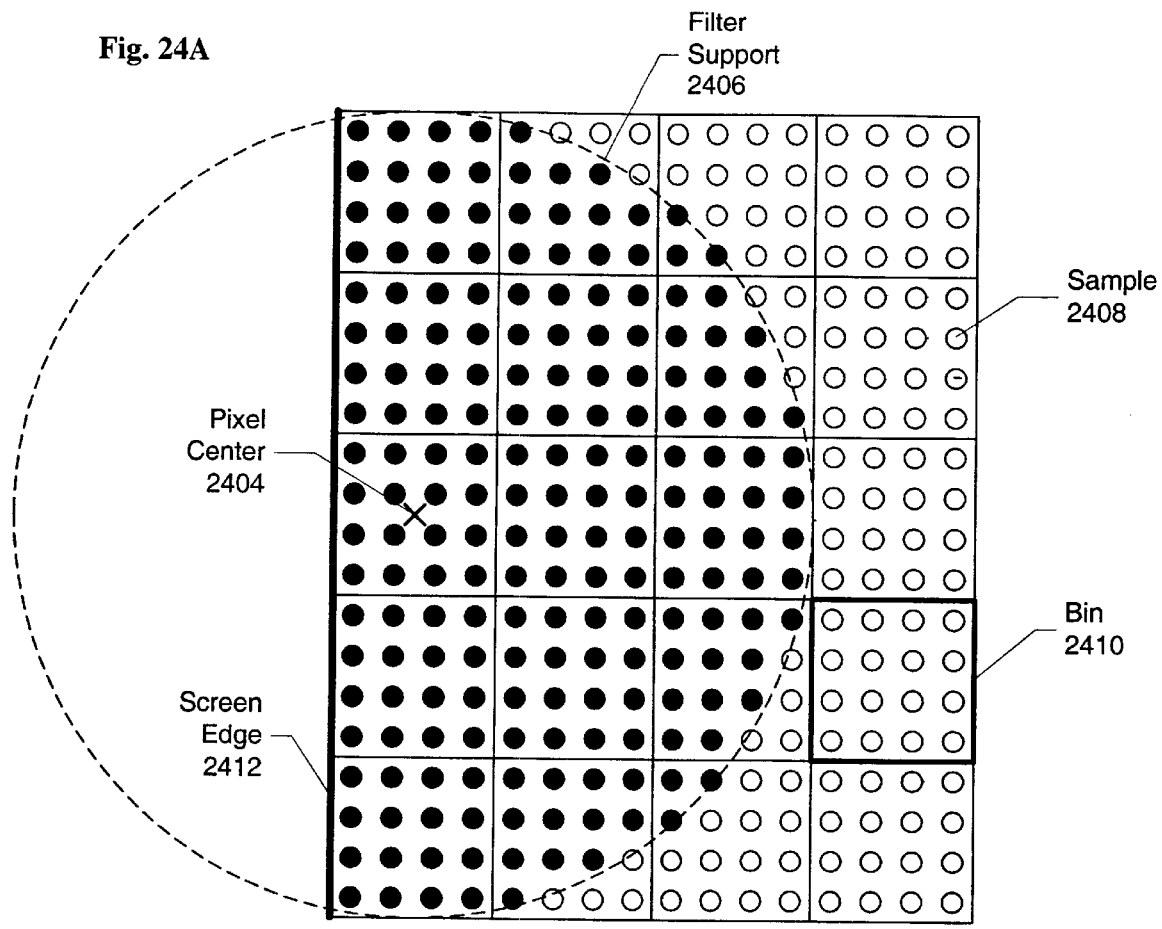
FIGS. 24A–B presents an example of a pixel computation where the filter support overlaps the edge of the sample space.
Figure 24B:
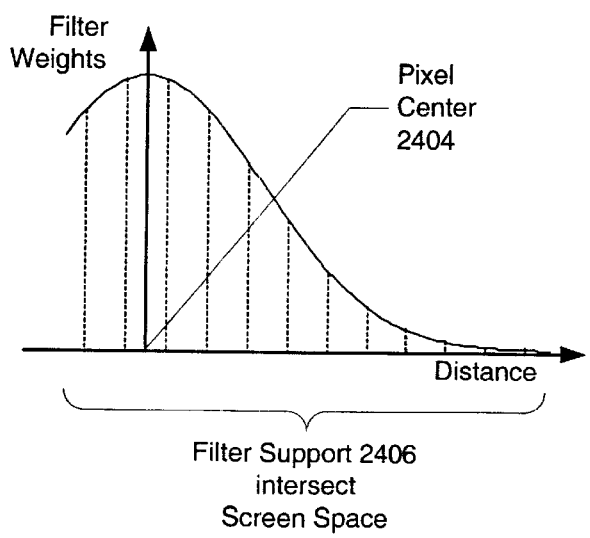

FIG. 24A shows an example of filtering where the filter support 2406 extends outside the sample space (or screen space). In this figure, bins are represented by squares, for example, bin 2410. The rendered samples are represented by small circles (i.e. both filled and unfilled small circles), for example, sample 2408. The filter used in the filtering process is centered at pixel center 2404 and has a circular support 2406. Because the filter center is close to screen edge boundary 2412, the filter support 2406 extends outside the screen space. As a result, the number of samples that are included in the computation of the given pixel may be less than the number of samples that would be included in the computation of a pixel that is well within the interior of the screen space. This same effect is also shown in FIG. 24B where the dotted lines correspond to the filter weights of samples included in the filter support 2406 along a representative diameter of the filter support. Note that a portion of the graph to the left of the screen edge 2412 is cut off indicating that no samples are available outside the screen space. If the filter center were shifted one pixel distance to the right or left, the number of samples included in filter support would change significantly. Thus, the normalization factor may vary significantly from pixel to pixel, for pixels near the edge of the screen space, and especially in directions normal to a screen space edge.

It is noted that in some embodiments, rendering units 150 may generate dummy bins with dummy samples outside the screen space by reflection (and/or translation) of corresponding bins inside the screen space. In these embodiments, the number of samples in the filter support may remain more uniform even for pixels near the screen space boundary.

Figure 25A:
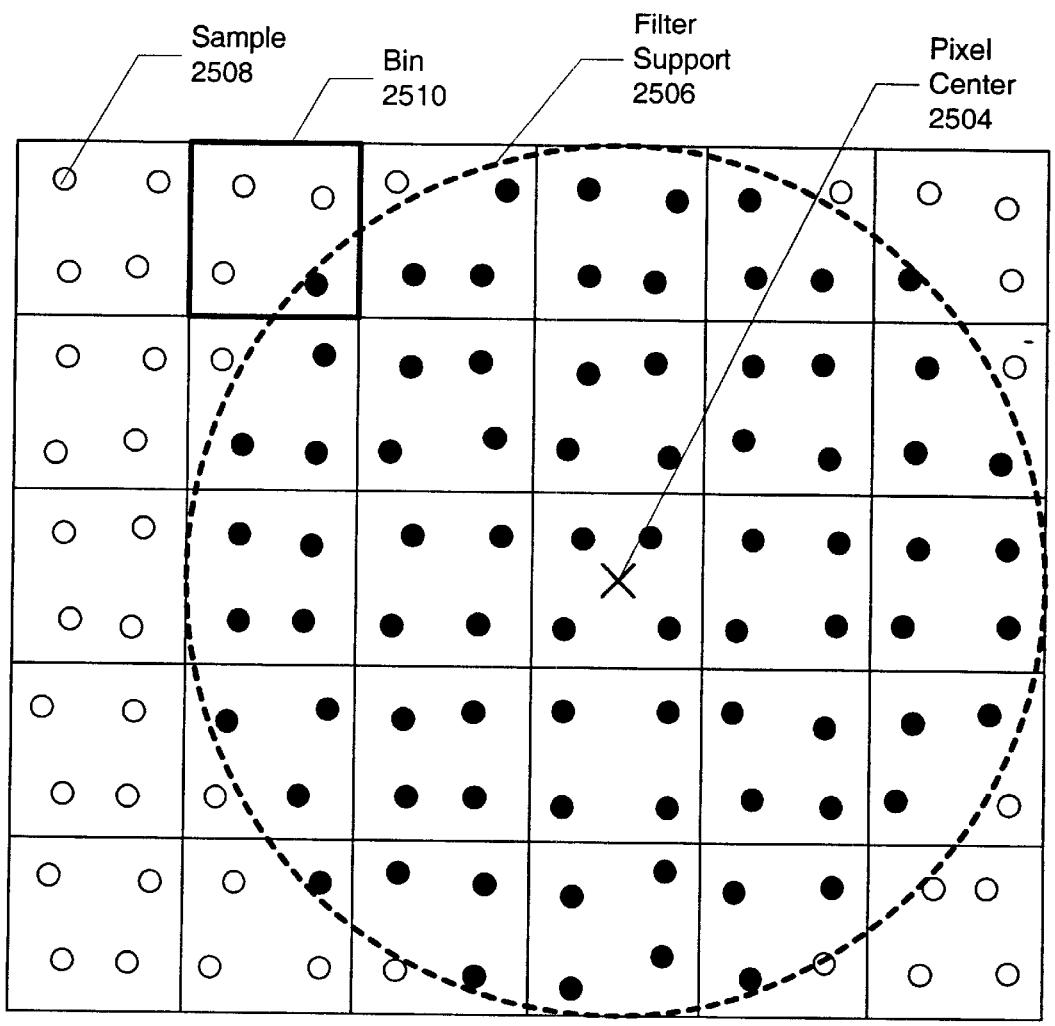
FIGS. 25A–B presents an example of a pixel computation where the filter support lies in a region of samples arranged in a non-regular (e.g. pseudo random) fashion.

FIG. 25A shows an example of filtering where the sample positions are not on a regular grid. Rather, the sample positions may be on a perturbed regular grid or on a stochastic grid. Bins are represented by squares, for example, bin 2510. The rendered samples are represented by the small circles (i.e. both filled and unfilled small circles), for example, sample 2508. The pixel being calculated is centered at pixel center 2504. The filter used in the filtering process is also centered at pixel center 2504 and has a filter support 2506.

Figure 25B:
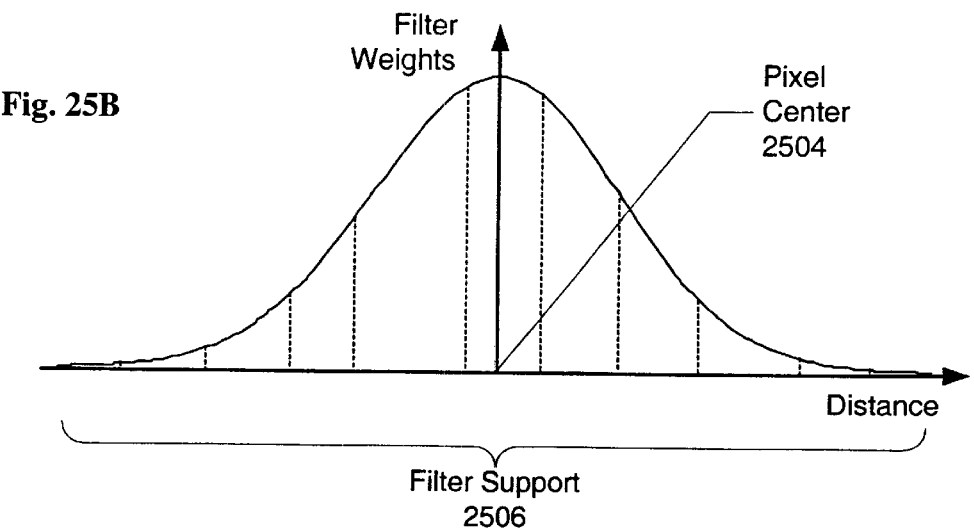

Because the samples are not on a regular grid, the number of samples that are included in the computation of the pixel and the position of these samples relative to the filter center may vary from pixel to pixel. This is suggested in FIG. 25B where the dotted lines correspond to filter weights for the samples in the support of the filter. Therefore, in embodiments where the samples are not on a regular grid, the normalization factor for the filter coefficients may vary from pixel to pixel.

In some embodiments, for the cases mentioned above, the normalization factor $$\sum_j c_j$$

may be computed for every pixel. The normalization factor may be computed in parallel with one or more of the weighted sums $$\sum_j c_j x_j$$

associated with each pixel. Recall that one weighted sum is associated with each pixel attribute such as red, green, blue and alpha. After performing the weighted sums for the pixel attribute values, the weighted sums may be divided by the normalization factor as suggested by Equations 6–9 of FIG. 21.

Figure 26:
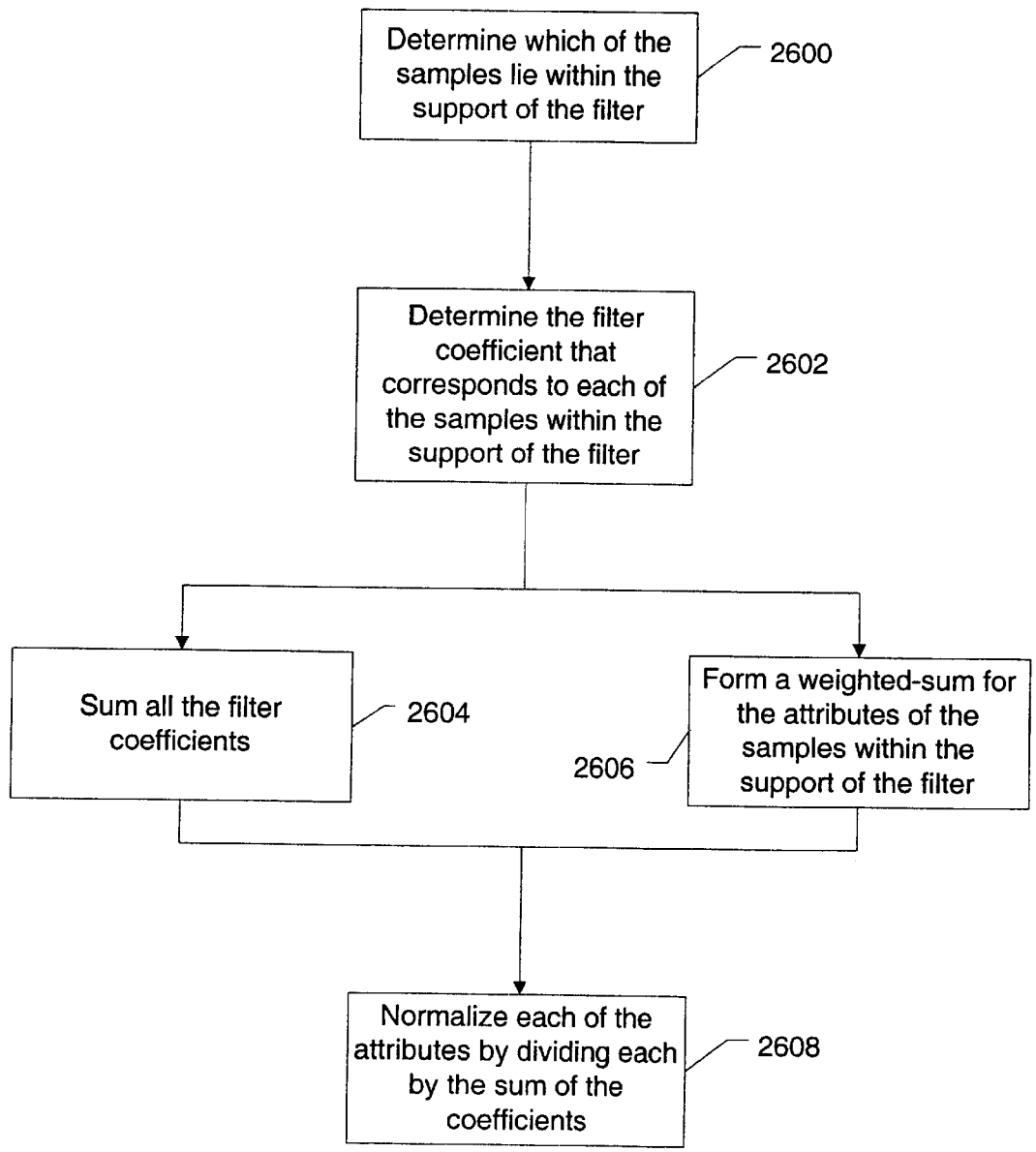
FIG. 26 is a flowchart describing the filtering process according to one embodiment.

FIG. 26 shows a flowchart describing one embodiment of a method for filtering the samples to generate an output pixel. In step 2600, the graphics system (e.g. one of the sample-to-pixel calculation units) determines which samples are within the support of the filter. Only the samples within the support of the filter are included in the filtering for the generation of pixels. For example, a sample-to-pixel calculation unit may determine a set of candidate bins which interact with the filter support. The sample-to-pixel calculation unit may access sample buffer 162 for samples corresponding to this set of candidate bins. For each sample in the candidate bins, the sample-to-pixel calculation unit may compute a radius (or radius squared) of the sample with respect to the filter center. If the sample radius (or radius squared) is smaller than the radius (or radius squared) of the filter support, the sample is an interior sample. It is noted that other distance measures may be used to compute the sample radius. For example, the sample radius may be computed according to the $L^1$ norm or the $L^{infinity}$ norm. The $L_1$ norm of a vector is defined as the sum of the absolute values of its components. The $L^{infinity}$ norm of a vector is defined as the maximum of the absolute values of its components.

In step 2602, the filter coefficients for each of the samples within the filter support are computed. The filter coefficient for each sample depends on the distance of the sample from the pixel center and on the filter function being used. The filter coefficients may be determined by function evaluation (e.g. Taylor series computation), table lookup, or any combination thereof. A table of filter coefficients may be indexed by sample radius (or radius squared). Any of a variety of interpolation schemes may be applied to more accurately estimate filter coefficients for sample radii intermediate to those represented in the table.

In step 2604, the coefficients for the samples within the filter support are summed to obtain the normalization factor $$\sum_j c_j.$$

In one embodiment, the coefficient summation may be implemented by an adder tree to be described more fully below.

In step 2606, a weighted sum $$\sum_j c_j x_j$$

of the samples values $x_j$ for samples falling within the filter support is formed for each of the pixel attributes. In one embodiment, the pixels (and samples) may have, for example, red, green, blue, and alpha attributes. The samples may also have other attributes that may be weighted and summed.

As shown here, steps 2604 and 2606 (i.e. the sum of the coefficients and the weighted sums of the attributes) may be performed in parallel. Note that in other embodiments, the sum of the coefficients and the weighted sums of the attributes may be performed sequentially. In another embodiment, a first and second group of sums may be performed sequentially with the sums within each group being performed in parallel. For example, the sum of the coefficients and the weighted sums of red and green may be performed first, and then at a later time, the remaining weighted sums of blue and alpha may be performed. The sums may be performed in any order or combination.

In one embodiment, the computation of products $c_j^* x_j$ for a given coefficient $c_j$ may be initiated as soon as (or soon after) the coefficient $c_j$ has been computed. In other words, it is not necessary to wait until all the coefficients have been computed before initiating computation of the products $c_j^* x_j$. Furthermore, the cumulative sum $$\sum_j c_j x_j$$

may be initiated before all the coefficients have been computed, thus, step 2602 may operate in parallel (e.g. in a pipelined fashion) with step 2606.

In step 2608, the weighted sums for each pixel attribute may be divided by the normalization factor resulting in normalized pixel values as indicated in Equations 6–9 of FIG. 21.

Figure 27:
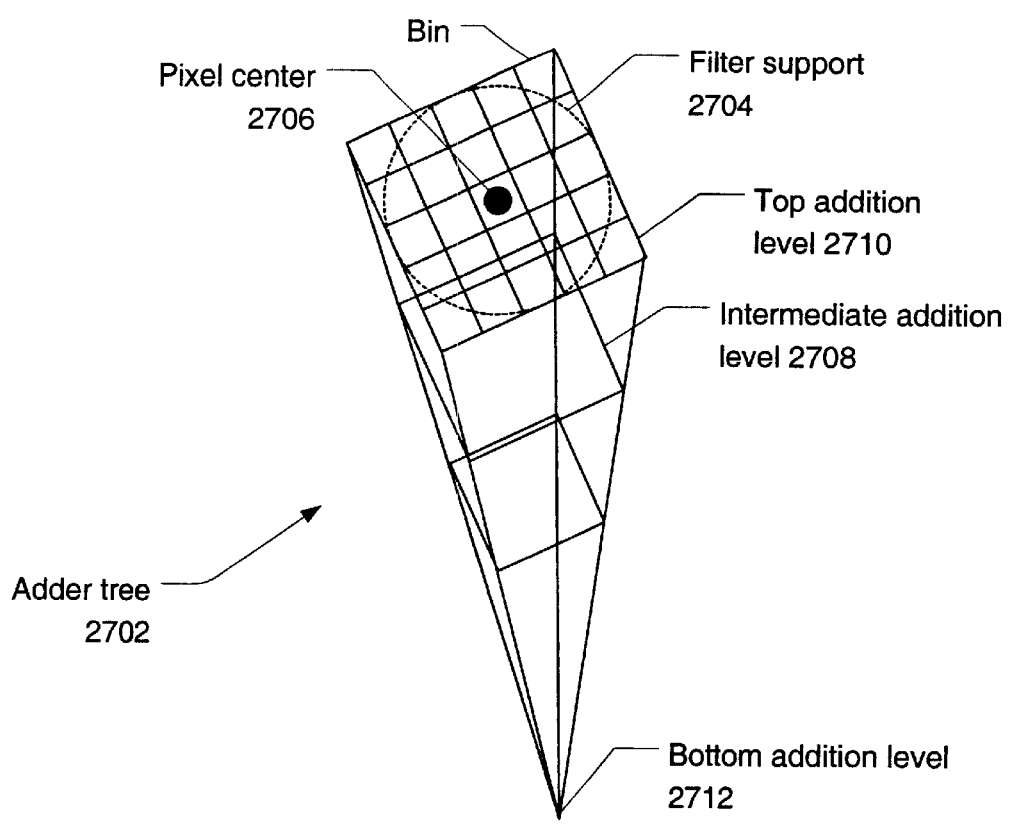
FIG. 27 is a diagram showing the multiple addition levels of an adder tree according to one set of embodiments.

FIG. 27 shows a functional diagram according to one embodiment of an adder tree 2702 that may be used to compute the sum of the filter coefficients and/or the sum of the weighted sample values for any or all of the pixel attributes. The adder tree comprises multiple addition levels. Each addition level includes a set of adder cells. The top addition level 2710 receives the input data values for a summation, and the bottom addition level 2712 outputs the resultant value of the summation, i.e. the sum of all (or selected ones) of the input data values. Each intermediate level such as intermediate addition level 2708 may perform additions of values provided by a previous level, and transmits its results to the next level. Note that FIG. 27 represents a flowchart of the adder tree's operation and may not necessarily correspond to the physical layout of the adder tree. In one embodiment, one or more adder trees may be comprised within each of the sample-to-pixel calculation units 170.

Figure 28:
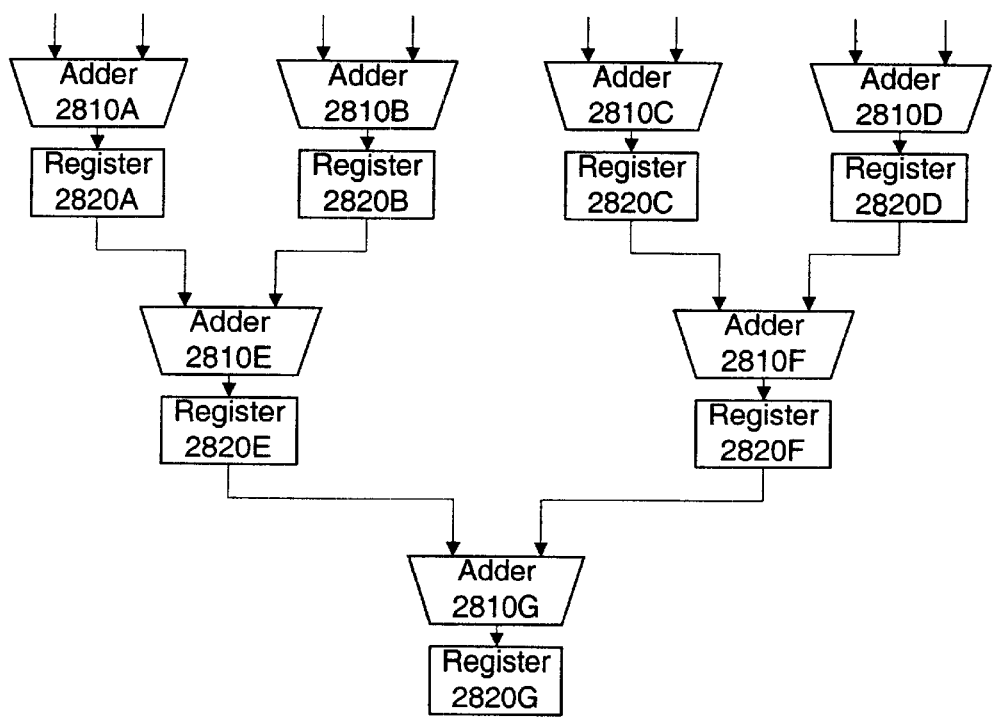
FIG. 28 illustrates one embodiment of an adder tree which may be used in the filtering process, the adder tree mainly comprising carry-propagate adders.

FIG. 28 shows a portion of three consecutive levels in adder tree 2702 according to one embodiment. Adder tree 2702 may comprise carry-propagate adders 2810A–G and registers 2820A–G. Each of adders 2810A–G may receive two binary numbers and output a single binary number equal to the sum of the two numbers received. Registers are typically placed after each adder and are configured to buffer the intermediate summation results. It is noted that FIG. 28 is not meant to imply that the adder tree 2702 is limited to three levels. Adder tree 2702 may include any desired number of levels subject to the fundamental design constraints such as cost, availability of layout area and maximum latency.

Figure 29:
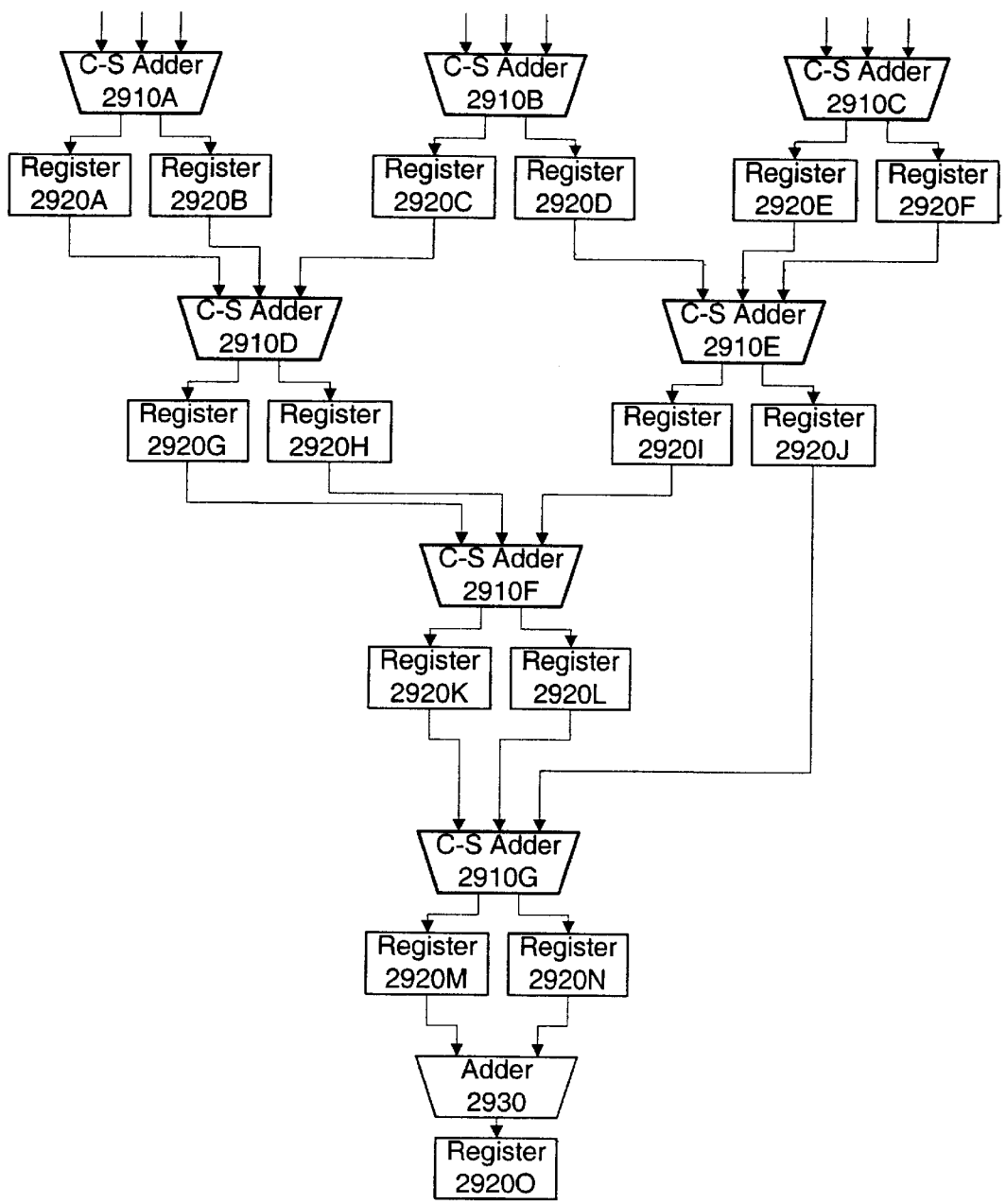
FIG. 29 illustrates another embodiment of an adder tree which may be used in the filtering process, the adder tree mainly comprising carry-save adders.

FIG. 29 shows the last four consecutive levels in another embodiment of adder tree 2702. In this embodiment, adder tree 2702 may comprise carry-save adders 2910A–G, registers 2920A–O, and carry-propagate adder 2930. Each of the carry-save adders is operable to receive three numbers as input and output two numbers. The sum of the three input numbers is equal to the sum of the two output numbers. Carry-save adders typically perform summations faster than carry-propagate adders. As a result, an adder tree comprising carry-save adders may perform additions faster than an adder tree comprising carry-propagate adders. The carry-propagate adder 2930 may be reserved for the bottom addition level 2712 where is may be necessary to present the final summation as a single operand.

FIGS. 28 and 29 illustrate examples of tree configurations. A plurality of adder cells are said to be coupled in a tree configuration when each adder cell of each level after the first is fed by a unique set of operands generated by adder cells of a previous level.

Figure 30A:
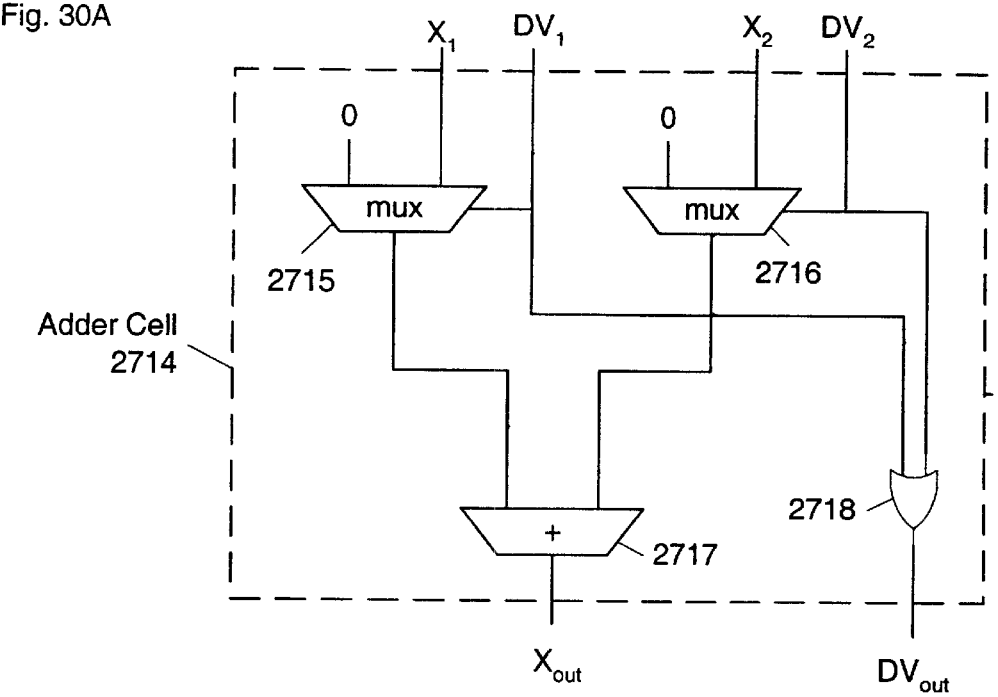
FIG. 30A illustrates one embodiment of an adder cell which may be used to construct an adder tree.

As indicated above, each level of adder tree 2702 comprises a set of adder cells. FIG. 30A illustrates one embodiment of an adder cell, i.e. adder cell 2714, which conditionally adds input operands $X_1$ and $X_2$ depending on the state of corresponding data valid inputs $DV_1$ and $DV_2$. Each of input operands $X_1$ and $X_2$ may comprise an N-bit digital numeric value. In various embodiments, the parameter N may take any desired positive integer value. Adder cell 2714 comprises multiplexors 2715 and 2716, adder 2717, and OR gate 2718. The output of multiplexor 2715 equals the input operand $X_1$ when data valid $DV_1$ is high (i.e. $DV_1=1$), and equals zero when data valid $DV_1$ is low (i.e. $DV_1=0$). Similarly, the output of multiplexor 2716 equals the input operand $X_2$ when data valid $DV_2$ is high, and equals zero when data valid $DV_2$ is low. Thus, the output of adder 2717 equals one of zero, $X_1$, $X_2$ or $X_1+X_2$ depending on the state of the data valid bits. In particular, each input operand is represented in the output value $X_{out}$ only if its associated data valid signal is high. Adder cell 2714 also generates a data valid output signal $DV_{out}$ which is the logical OR of input data valid signal $DV_1$ and $DV_2$. See OR gate 2718.

It is noted that a multiplexor may be realized by an appropriate combination of logic gates, i.e. AND gates and OR gates.

In one alternative embodiment, adder cell 2714 may be modified to use a carry-save adder. In this configuration, adder cell 2714 may receive three input operands, each with a corresponding data valid input signal, and to generate two output operands and a single data valid output signal (which indicates the validity of the two output operands). The data valid output signal may be the logical OR of the three data valid input signals.

Figure 30B:
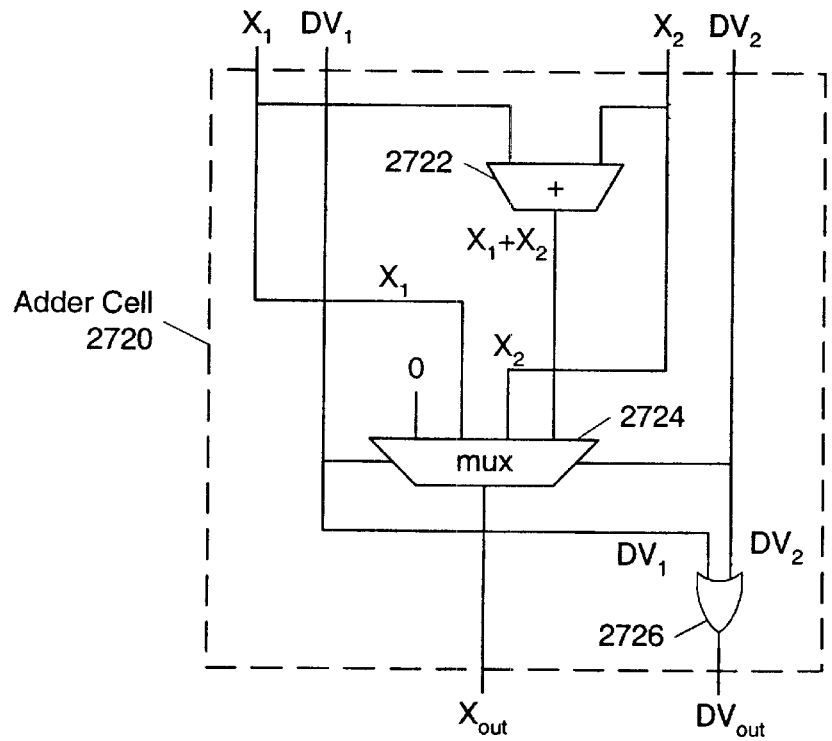
FIG. 30B illustrates another embodiment an adder cell which may be used to construct an adder tree.

FIG. 30B illustrates another embodiment of an adder cell, i.e. adder cell 2720, which has the same input-output relation as adder cell 2714. Adder cell 2720 comprises an adder 2722, a multiplexor 2724, and an OR gate 2726. The adder 2722 generates the sum of the input operands $X_1$ and $X_2$. Multiplexor 2724 receives four inputs: a signal tied to zero, input operand $X_1$, input operand $X_2$, and sum value $X_1+X_2$. The multiplexor output equals one of the four inputs depending on the two data valid signals $DV_1$ and $DV_2$. In particular, the multiplexor output $X_{out}$ equals zero if the two data valid signals are low, equals $X_1$ if data valid $DV_1$ is high and data valid $DV_2$ is low, equals $X_2$ if data valid $DV_2$ is high and data valid $DV_1$ is low, and equals $X_1+X_2$ if both data valid signals are high. Similar to the previous embodiment, OR gate 2726 may generate a data valid output signal $DV_{out}$ which is the logical OR of the input data valid signals $DV_1$ and $DV_2$. It is noted that adder cell 2720 may be modified to operate with a carry-save adder instead of a carry-propagate adder, and with three input operands (and corresponding data valid signals) instead of two.

In one embodiment, adder tree 2702 may be composed of adder cells as suggested by FIG. 30A and/or FIG. 30B. Each adder cell in layers after the top addition level 2710 may receive the value $X_{out}$ and corresponding data valid signal $DV_{out}$ from two adder cells of the previous level (through intervening buffer registers). The top addition level may receive a set of input data values and a corresponding set of data valid bits. Each data valid bit indicates the validity of a corresponding one of the input data values. Thus, adder tree 2702 may generate a summation output from the bottom addition level 2712 which selectively includes any combination of the input data values presented to the top addition level 2710. In other words, only those input data values whose data valid bits are set are included in the summation output.

Any given adder cell and the adder cells from previous layers which feed the given adder cell comprise a subtree. The output $X_{out}$ from the given adder cell represents a summation of those input operands presented at the top layer of the subtree which are valid as indicated by their data valid signals. The data valid signal $DV_{out}$ from the given adder cell is zero only if all the input operands presented to the top layer of the subtree have data valid signal equal to zero, i.e. all the subtree input operands are invalid.

Adder tree 2702 may be used to generate the summation $$\sum_j c_j$$

of filter coefficients and/or any of the summations $$\sum_j c_j x_j$$

of the weighted sample values. In one embodiment, the top level 2710 of the adder tree 2702 may have a sufficient number of inputs to accommodate all the samples in a set of candidate bins, i.e. a set of bins which contain the filter support. For example, FIG. 27 illustrates a 5×5 array of bins which minimally contain the filter support 2704. Each input may carry a numeric operand and a corresponding data valid signal. The data valid signal indicates whether the corresponding numeric operand is to be included in the summation to be generated by adder tree 2702.

Thus, for a summation of the filter coefficients (or any of the weighted sample values), the data valid bits corresponding to samples outside (inside) the filter support may be set to zero (one). In this fashion, only the terms corresponding to positions inside the filter support are incorporated in the summation output from the adder tree.

In some embodiments, graphics system 112 may include one or more sample request units. A sample request unit may request a group of samples from sample buffer 162 in anticipation of the next pixel computation (or next set of pixel computations) to be performed by a sample-to-pixel calculation unit. In one embodiment, the sample request unit may perform one or more positional tests on the received samples. For example, the sample request unit may determine the distance of the received samples with respect to a current filter center, and set the data valid bit for each sample to indicate whether the sample is interior or exterior to the current filter support. Each sample-to-pixel calculation unit may include, or couple to, one of the sample request units.

Figure 31:
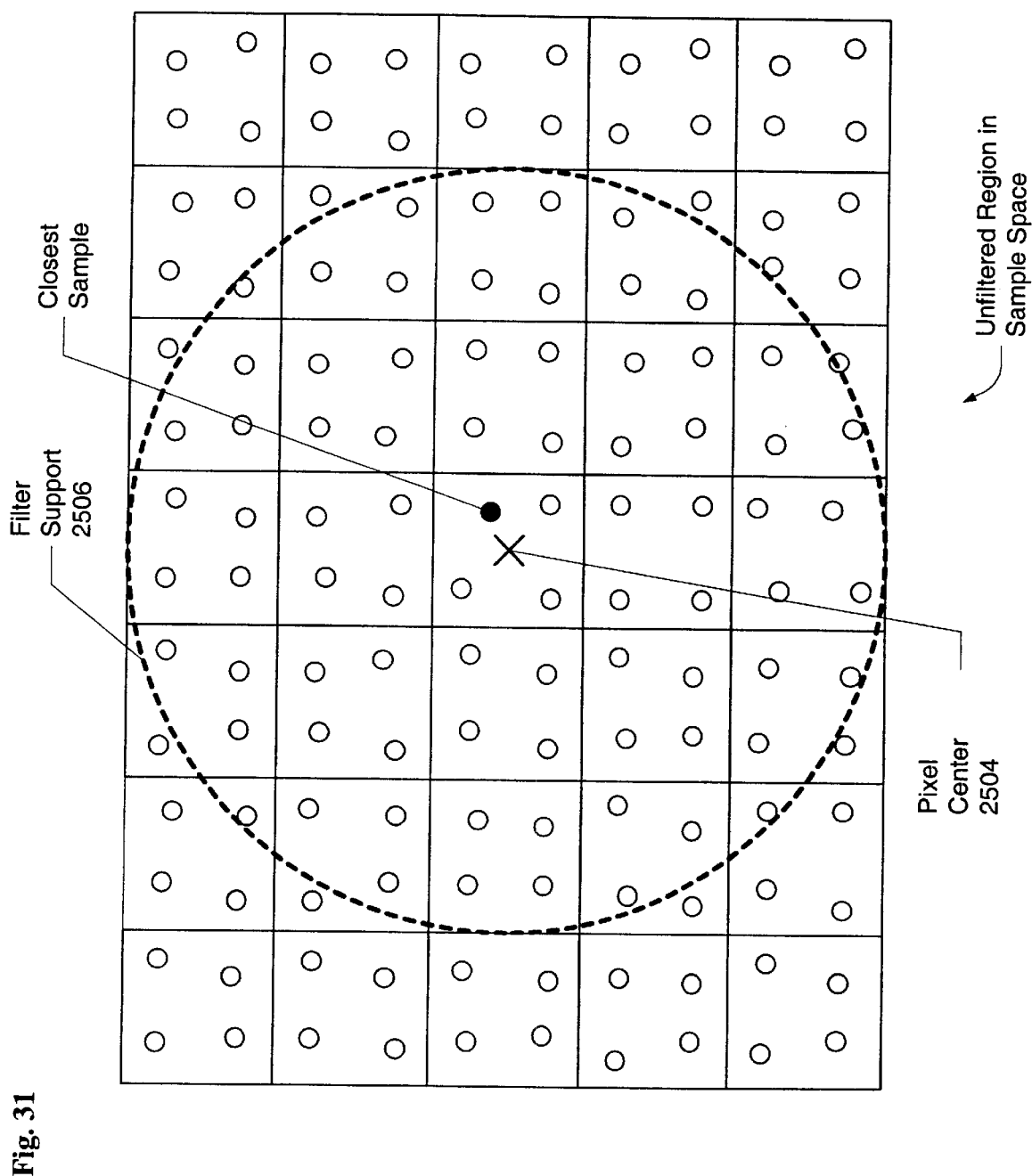
FIG. 31 illustrates an example of a pixel computation based on a "closest sample" criterion, i.e. the values of the current pixel are determined by the sample closest to the filter center.

It is noted that sample-to-pixel calculation units 170 may be configured to turn off sample filtering, and to generate pixel values based on a winner-take-all criterion. In other words, the values of a current pixel may be determined based on a single sample referred to as the "winner-take-all" (WTA) sample. For example, the WTA sample may be an identified sample or the first sample in the bin corresponding to the current pixel. In an alternate embodiment, the sample closest to the current filter center may be the WTA sample as suggested by FIG. 31. Thus, the red, green, blue and alpha values of this closest sample are assigned as the attribute values of the current pixel.

A sample-to-pixel calculation unit may determine the closest sample by computing the distance (or square distance) of samples with respect to the filter center, and identifying the sample with the smallest sample distance (or square distance). It is noted that many of the bins which intersect the filter support may have no chance of contributing the closest sample. Thus, the sample-to-pixel calculation unit may increase the speed of the closest sample determination by searching a more efficient subset of bins. For example, the 3×3 square of bins centered on the bin which contains the filter center may comprise a more efficient bin subset. It is noted that computation of the sample distance (or square distance) with respect to the filter center is included as part of the filter support inclusion-testing step 2600 of FIG. 26. Thus, the closest sample determination described here may be integrated with step 2600. In one embodiment, the sample request unit associated with each sample-to-pixel calculation unit may perform the closest sample determination.

In one set of embodiments, sample-to-pixel calculation units 170 may be configured to enable or disable sample filtering on a region-by-region basis. If the filter center for a current pixel resides in an unfiltered region of the sample space, a sample-to-pixel calculation unit may use a winner-take-all criterion as described above to determine pixel values. If the filter center resides in a filtered region of the sample space, the sample-to-pixel calculation unit may perform spatial filtering of sample values as described variously above to determine pixel values.

Figure 32:
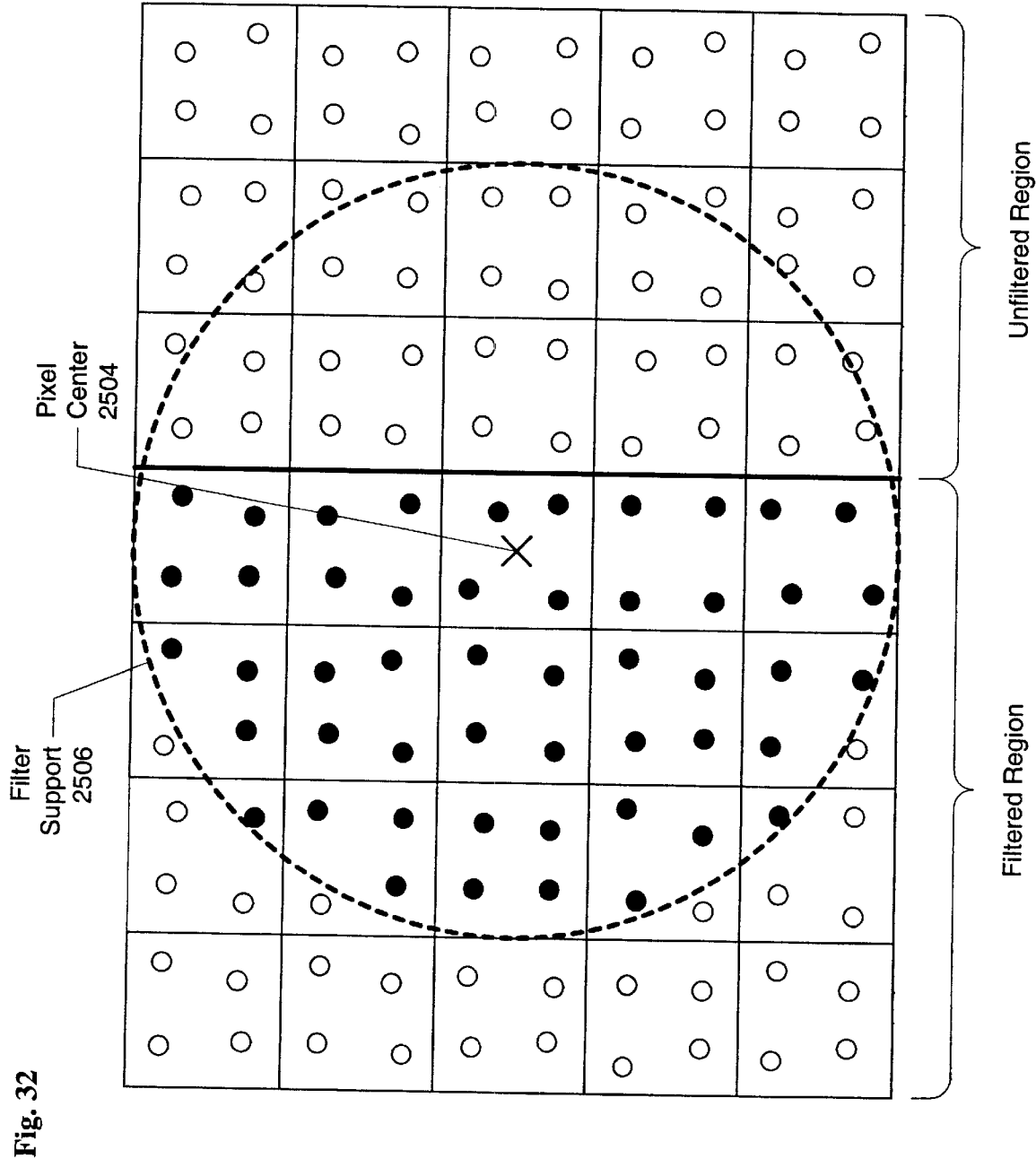
FIG. 32 illustrates an example of a pixel computation where the filter center resides in a filtered region but close to the boundary with an unfiltered region.

FIG. 32 illustrates the computation of a current pixel which resides in a filtered region but near a boundary between filtered and unfiltered regions. The filter center 2504 is within a filtered region. However, the filter support 2506 partially overlaps an unfiltered region. In many situations, it is desirable to determine the values of the current pixel based only on samples falling inside the filter support and inside the filtered region. For example, the samples in the unfiltered region may be generated in response to completely independent graphics information.

In one embodiment, the sample request unit associated with a sample-to-pixel calculation unit may test samples against region boundaries. For a filter center residing in a filtered region as suggested by FIG. 32, the sample request unit may examine each sample in a set of candidate bins (e.g. a rectangle of bins which contains the filter support) to determine if the sample falls inside the given filtered region. Any sample that resides inside the filtered region may have its data valid bit set to one. Any sample that falls outside the filtered region may have its data valid bit set to zero. This "region testing" operation on samples may be performed in parallel with the testing to determine inclusion/exclusion with respect to the filter support described above.

In another embodiment, each sample stored in the sample buffer may include a window ID. The sample request unit may read the window ID of each received sample and use the window ID to reference a window attribute table. The window attribute table stores a set of attributes/parameters for a number of windows which are indexed by window ID value. One of the stored attributes for a window may be an indicator specifying whether the given window is to be treated as filtered or unfiltered for the sake of pixel computation. Thus, the sample request unit may label each sample as filtered or unfiltered by referencing the window attribute table using the sample's window ID.

Figure 33A:
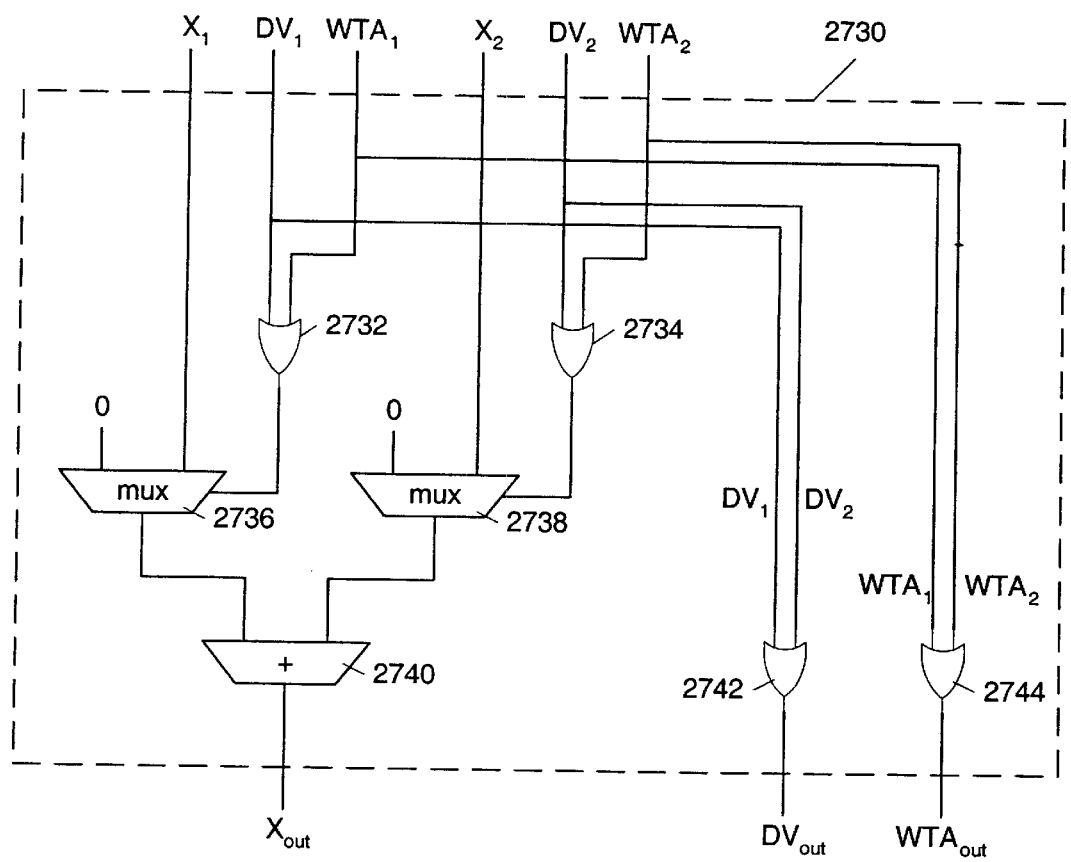
FIG. 33A illustrates one embodiment of an adder cell which performs addition or winner-take-all selection on two input operands based on the state of data valid and winner-take-all input signals.

Because a sample-to-pixel calculation unit may be called upon to perform summations (of coefficient values or weighted sample values) in filtered regions, and selection of values corresponding to the winner-take-all sample in unfiltered regions, it is desirable to have an adder tree which facilitates these dual modes. FIG. 33A illustrates one embodiment of an adder cell, i.e. adder cell 2730, which is useful in implementing such a dual-mode adder tree. Adder cell 2730 comprises OR gates 2732, 2734, 2742 and 2744, multiplexors 2736 and 2738, and adder 2740. Adder cell 2730 receives two input operands $X_1$ and $X_2$, corresponding data valid signals $DV_1$ and $DV_2$, and corresponding winner-take-all signals $WTA_1$ and $WTA_2$.

OR gate 2732 generates the logical OR of data valid signal $DV_1$ and winner-take-all signal $WTA_1$. The output of OR gate 2732 is the selection signal which controls multiplexor 2736. Multiplexor 2736 receives the input operand $X_1$ and a signal tied to zero. The output of multiplexor 2736 equals zero when the selection signal is low, and equals input operand $X_1$ when the selection signal is high. Similarly, OR gate 2734 generates the logical OR of data valid signal $DV_2$ and winner-take-all signal $WTA_2$. The output of OR gate 2734 is the selection signal which controls multiplexor 2738. Multiplexor 2738 receives the input operand $X_2$ and a signal tied to zero. The output of multiplexor 2738 equals zero when the selection signal is low, and equals input operand $X_2$ when the selection signal is high. Adder 2740 adds the outputs of multiplexors 2736 and 2738. Thus, the output $X_{out}$ of adder 2740 obeys the input-output relation given by Table 1 below. It is assumed that at most one of the winner-take-all bits may be high. (In a field of input operands provided to the top layer of an adder tree, only the input operand corresponding to the winner-take-all sample will have its winner-take-all bit set.) In situations where the output is insensitive to the value of a particular input operand, the table entry for the input operand is symbolized by "dc", i.e. "don't care".

TABLE 1

Input-Output Relation for Adder Cell 2730

| $DV_1$ | $DV_2$ | $WTA_1$ | $WTA_2$ | $X_{out}$ |
|---|---|---|---|---|
| dc | dc | 1 | 0 | $X_1$ |
| dc | dc | 0 | 1 | $X_2$ |
| 0 | 0 | 0 | 0 | 0 |
| 0 | 1 | 0 | 0 | $X_2$ |
| 1 | 0 | 0 | 0 | $X_1$ |
| 1 | 1 | 0 | 0 | $X_1 + X_2$ |

Adder cell 2730 also generates a data valid signal output $DV_{out}$ and a winner-take all signal output $WTA_{out}$. The data valid output signal $DV_{out}$ is the logical OR of the two data valid signal inputs. Similarly, the winner-take-all signal output $WTA_{out}$ is the logical OR of the two winner-take-all input signals. In one alternative embodiment, adder cell 2730 may be modified to use a carry-save adder instead of a carry-propagate adder. In this case, adder cell 2750 may receive three input operands and generate two output operands.

Figure 33B:
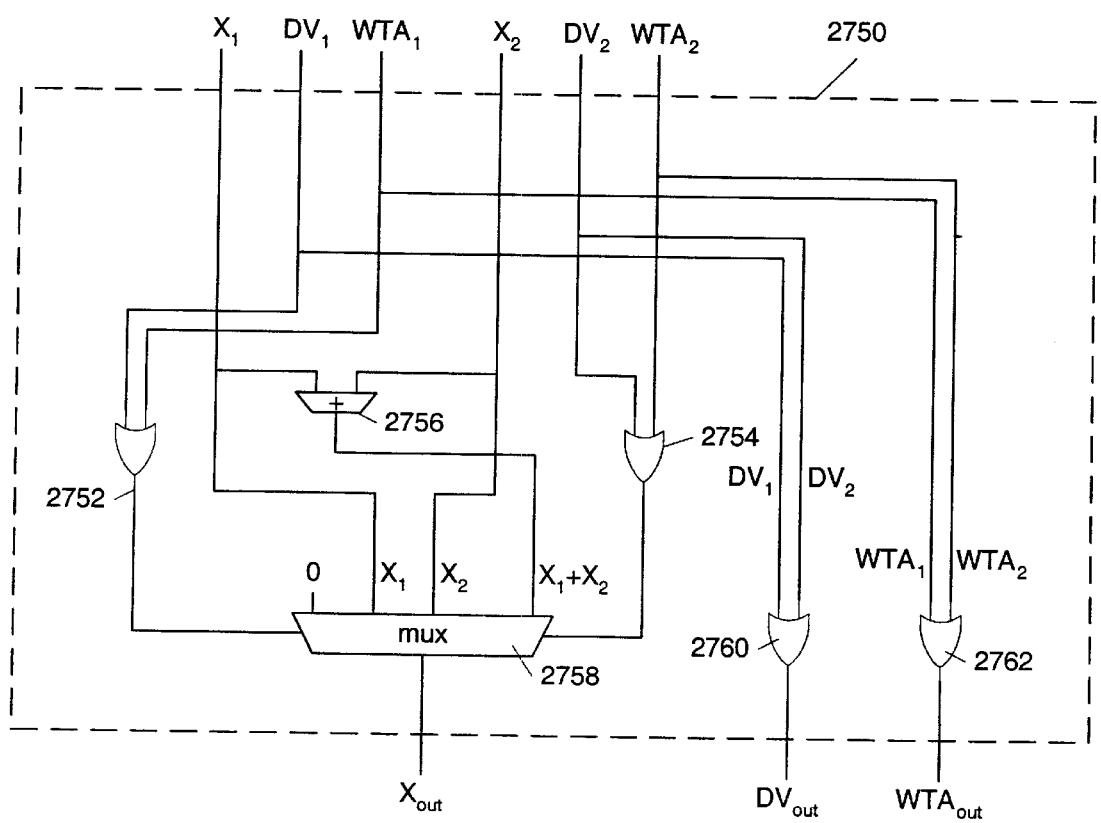
FIG. 33B illustrates another embodiment of an adder cell which performs addition or winner-take-all selection on two input operands based on the state of data valid and winner-take-all input signals.

FIG. 33B illustrates another embodiment of an adder cell, i.e. adder cell 2750, which has the same input-output relation as adder cell 2730. However, the multiplexing operation is performed after addition instead of before addition. Adder cell 2750 comprises OR gates 2752, 2754, 2760 and 2762, adder 2756, and multiplexor 2758. OR gate 2752 generates the logical OR of the data valid signal $DV_1$ and the winner-take-all signal $WTA_1$. OR gate 2754 generates the logical OR of the data valid signal $DV_2$ and the winner-take-all signal $WTA_2$. The outputs of the logical OR gates 2752 and 2754 control the multiplexor 2758. Multiplexor 2758 receives four input signals: a signal tied to zero, input signal $X_1$, input signal $X_2$, and the sum $X_1+X_2$. The output $X_{out}$ from multiplexor 2758 is described by Table 1 above. Adder cell 2750 also generates data valid output signal $DV_{out}$ and a winner-take-all signal output $WTA_{out}$. The data valid output signal $DV_{out}$ is the logical OR of the two data valid signal inputs. Similarly, the winner-take-all signal output $WTA_{out}$ is the logical OR of the two winner-take-all input signals. In one alternative embodiment, adder cell 2750 may be modified to use a carry-save adder instead of a carry propagate adder.

In one embodiment, adder tree 2702 may be composed of adder cells as suggested by FIG. 33A and/or FIG. 33B. Each adder cell in layers after the top addition level 2710 may receive the value $X_{out}$, the corresponding data valid signal $DV_{out}$ and the corresponding winner-take-all signal $WTA_{out}$ from two adders cells of the previous level (through intervening buffer registers). The top addition level may receive a set of input data words. Each input data word comprises a numeric operand, a data valid bit and a winner-take-all bit. The data valid bit may indicate the validity of the corresponding numeric operand for inclusion in a summation. The winner-take-all bit may indicate whether the corresponding numeric operand corresponds to the winner-take-all sample in an unfiltered pixel computation. It is assumed that at most one of the input data words have a winner-take-all bit set (i.e. equal to one). Thus, this embodiment of adder tree 2702 may generate an output from the bottom addition level 2712 which equals either (a) a summation of selected ones of the input numeric operands when none of the winner-take-all bits presented at the top layer are set, or (b) the unique input numeric operand whose winner-take-all bit is set. In case (a), the summation includes all those numeric operands whose data valid bits are set (i.e. equal to one).

Any given adder cell and the adder cells from previous layers which feed the given adder cell comprise a subtree. The numeric operands presented to the subtree at the top layer are referred to as the subtree operands. The output $X_{out}$ from the given adder cell equals either (i) a summation of the valid subtree operands (i.e. those subtree operands which have data valid signals equal to one) when the winner-take-all bits of all the subtree operands are equal to zero, or (ii) the unique subtree operand whose winner-take all bit is set. The data valid output signal $DV_{out}$ generated by the given adder cell equals the logical OR of the data valid bits of all the subtree operands. Similarly, the winner-take-all output signal $WTA_{out}$ generated by the given adder equals the logical OR of the winner-take-all bits of all the subtree operands.

Figure 33C:
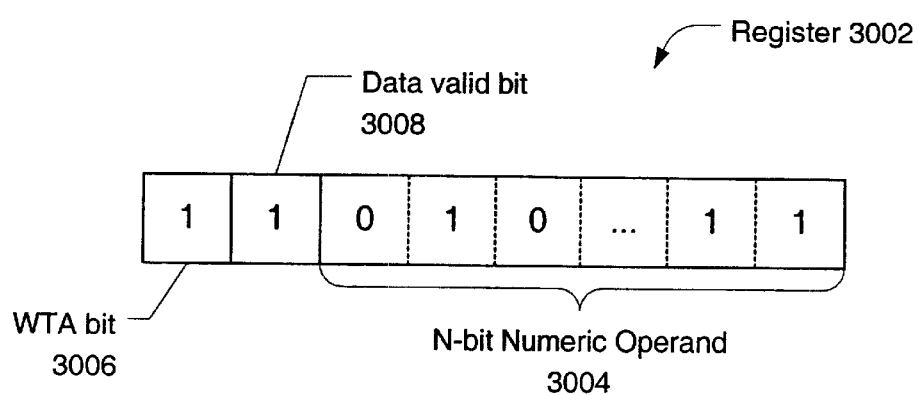
FIG. 33C illustrates register comprising a numeric operand, a winner-take-all bit and a data valid bit.

FIG. 33C shows an adder register 3002 according to one embodiment. As shown, register 3002 comprises an N-bit numeric operand 3004, a winner-take-all (WTA) bit 3006 and a data valid (DV) bit 3008. The parameter N may equal any desired positive integer value. Such a register may be used as an input register to present input data to the adder tree 2702, as an intermediate result register to buffer the computational results of an adder cell between layers of the adder tree, or as a final result register to buffer the computation results of a adder cell at the bottom layer of the adder tree. The bit positions of the WTA bit and the DV bit with respect to the numeric operand are arbitrary.

Given a collection of numeric operands and their corresponding data valid bits and winner-take-all bits presented as input to the adder tree 2702, it is to be noted that the setting of any one of the winner-take-bits makes the adder tree output insensitive to all the data valid bits. Thus, when a pixel is to be computed by the unfiltered winner-take-all criterion, it is not necessary to zero the data valid bits. Simply setting the winner-take-all bit of the numeric operand corresponding to the winner-take-all sample guarantees that the adder tree output will perform the winner-take-all selection. Thus, in some embodiments, the mechanism responsible for determining the data valid bits may run autonomously, i.e. without regard to whether the current pixel is filtered or unfiltered.

As described above, the graphics system 112 may be configured to generate super-samples in response to 3D graphics data, and to compute output pixel values based on sample filtering or based on an unfiltered "winner-take-all" criterion. In another embodiment, graphics system 112 (e.g. rendering units 150) may be configured to turn off super-sampling, and thus, to generate one sample per unit pixel area. This mode will be referred to as the critical sampling mode. For example, certain users/customers may want the displayed video output to replicate the appearance of a previous generation video system which may have generated pixel values from 3D graphics primitives without intervening super-sampling and super-sample filtering. Thus, it may be desirable to determine pixel values by the unfiltered "winner-take-all" criterion during the critical sampling mode. However, it is noted that sample-to-pixel calculation units 170 are equally capable of performing sample filtering to determine pixel values in the critical sampling mode as in the super-sampling mode.

The present invention contemplates a variety of winner-take-all criteria for selecting the single sample whose sample attributes become the attributes for the current pixel. In one embodiment, the selected sample is simply the first sample (or $K^{th}$ sample where K is a predetermined constant) of the bin which contains the current pixel center. In critical sampling mode, the rendering units 150 may store the single sample generated for each output pixel in the first sample position of the corresponding bin. In a second embodiment, the selected sample is the sample closest to the pixel center in terms of some (not necessarily Euclidean) distance measure. In a third embodiment, the selected sample is a random (i.e. arbitrary) one of the samples in the bin which contains the current pixel center.

In one embodiment, the critical sampling mode may be invoked when graphics data is received from legacy APIs such as X-Windows.

In order to increase performance, a graphics system (e.g. a sample-to-pixel calculation unit) may introduce a new summation to the adder tree before a previously introduced summation has completely propagated through the adder tree thereby pipelining summations. For example, the summation data for a first attribute (e.g. red) may be introduced first to the adder tree. As described above, the first stage of the summation process occurs at the top (first) addition level 2710 of the adder tree 2702. After the partial summations associated with the first attribute have propagated beyond the top addition level, the summation data for a second attribute (e.g., green) may be introduced to the top addition level. After the partial summations associated with the second attribute have propagated through the first addition level, the summation data for a third attribute (e.g. blue) may be presented to the first addition level.

In general, the summation of another attribute may begin after the previous attribute has completed at least the first addition level. In one embodiment, multiple summations of different attributes may be occurring simultaneously in a pipelined fashion through the adder tree. In another embodiment, summations corresponding to different pixels may also be sequentially pipelined into the adder tree after summations corresponding to one pixel have been introduced thereby increasing the utilization of the adder tree. Typically, a different summation may be loaded into an adder tree on every n clock cycles, where n is a positive integer. This period of time, i.e. the n clock cycles, is referred to herein as an adder cycle. However, in certain cases, for one or more adder cycles, no valid data may be introduced into the adder trees, e.g., in cases where the intrinsic rate of the adder tree (i.e. one divided by the adder cycle period) is greater than the product of the pixel output rate times the number of summations per pixel.

Figure 34:
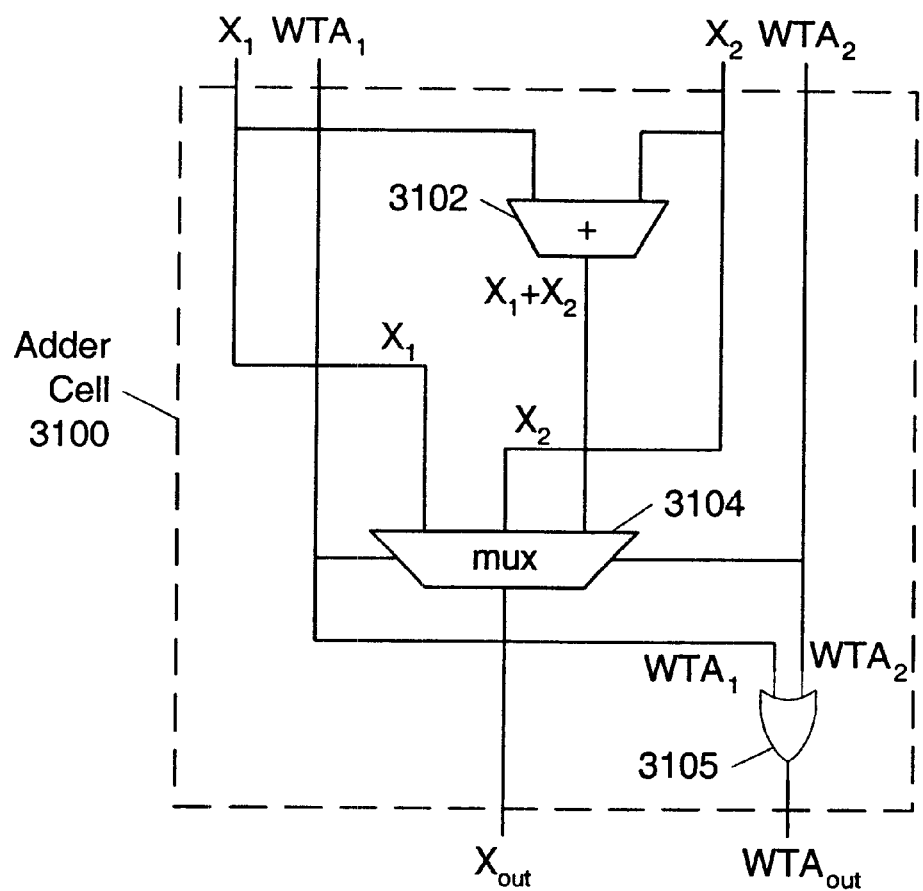
FIG. 34 illustrate one embodiment of an adder cell configured to perform addition or winner-take-all selection on two input operands in response to the state of two winner-take-all input signals.

FIG. 34 shows an embodiment of an adder cell, i.e. adder cell 3100, which is configured to selectively perform winner-take-all logic or normal addition on input operands $X_1$ and $X_2$ based on the state of the corresponding winner-take-all signals $WTA_1$ and $WTA_2$. Adder 3102 is operable to receive operands $X_1$ and $X_2$, and to output the sum of the two operands. Operands $X_1$ and $X_2$ and their sum are provided to multiplexer 3104 which is operable to select among one of these three inputs. Multiplexer 3104 is operable to select among the three inputs based on the state of the winner-take-all input signals $WTA_1$ and $WTA_2$. If neither WTA signal is high (i.e. equal to one), multiplexer 3104 outputs the sum $X_1+X_2$. If signal $WTA_1$ is high, multiplexer 3104 outputs operand $X_1$, and if signal $WTA_2$ is high, multiplexer 3104 outputs operand $X_2$. It is noted that signals $WTA_1$ and $WTA_2$ may not both be set; only one winner-takes-all number may exist for a given summation.

In one embodiment, the summation operations for a pixel may be performed using a single adder tree, thereby reducing the hardware cost. However, in such an embodiment, the time required to perform the summations for the pixel attributes and the sum of the filter coefficients may be longer than desired. For example, if each addition level requires n clock cycles for completion, at least (L+K+1)n clock cycles may be required to output the results corresponding to one pixel, where L is the number of layers in the adder tree, K is the number attribute summations to be performed per pixel. Note that the total number of summations to be performed per pixel is (K+1) since each pixel also includes a coefficient summation in addition to the K attribute summations.

In another embodiment, (K+1) adder trees may be used, i.e. one adder tree for each of the (K+1) summations to be performed per pixel. Suppose that the latency of each adder tree (from input to output) is m clock cycles, and that the data for each summation is presented simultaneously to a corresponding one of the adder trees. In this case, the results corresponding to one pixel may be output in Ln clock cycles (i.e. each of the K+1 adder trees may simultaneously output a corresponding sum of one of the attributes or sum of the coefficients). Thus, a decrease in processing time per pixel may be purchased at the expense of additional hardware.

In another embodiment, an intermediate number of adder trees may be used, i.e. a number between 1 and (K+1). The (K+1) summations may be partitioned into two or more groups. A first group of summations may be introduced to the available adder trees. When the first group of summations have propagated beyond at least the first layer of each adder tree, a second group of summations may be introduced to the available adder trees, and so on. The number of adder trees and the number of groups may be chosen in such a way as to balance the cost of the hardware and the time it takes to perform the required summations.

Figure 35:
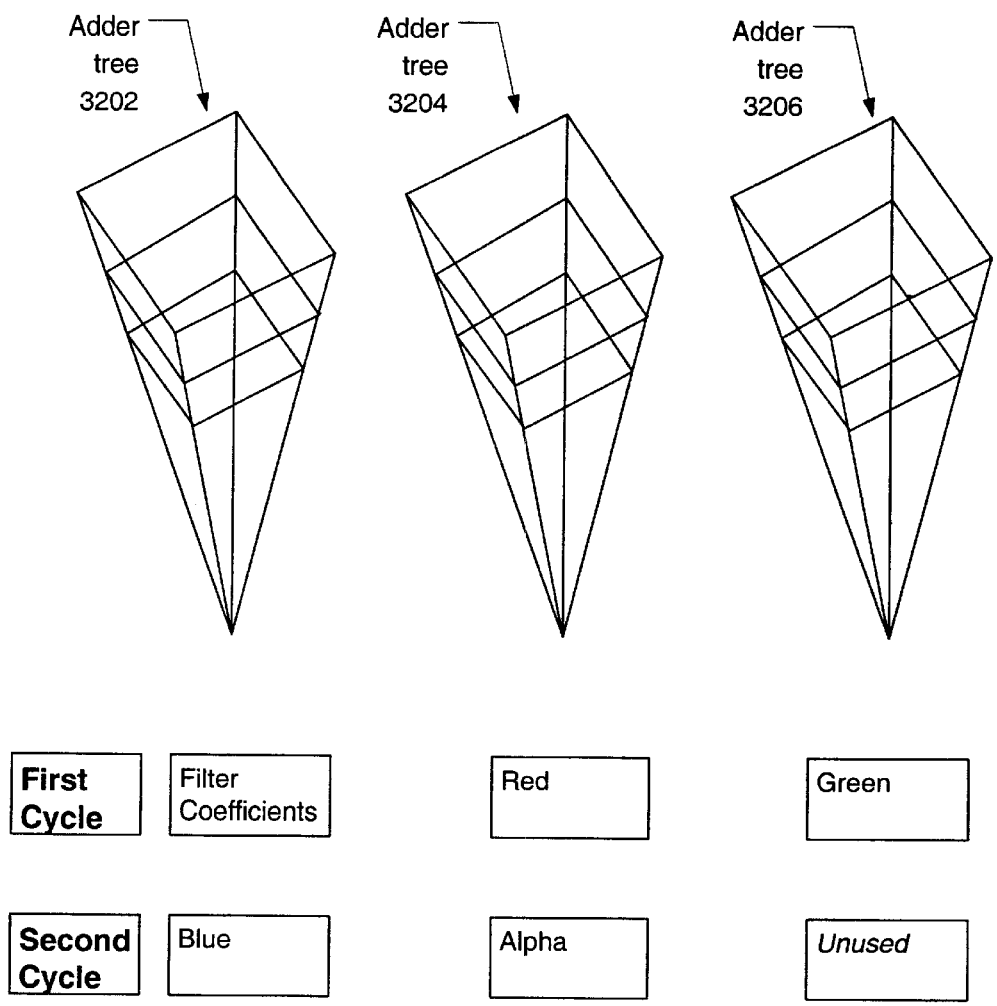
FIG. 35 is a diagram showing three adder trees and the corresponding attributes computed in each of two rounds according to one embodiment

FIG. 35 shows one arrangement of adder trees for computing five summations per pixel (i.e. one summation for each of red, green, blue, alpha and filter coefficients). In this embodiment, three adder trees 3202, 3204, and 3206 are used. In the first cycle, the summation data for the filter-coefficient summation, the red summation and the green summation are supplied simultaneously to the three adder trees respectively. Thus, these three summations may be computed in parallel. In the second cycle, the summation data for the blue summation and the alpha summation may be supplied simultaneously and respectively to two of the tree adders. One of the adder trees, e.g. adder tree 3206 may be unused in the second cycle.

The first cycle of the next pixel may follow the second cycle of the current pixel. In other words, the filter-coefficient, red and green summations of the next pixel may be initiated as soon as the blue and alpha summations of the current pixel propagate beyond at least the first layer of the adder trees.

In other embodiments, different groupings of summations for the different cycles may also be implemented. Assuming the filter coefficients are not pre-normalized, the computed attribute summations may be normalized after the completion of each summation. The normalization may be accomplished by dividing the computed attribute summations by the sum of the filter coefficients (i.e. the normalization factor). Thus, it may be advantageous for the sum of the filter coefficients and as many other attribute values as possible to be included in the first round of computations performed by the adder trees.

It is noted that the division of the attribute summations by the normalization factor may be implemented by (a) computing the reciprocal of the normalization factor and (b) multiplying the reciprocal value by the attribute summations. A single reciprocal and $N_A$ multiplications is less expensive computationally than $N_A$ divisions, where $N_A$ is the number of attribute summations.

Computing the value for each filter coefficient may be performed using a look-up table. Given a particular filter function, a look-up table may be generated using distance of the sample from the filter center as an index to look up corresponding values for the filter coefficients. Since not all distances may be represented in such a discrete representation, the distance may be sampled with a higher resolution for small distances and lower resolution for higher distances. Filter coefficients for distances that are not represented in the look-up table may be determined by interpolation. In one embodiment, a simple linear (or polynomial) interpolation may be used.

Furthermore, to save computational power, in one embodiment, the square of the distance of the sample from the filter center may be used to index into the look-up table. The sample space may be visualized as a 2D space since the sample space corresponds to the 2D screen space. Therefore, in order to compute the distance between two points in 2D where the points are represented by Cartesian x and y coordinates, the Pythagorean theorem may be used as set forth in Equation 10 of FIG. 36.

In order to avoid computing the square root every time the distance is computed, the lookup table may be indexed by square-distance instead of distance. Thus, the computation may then be limited as set forth in Equation 11 of FIG. 36.

As previously noted, when the filter support covers regions of two or more different sample densities, the samples from the lower density regions may contribute less to the filtering than samples from the higher density region. An example of a filter partially covering regions of different sample densities is shown in FIG. 23. In one embodiment, to compensate for this, the filter coefficients corresponding to samples from the region of lower sample density may be multiplied by a factor approximately equal to the ratio of the high density to the low density. For example, if the high density is 16 samples/pixel and the low density is 4 samples/pixel, the filter coefficients in the region of lower sample density may be multiplied by $$\frac{16}{4} = 4.$$

This provides more weight to the less-represented samples from the region of lower density. In cases where the filter support may include more than two regions of different sample density, filter coefficients for samples in a lower density region may also be multiplied by a factor equal to the ratio of the high density to the sample density of that lower density region. For example, if a third region is included in the support of the filter with a density of 2 samples/pixel, the filter coefficients for that region may be multiplied by $$\frac{16}{2} = 8.$$

In another embodiment, as the sample density decreases, the diameter of the filter may increase in order to keep the number of samples included in the filtering approximately constant. In an embodiment where the filter is circularly symmetric, the square of the diameter of the support of the filter may be inversely proportional to the density of the samples in that region, i.e., $$d^2 \propto \frac{1}{\rho},$$

where d is the diameter of the support of the filter and $\rho$ is the density of the samples. That is, when the density of the samples decreases by a factor of 4, the diameter approximately increases by a factor of 2. For example, if the diameter of the support of the filter is 5 pixels at a region where the density is 16 samples/pixel, the diameter may be 10 pixels at region where the density is 4 samples/pixel.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note that the headings used herein are for organizational purposes only and are not meant to limit the description provided herein or the claims attached hereto.

What is claimed is:

1. A method for generating pixels for a display device, the method comprising:
   receiving graphics data;
   rendering a plurality of samples into a sample buffer in response to said graphics data; and
   filtering said plurality of samples to generate one or more pixels, wherein said filtering comprises:
   (a) reading said plurality of samples from the sample buffer;
   (b) determining filter coefficients for a subset of said plurality of samples;
   (c) multiplying a first sample attribute of each sample in said subset by a corresponding one of said filter coefficients to generate first weighted sample attributes;
   (d) adding the first weighted sample attributes to generate a first weighted attribute sum;
   (e) computing a normalization factor by adding the filter coefficients which correspond to said subset of samples;
   (f) dividing the first weighted attribute sum by said normalization factor to generate a first pixel attribute for a first of said one or more pixels.

2. The method of claim 1, wherein said first sample attribute of each sample in said subset is a sample color value.

3. The method of claim 1, wherein said determining said filter coefficients comprises evaluating a filter function for each of said samples in said subset, wherein the filter function is defined over a filter support, wherein the filter support overlaps two or more regions having different sample densities.

4. The method of claim 3, wherein the filter support has a first area in a first region of said two or more regions, and a second area in a second region of said two or more regions, wherein the first area is proportional to the inverse of a first sample density of said first region, wherein the second area is proportional to the inverse of a second sample density of said second region.

5. The method of claim 1, wherein said normalization factor is computed for each of said one or more pixels.

6. The method of claim 1, wherein said plurality of samples are positioned in a two-dimensional sample space according to an irregular grid.

7. The method of claim 1, wherein (d) and (e) are performed in parallel.

8. The method of claim 1, wherein said determining said filter coefficients comprises evaluating a filter function for each of said samples in said subset, wherein the filter function is defined over a filter support, the method further comprising:
   determining if the filter support intersects a first region having a first sample density and a second region having a second sample density;

multiplying the filter coefficients corresponding to samples in said second region by a factor equal to the ratio of said first density to said second density in response to the filter support area intersecting the first region and the second region.

9. The method of claim 1, wherein (b) comprises:
evaluating a square distance of a first sample of said subset from a center of a first pixel of said one or more pixels;
accessing a look-up table using the square distance, wherein the lookup table stores values of a filter function.

10. The method of claim 1, wherein the filter coefficients correspond to a first filter, wherein (b) comprises:
evaluating a square distance of a first sample of said subset from a center of said first filter;
accessing a look-up table using the square distance, wherein the lookup table stores values of the first filter.

11. The method of claim 1 further comprising transmitting the first pixel attribute for said first pixel to a display device without an intervening frame buffer.

12. The method of claim 1, wherein said rendering said plurality of samples into said sample buffer includes double buffering at least a portion of said plurality of samples.

13. The method of claim 1, wherein said filtering comprises selecting and filtering said subset of samples to form output pixels on one of: a real time basis or an on-the-fly basis.

14. A computer software program embodied on a computer-readable medium, said computer software program comprising a plurality of instructions, wherein said instructions are configured to:
receive graphics data;
render a plurality of samples into a sample buffer in response to said graphics data; and
filter said plurality of samples to generate one or more pixels, wherein said filtering comprises:
(a) reading said plurality of samples from the sample buffer;
(b) determining filter coefficients for a subset of said plurality of samples;
(c) multiplying a first sample attribute of each sample in said subset by a corresponding one of said filter coefficients to generate first weighted sample attributes;
(d) adding the first weighted sample attributes to generate a first weighted attribute sum;
(e) computing a normalization factor by adding the filter coefficients which correspond to said subset of samples;
(f) dividing the first weighted attribute sum by said normalization factor to generate a first pixel attribute for a first of said one or more pixels.

15. The computer software program of claim 14, wherein said first sample attribute of each sample in said subset is a sample color value.

16. The computer software program of claim 14, wherein said determining said filter coefficients comprises evaluating a filter function for each of said samples in said subset, wherein the filter function is defined over a filter support, wherein the filter support overlaps two or more regions having different sample densities.

17. The computer software program of claim 16, wherein the filter support has a first area in a first region of said two or more regions, and a second area in a second region of said two or more regions, wherein the first area is proportional to the inverse of a first sample density of said first region, wherein the second area is proportional to the inverse of a second sample density of said second region.

18. The computer software program of claim 14, wherein said plurality of samples are positioned in a two-dimensional sample space according to an irregular grid.

19. The computer software program of claim 14, wherein said determining said filter coefficients comprises evaluating a filter function for each of said samples in said subset, wherein the filter function is defined over a filter support, wherein the instructions are further configured to:
determine if the filter support intersects a first region having a first sample density and a second region having a second sample density; and
multiply the filter coefficients corresponding to samples in said second region by a factor equal to the ratio of said first density to said second density in response to the filter support area intersecting the first region and the second region.

20. The computer software program of claim 14, wherein (b) comprises:
evaluating a square distance of a first sample of said subset from a center of a first pixel of said one or more pixels;
accessing a look-up table using the square distance, wherein the lookup table stores values of a filter function.

21. The computer software program of claim 14, wherein the filter coefficients correspond to a first filter, wherein (b) comprises:
evaluating a square distance of a first sample of said subset from a center of said first filter;
accessing a look-up table using the square distance, wherein the lookup table stores values of the first filter.

22. The computer software program of claim 14, wherein the instructions are further configured to transmit the first pixel attribute for said first pixel to a display device without an intervening frame buffer.

23. The computer software program of claim 14, wherein said rendering said plurality of samples into said sample buffer includes double buffering at least a portion of said plurality of samples.

24. A graphics system comprising:
a rendering unit operable to receive graphics data and to render a plurality of samples in response to the graphics data;
a sample buffer configured to store the plurality of samples;
a sample-to-pixel calculation unit coupled to the sample buffer, and configured to filter said plurality of samples to generate one or more pixels by:
(a) reading said plurality of samples from the sample buffer;
(b) determining filter coefficients for a subset of said plurality of samples;
(c) multiplying a first sample attribute of each sample in said subset by a corresponding one of said filter coefficients to generate first weighted sample attributes;
(d) adding the first weighted sample attributes to generate a first weighted attribute sum;
(e) computing a normalization factor by adding the filter coefficients which correspond to said subset of samples;
(f) dividing the first weighted attribute sum by said normalization factor to generate a first pixel attribute for a first of said one or more pixels.

25. The graphics system of claim 24, wherein said first sample attribute of each sample in said subset is a sample color value.

26. The graphics system of claim 24, wherein said sample-to-pixel calculation unit is configured to determine said filter coefficients based on a filter function, wherein the filter function is defined over a filter support, wherein the filter support overlaps two or more regions having different sample densities.

27. The graphics system of claim 25, wherein the filter support has a first area in a first region of said two or more regions, and a second area in a second region of said two or more regions, wherein the first area is proportional to the inverse of a first sample density of said first region, wherein the second area is proportional to the inverse of a second sample density of said second region.

28. The graphics system of claim 24, wherein said rendering unit is configured to position the plurality of samples in a two-dimensional sample space according to an irregular grid.

29. The graphics system of claim 24, wherein said sample-to-pixel calculation unit is configured to determine said filter coefficients comprises by evaluating a filter function for each of said samples in said subset, wherein the filter function is defined over a filter support, wherein the sample-to-pixel calculation unit is further configured to:

determine if the filter support intersects a first region having a first sample density and a second region having a second sample density; and multiply the filter coefficients corresponding to samples in said second region by a factor equal to the ratio of said first density to said second density in response to the filter support area intersecting the first region and the second region.

30. The graphics system of claim 24, wherein the sample-to-pixel calculation unit is further configured to transmit the first pixel attribute for said first pixel to a display device without an intervening frame buffer.

31. A method for generating pixels for a display device, the method comprising:

receiving graphics data;

rendering one or more samples in response to said graphics data; and applying a filter to at least a subset of the plurality of samples to generate one or more output pixels, wherein each sample comprises one or more sample attributes, wherein each output pixel comprises one or more pixel attributes, and wherein said applying the filter comprises:

applying weighting factors to the sample attributes;

summing the weighted sample attributes to form pixel attributes;

computing one or more normalization factors based on the weighting factors; and normalizing the pixel attributes using the one or more normalization factors.

32. The method of claim 31, wherein said normalizing comprises dividing the pixel attributes by said one or more normalization factor.

33. The method of claim 31, wherein said applying comprises multiplying said weighting factors to the sample attributes.

34. The method of claim 31, further comprising double buffering the rendered samples.

35. The method of claim 31, wherein said applying is performed in real-time or on-the-fly.

36. The method of claim 31, further comprising looking up the weighting factors for each particular sample based on the distance of the particular sample from a predetermined position in the filter.

37. The method of claim 36, wherein the predetermined position corresponds to the center of the filter.

38. The method of claim 36, wherein the predetermined position corresponds to the center of the output pixel.

39. The method of claim 31, further comprising determining which samples fall within the support of the filter.

40. The method of claim 31, wherein the samples are rendered into the sample buffer in bins.

* * * * *